(12) United States Patent
Sarcanin

(10) Patent No.: US 6,941,285 B2
(45) Date of Patent: Sep. 6, 2005

(54) METHOD AND SYSTEM FOR A VIRTUAL SAFE

(76) Inventor: Branko Sarcanin, 25 McArthur Street, Etobicoke, Ontario (CA), M9P 3M6

( * ) Notice: Subject to any disclaimer, the term of this patent is extended or adjusted under 35 U.S.C. 154(b) by 64 days.

(21) Appl. No.: 10/269,033

(22) Filed: Oct. 11, 2002

(65) Prior Publication Data

US 2003/0145205 A1 Jul. 31, 2003

Related U.S. Application Data

(63) Continuation of application No. PCT/CA01/00504, filed on Apr. 17, 2001.

(30) Foreign Application Priority Data

Apr. 14, 2000 (CA) ............................................ 2305249

(51) Int. Cl.[7] ............................................. G06F 17/60
(52) U.S. Cl. ............................. 705/67; 705/40; 705/41; 705/35; 705/79; 713/155; 713/159; 713/200; 713/201; 235/380; 235/382; 235/379
(58) Field of Search ............................ 705/35, 39, 40, 705/41, 67, 79, 52; 235/380, 492, 379, 382; 713/200, 201, 155, 159, 189, 202

(56) References Cited

U.S. PATENT DOCUMENTS 5,193,114 A * 3/1993 Moseley ..................... 713/183
5,883,810 A 3/1999 Franklin et al.
6,105,008 A * 8/2000 Davis et al. ................... 705/41
6,282,522 B1 8/2001 Davis et al.

FOREIGN PATENT DOCUMENTS

| EP | 0 814 441 | 12/1997 | |
|---|---|---|---|
| EP | 0 936 530 | 8/1999 | |
| EP | 0 982 692 | 3/2000 | |
| WO | WO 01/08113 A1 * | 6/2000 | ........... G07F/19/00 |
| WO | 01/08113 | 2/2001 | |

OTHER PUBLICATIONS

Garrison, Patty. Secure Computing Corporation Announces SafeWord™ Virtual Smart Card Solution (Oct. 21, 1999) http://www.securecomputing.com/archive/press/1999/vscs-59.html. Retrieved online Mar. 18, 2005.*

* cited by examiner

*Primary Examiner*—James A. Reagan

(57) ABSTRACT

A transaction server for performing a transaction over a network using a virtual smart card the server comprising, a virtual smart card database having a plurality of records each record including a virtual card identification and a value corresponding to a single virtual smart card; a security module; an emulator for emulating a smart card, the emulator for receiving smart card commands and processing the commands in conjunction with the virtual smart card database and the security module; and a virtual card reader module for receiving the smart card commands and relaying the commands to the smart card emulator whereby transactions are performed over the network using one or more the records and the virtual smart card database.

16 Claims, 49 Drawing Sheets

METHOD AND SYSTEM FOR A VIRTUAL SAFE

This application is a continuation of PCT/CA01/00504 filed on Apr. 17, 2001 claiming priority from Canadian Patent Application No. 2,305,249 filed on Apr. 14, 2000.

The invention relates to the field of electronic commerce systems, and more specifically to secure electronic commerce systems employing virtual smart cards.

BACKGROUND OF THE INVENTION

With the rapid increase in the number of consumers having access to the World Wide Web, a corresponding need for conducting commerce over the Internet has emerged. However, concerns with online security have undermined the evolution of electronic commerce as security issues have affected the required level of trust between online retailers and consumers. In traditional business transactions, trust is established face-to-face and supported by documentation that reduces liability. Today, traditional business transactions are being transformed. In particular, the use of smart cards is expanding, further affecting the level of trust retailers and consumers have in electronic commerce.

A smart card, also called a chip card, integrated circuit card, memory card or processor card, is typically a credit card-sized plastic card that includes one or more integrated circuits. A smart card can interface with a point-of-sale terminal, an ATM, or with a card reader integrated with a computer, telephone, vending machine, or a variety of other devices. A smart card may be programmed with various types of functionality such as stored-value applications, credit or debit applications, loyalty applications, cardholder information, etc. Although a plastic card is currently the medium of choice for smart cards, it is possible to implement these cards using a smaller form factor. For example, a smart card could be attached to a key chain or it could be as small as a single integrated circuit chip. A smart card may also be implemented as part of a personal digital assistant, telephone, or some other form.

Typically, to increase user trust, a smart card contains a hardware encryption module for performing a variety of encryption algorithms. Encryption may also be performed in software. A typical process for issuing smart cards and for reconciling transactions performed with these cards in the consumer context may be described as follows. A terminal supplier builds the equipment used by a service provider to provide goods and/or services to consumers via smart card and service payment terminal. A card supplier contracts with an integrated circuit manufacturer and a card manufacturer for integrated circuits and plastic card bodies, respectively. The card supplier then embeds the integrated circuits in the cards and initializes them with a serial number. The card supplier then delivers these cards to a card issuer. In conjunction with a clearing and administration system, the card issuer personalizes new cards and then transfers these cards to individual cardholders (i.e. consumers). A cardholder may then charge the card with value prior to use. Alternatively, the card may be delivered with value pre-loaded. The cardholder may then use the card at a service payment terminal to purchase goods and/or services from the service provider. Upon purchase, the terminal debits the value of the purchase from the card, thus creating a service payment. The system may be implemented, for example, using Visa, MasterCard, American Express, Discovery, Players Card International, bank and financial institution debit cards, and other cards.

In this typical process, all transactions are sent in a data file from the service payment terminal, via an acquirer, to a clearing and administration system. Accumulated service payment batches from other terminals are also sent to the clearing and administration system. Based upon this collection data, the clearing and administration system receives money from the card issuer. The money received from the card issuer, of course, originates from the cardholder. The clearing and administration system then transfers a lump sum to the acquirer using a suitable settlement service (e.g. Visa, MasterCard American Express, Discovery, Players Card International, etc.) to pay the various service providers having a relationship with the acquirer. Based upon the collection data, the acquirer then transfers an appropriate amount of money to each service provider reflecting the value of the goods and services that that service provider provided to cardholders that period (e.g. day). The value of the goods and services provided is based on deductions from cardholders' smart cards.

A consumer typically uses a service payment terminal in a face-to-face context in order to purchase goods at a store or directly from the terminal itself. The service payment terminal can be an attended device or it can be integrated into a self-service device such as a vending machine or public telephone. For example, the service payment terminal may be incorporated into a soda machine in order to dispense sodas to a customer where the customer pays by inserting a smart card. Or, the service payment terminal may be a point-of-sale (POS) terminal typically found at the check-out counter or a store.

In general, service payment terminals allow consumers to use smart cards for the payment of goods and services. A service payment terminal generates a payment result from a transaction and bundles individual payment results into a collection for transfer to a clearing and administration system. The service payment terminal then transfers funds debited from consumers' smart card to the merchant whose goods and services were purchased through the terminal. Thus, a variety of goods and services may be purchased using a smart card from a merchant having a service payment terminal on premises. In addition, a consumer with a smart card may purchase goods or services from a merchant over the Internet.

Now, in order to purchase a product or service with a smart card, the card must first be loaded with value or with an identity. Typically, "stored-value" cards are loaded with value while "debit" and "credit" smart cards are loaded with the identity of the card holder. With respect to stored-value cards, value can be loaded onto the card in a variety of ways. For example, while inconvenient for the consumer, the consumer may physically travel to a bank or other institution that has an automated teller machine (ATM), or other similar device, in order to load value onto the smart card. With respect to loading value onto a smart card, the consumer may insert money into a value loading machine and have a corresponding value loaded onto the card. Or, the consumer may use a debit card to deduct value from the consumer's bank account for transfer to the card. Additionally, a credit card can be used as the source of value. In these examples, the consumer must travel to the bank to load value. A further inconvenience exists in that not all banks have value loading machines. To overcome this inconvenience, a method by which consumers may load value onto their smart cards via the Internet has been proposed and is described in U.S. patent application Ser. No. 09/070,488 (Davis, et al.), filed Apr. 30, 1998, and entitled "Internet Loading System Using Smart Card", which is incorporated herein by reference.

One disadvantage of current smart card systems is that they are dependent on the use of two hardware components new to the mass consumer market: smart cards and smart card readers. Without having large numbers of smart cards and card readers in use, there is little demand for them from consumers, which in turn makes it difficult to convince merchants to adopt these systems.

A need therefore exists for an electronic commerce system that does not require the prior deployment of physical smart cards and smart card readers. Such a system would allow merchants and issuers to establish a market presence that would in turn facilitate the acceptance of physical smart cards and card readers as they become more widely available.

With respect to the issue of trust, for electronic commerce, trust must be established in seconds between strangers who are physically separated. Effective security is based on the unequivocal authentication of authorized parties.

Methods for providing authentication include digital signatures, the public key infrastructure (PKI), and electronic payment policies such as X9.59. However, the traditional digital signature model is a complex and computationally expensive process when applied to mainstream business transactions over the Internet. The traditional digital signature model was not developed specifically for today's business transactions or a secure means to conduct electronic commerce that takes into account the infrastructure and business processes already in place within the financial sector to ensure trust in financial transactions. On the other hand, the PKI model does provide strong authentication. In addition, the financial industry's X9.59 policy, is a light-weight, high integrity, strong authentication payment protocol targeted for all methods of electronic payment including, but not limited to, set-top boxes, point-of-sale terminals with online authorization, and merchant web servers. With the appropriate smart card, X9.59 can work at point-of-sale, even improving the integrity of the current POS infrastructure, while eliminating the necessity for any identity information in payment transactions.

A need therefore exists for an electronic commerce system with effective authentication suitable for today's business transactions.

Finally, in addition to being secure, modern electronic commerce systems must protect individual privacy without impeding legitimate inquiries by law enforcement and government agencies. Typically, to improve privacy, a modem electronic commerce system must be relatively anonymous for the user.

In summary, smart cards require information be recorded on them. In the case of stored-value cards, a monetary value must be downloaded to the card. In the case of a debit or credit cards, an identity must be securely transferred to the card. Hence, a need exists for an electronic commerce system that has effective online authentication and that includes the benefits of physical smart card but that operates in a virtual environment. In addition, a need exists for an electronic commerce system that provides the benefits of card-present transactions in the context of remote networks and the Internet. Furthermore, a need exists for an electronic commerce system that can reduce costs associated with current systems with respect to card distribution, reader distribution, and connectivity. Moreover, a need exists for an electronic commerce system that provides effective authentication, security, and privacy.

A need therefore exists for an improved electronic commerce system. Consequently, it is an object of the present invention to obviate or mitigate at least some of the above-mentioned disadvantages.

SUMMARY OF THE INVENTION

The invention provides a system for conducting secure electronic commerce transactions over networks with virtual smart cards.

According to one aspect of the invention, a method for performing a secure electronic commerce transaction over a network using a smart card is provided. With respect to the method: the network has a client terminal, a merchant server, a payment server, and an authentication server; the smart card being a physical smart card or a virtual smart card; the smart card being associated with a user at the client terminal; the smart card having associated smart card information; the smart card information including an account balance; and, the smart card information being stored at the client terminal and at the authentication server. The method includes the steps of:

sending a transaction request message from the client terminal to the merchant server identifying a product for the transaction, the product having associated product information, the product information being displayed on a first web page supported by the merchant server, the user being able to view the web page at the client terminal using a browser;

sending transaction information from the merchant server to the client terminal in response to the transaction request message, the transaction information being contained in a second web page generated by the merchant server and displayable to the user through the browser, the transaction information including a price for the product, an IP address of the payment server, a transaction identifier, and a merchant identifier, the transaction identifier for tracking the transaction by the merchant server and by the payment server, the merchant identifier for tracking the transaction by the client terminal and the payment server;

receiving a user identifier and a PIN from the user at the client terminal for authorizing the transaction;

sending the user identifier, the PIN, and the transaction information from the client terminal to the authentication server;

comparing the price of the product to the account balance for the smart card at the authentication server to determine if the transaction can proceed, the account balance being stored at the authentication server and being accessed using the user identifier and the PIN, the transaction being terminated and a first termination message being sent from the authentication server to the client terminal for display to the user if the price exceeds the account balance by a predetermined amount;

sending a draw request message from the authentication server to the payment server using the IP address of the payment server, the draw request message containing the transaction information;

sending the draw request message from the payment server to the client terminal;

sending a debit request message from the client terminal to the payment server in response to the draw request message, the debit request message including a first digital signature, the first digital signature for verifying that the debit request message originated from the client terminal, the first digital signature being generated at the client terminal using the smart card information stored at the client terminal;

sending the debit request message from the payment server to the authentication server;

comparing at the authentication server the first digital signature contained in the debit request message to a first check digital signature generated at the authentication server using the smart card information stored at the authentication server to determine if the transaction can proceed, the transaction being terminated and a second termination message being sent from the authentication server to the client terminal for display to the user if the first digital signature does not match the first check digital signature;

updating the smart card information by debiting the account balance by the price to produce an updated account balance and storing the updated account balance at the authentication server; sending a debit response message from the authentication server to the payment server, the debit response message including a second digital signature, the second digital signature for verifying that the debit response message originated from the authentication server and for verifying that the account balance has been debited, the second digital signature being generated at the authentication server using the smart card information stored at the authentication server;

sending the debit response message from the payment server to the client terminal;

comparing at the client terminal the second digital signature contained in the debit response message to a second check digital signature generated at the client terminal using the smart card information stored at the client terminal, the smart card information stored at the client terminal including an expected updated account balance, to determine if the transaction can proceed, the transaction being terminated and a third termination message being displayed to the user if the second digital signature does not match the second check digital signature;

updating the smart card information by debiting the account balance by the price to produce an updated account balance and storing the updated account balance at the client terminal;

sending a verification response message from the client terminal to the payment server, the verification response message including an indication that the second digital signature matches the second check digital signature and that the transaction can proceed;

logging the indication and the transaction information at the payment server;

sending a debit result message from the payment server to the authentication server, the debit result message for confirming that the transaction has been logged and that the transaction can proceed, the debit result message including the indication and the transaction information;

logging the debit result message at the authentication server;

sending the debit result message from the authentication server to the client terminal to confirm that the transaction has been logged and that the transaction can proceed;

sending the debit result message from the client terminal to the merchant server to confirm that the transaction has been logged and that the product can be released to the user; and, sending a purchase receipt message from the merchant server to the client terminal, the purchase receipt message indicating that the product has been released to the user, thereby completing the secure electronic commerce transaction.

According to another aspect of the invention, the network is the Internet.

According to another aspect of the invention, the debit result message is encrypted.

According to another aspect of the invention a transaction server is provided for performing a transaction over a network using a virtual smart card. The server includes:

a) a virtual smart card database having a plurality of records each record including a virtual card identification and a value corresponding to a single virtual smart card;

b) a security module;

c) an emulator for emulating a smart card, the emulator for receiving smart card commands and processing the commands in conjunction with the virtual smart card database and the security module; and d) a virtual card reader module for receiving the smart card commands and relaying the commands to the smart card emulator whereby transactions are performed over the network using one or more the records and the virtual smart card database.

According to another aspect of the invention, a method for performing a transaction over a network using a virtual smart card and a server is provided. The method includes the steps of:

a) creating a plurality of records on a virtual smart card database, each record including a virtual card identifier and a value corresponding to a single virtual smart card;

b) receiving smart card commands via a smart card emulator and processing the commands in conjunction with the virtual smart card database and a security module; and c) receiving the smart card commands via a virtual card reader module and relaying the commands to the smart card emulator whereby transactions are performed over the network using the server and one or more of the records in the virtual smart card database.

According to another aspect of the invention, the server's security module includes a plurality of encryption algorithms.

BRIEF DESCRIPTION OF THE DRAWINGS

Embodiments of the invention may best be understood by referring to the following description and accompanying drawings. In the description and drawings, like numerals refer to like structures or processes. In the drawings:

FIG. 21 is a block diagram illustrating the attribute authentication authority process in VirtualSAFE in accordance with an embodiment of the invention;

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and processes have not been described or shown in detail in order not to obscure the invention. In the description and drawings, like numerals refer to like structures or processes.

The term "VirtualSAFE" is used herein to refer to a system, including software, for secure electronic commerce using virtual smart cards in accordance with an embodiment of the invention. VirtualSAFE may include machines for processing data, including the computer systems and network arrangements described herein.

System. VirtualSAFE is an electronic commerce system which includes a client terminal, a merchant server, a payment server, and a VirtualSAFE authentication server. The client terminal, merchant server, payment server, and VirtualSAFE authentication server are in communication over a network, typically, the Internet. Using a web browser, a user at the client terminal browses through product and service web pages presented by a merchant through the merchant server. The user may purchase products and services from the merchant using a virtual smart card. The VirtualSAFE authentication server authenticates the user through the software modules and method described below. In general, the payment server fulfills the e-commerce transaction. VirtualSAFE has stored therein data representing sequences of instructions which when executed cause the method described herein to be performed. Of course, VirtualSAFE may contain additional software and hardware a description of which is not necessary for understanding the invention.

Figure 1:
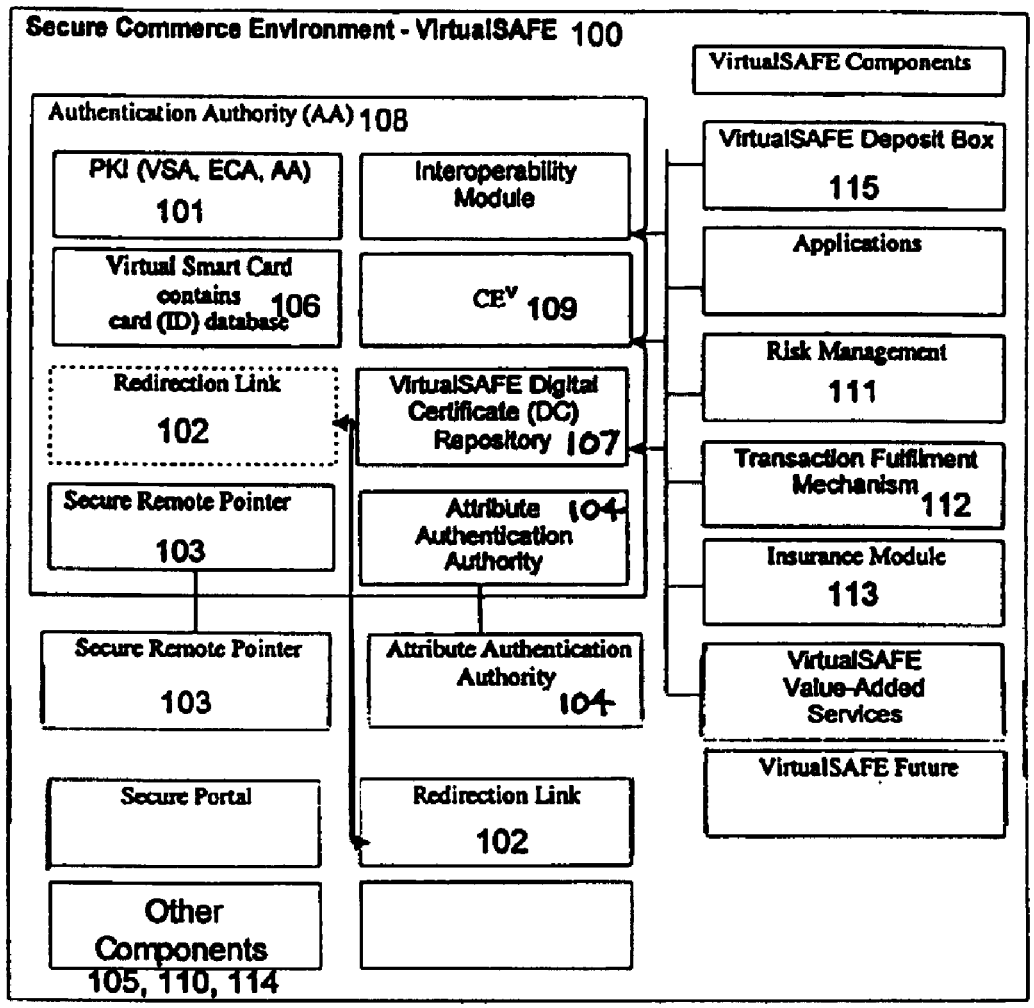
FIG. 1 is a block diagram illustrating VirtualSAFE software modules in accordance with an embodiment of the invention.

Modules. Referring to FIG. 1, there is shown a block diagram illustrating VirtualSAFE software modules 100 in accordance with an embodiment of the invention. VirtualSAFE software modules 100 include the following: Public Key Infrastructure (PKI) 101; Redirection Link (RL) 102; Secure Remote Pointer (SRP) 103; Attribute Authority (AA) 104; Virtual Identity (VI) 105; Virtual Smart Card (VSC) 106; Secure Data Repository 107; VirtualSAFE (or Authentication Authority) Server 108; Crypto-Engine (CEV) 109;

Payment Processing Engine 110; Risk Management Engine 111; Transaction Fulfillment Mechanism (TFM) 112; Insurance Module 113; Secure Transaction Repository 114; and VirtualSAFE Deposit Box (VSDB) 115.

These modules are described in detail in the following beginning with the VirtualSAFE server 108 and Crypto-Engine (CEV) 109.

VirtualSAFE Server 108. Advantageously, the VirtualSAFE server 108 (or authentication server) dispenses with the need for physical smart cards and card readers. In the following, physical smart card transactions are contrasted with virtual smart card transactions as coordinated by the VirtualSAFE server 108.

Physical Smart Card Transactions. Typically, local cardholder functions include a consumer card interface. Display and accept/cancel options are performed at the client terminal. Payment functions, including security card control, data storage, and the use of a concentration point, are performed by a payment server. The presentation and eventual delivery of goods and services by a merchant are performed under the control of a merchant server. The Internet performs routing functions between each entity. It should be appreciated that the Internet may include its present form or it may include any other open network implemented using a combination of computer, telephone, microwave, satellite, or cable networks.

The client terminal controls the interaction with a consumer and interfaces to the card reader that accepts a smart card having a stored-value application. The payment server communicates directly with a terminal or through a concentrator that handles a number of terminals each having a security card. The payment server also communicates with the concentration point for transmission of transaction data to a clearing and settlement system. The database stores all the appropriate information passing through the payment server for each transaction. Use of such a database allows any number of merchants (or merchant servers) to use the payment server for transactions. The payment server controls payment functions such as handling attached terminals, managing the database, and collection functions. The merchant server is typically a site that has contracted with an acquirer to accept smart card transactions as payments for goods and services purchased over the Internet.

As discussed above, the smart card may take a variety of forms and is useful in many situations where it is desirable to store monetary value on a card that a consumer may use. Generally speaking, the smart card is any card or similar device able to store a value and decrement that value when the card is used. The card may be purchased complete with a stored value or a given value may be added to the card later. Such cards may also have their value replenished. The smart card may also perform a variety of functions in addition to simply storing value, for example, debit, credit, prepayment, and other functions. Such a card typically includes information such as a bank identifier number, a sequence number, a purchase key, a load key, an update key, an expiration date, a transaction ID, and a running balance.

The smart card may include an encryption module in order to provide a variety of security features. For example, security features may include simple PIN numbers, biometrics, simple algorithms, or sophisticated algorithms such as the Data Encryption Standard (DES) or Rivest Shamir Adelman (RSA) encryption. Typically, a smart card is able to use these features to verify consumers and card readers, to validate security cards, and to provide a unique digital signature. A smart card may include any number of keys which are known to the card issuer and that are used during the course of a payment or load transaction to generate digital signatures for validation of the stored-value card, security card or module, or the system itself.

The client terminal may be any suitable device for interacting with the card and for communicating over a network with a payment server and a merchant server. For example, the client terminal may be a mainframe computer, a workstation, a personal computer, a set top box, a kiosk, or any type of service payment terminal that a consumer might use to purchase goods and services. The client terminal may also be embodied in any portable device including a laptop computer, a cellular telephone (including GSM telephones), or a personal digital assistant (PDA). The card reader may be any suitable interface device that is capable of transferring information and commands between the client terminal and the card.

Typically, the client terminal includes a "client code module" and a "card reader module". The card reader module may be implemented using any suitable software and libraries for communicating with the card reader. Its actual implementation will depend upon the type of card reader used. The client code module controls communications between the client terminal, the card reader, the payment server, and the merchant server. The client code module may be implemented using any suitable software. For example, the client code module may be implemented using a combination of "C" code and a Java applet. The applet may be supplemented with parameters from an HTML page sent from the merchant server. The client code module is also responsible for controlling displays presented to consumers and for the interaction between the card and the card reader. This module also builds the draw request message after receiving all of the start-up information from the card and the amount of the purchase from the merchant server.

Typically, the payment server includes a payment code module and a terminal interface. As with the client terminal, the payment server may be implemented using any suitable computer, for example, a personal computer. There may be one payment server for each merchant server or a single payment server may service any number of merchant servers. There may be multiple payment servers for a single merchant. In addition, the payment server need not be remote from the merchant server but may be located at the same site and have a different Internet address. Or, the payment server and the merchant server may be implemented on the same computer. The payment server is designed to facilitate communications between the consumer's smart card and a terminal's security card.

The payment module may be implemented using any suitable code. For example, the payment module may be implemented using a combination of "C" code, "C++" code, and Java code. The payment module may be a multi-threaded process that can service multiple concurrent client applet transactions on demand. The module is responsible for controlling all interactions with terminals including the transaction collection function. For individual transactions, the payment module controls message flow and logs interim results. When an applet connects with the payment server, it creates a transaction thread to support the transaction through its life cycle. Each thread, in turn, assigns a terminal for communications. A one-to-one correspondence between transaction threads and terminals may provide good results.

Typically, the terminal interface is any suitable set of software and libraries for communications with a terminal either directly or through a terminal concentrator. The actual implementation of the terminal interface will depend upon the type of terminal used. For example, an IQ Delta 2010 terminal made by Schlumberger may be used. Such a terminal supports a variety of commands originating from the terminal interface. These commands emulate the normal responses from a smart card to a security card should both be located in the same service payment terminal. The actual security card commands are held in the terminal while the terminal performs the tasks necessary to simulate the presence of a smart card. The emulation of the card commands can be done by the payment server using the terminal as a card reader, or may even be performed by the client terminal.

Typically, the security card is any suitable security card such as those that are known in the art (often referred to as a Purchase Secure Application Module or PSAM). The functionality of the security card may be replaced by a crypto-engine (as is done in VirtualSAFE), may be implemented in hardware within the payment server, or may be implemented in software. For example, the security card may be a removable credit card-sized smart card that is programmed to process and store data relating to financial transactions. The security card may contain a microchip embedded in the card that enables the card to authenticate and to validate the consumer's smart card. If the consumer smart card is acceptable to the security card, and if the smart card contains sufficient value, then the security card guarantees that the merchant providing goods and services will receive payment in the amount deducted from the smart card. The security card may also contains DES and public key purchase security keys, may authenticate the smart card during a purchase transaction, and may secure the payment and collection totals. A security card may also store digital signature algorithms for all smart cards in use. A security card may also contain a transaction identifier for the current transaction, a financial sum of all transactions remaining to be settled, a session key, and master keys for all smart cards in use. Further, the security card may contain generations of keys, blocked card indicators, dates of last update, multiple card programs, different currency rates, and additional security.

The concentration point is typically a staging computer that communicates with a payment server to collect batches of purchase transactions. The concentration point then sends these transaction batches to a clearing and settlement system for processing. Once processed, batch acknowledgments, along with other system updates, are returned.

Typically, the merchant server includes a merchant code module. The merchant server may be implemented on any suitable computer capable of communicating with and presenting information to consumers over the Internet. The merchant code module may be implemented using any suitable code. For example, the merchant module may be implemented using a combination of Perl, HTML, and Java code. The merchant server is typically a generic web server customized for the merchant's business. The merchant server may include databases, CGI scripts, and back-office programs that produce HTML pages for an Internet user.

During a financial transaction, the client terminal and the merchant server exchange information via the Internet. Each transaction initiated by a consumer has a transaction identifier created at the merchant server. A merchant identifier unique to the payment server is also available from the merchant server. The client code module and the payment server also use this unique transaction identifier for tracking and logging information about the transaction. The merchant server generates a unique identification for the transaction, completes other required parameters, encrypts as appropriate, and builds an HTML page and sends it to the client terminal. The client code module interacts with the smart card and builds a "draw request message" containing related card information, the purchase amount, and other information supplied by the merchant server.

Next, the client terminal communicates with the payment server by first forwarding the draw request to the payment server. The payment server verifies the transaction to determine if it is a valid transaction from a known merchant. The transaction is logged in the payment server's transaction database. Upon completion of a transaction, the payment server builds a result message containing the identification of the transaction and signs it. The message is then routed to the merchant server via the client terminal. The merchant server then validates the result message. After determining that the transaction was successful, the merchant server creates an HTML page for the purchased information and sends it to the client terminal. The merchant may also deliver purchased goods and services to the consumer at this point. It is also possible for the payment server and the merchant server to communicate information directly between them. As the client terminal has already established communication with the merchant server and the payment server, links are used to exchange information between the payment server and the merchant server, rather than establishing a new link.

Virtual Smart Card Transactions. Similar to transactions with physical smart cards, the system includes the client terminal, the payment server, and the merchant server. However, the system dispenses with the need for the physical smart cards and card readers as their functionality is contained within the VirtualSAfE server 108. In VirtualSAFE, the client code module is functionally part of the VirtualSAFE server 108 instead of being part of the client terminal. And, the functionality of the card reader module for transactions with physical smart cards is included in the client code module to allow communication with a "pseudo technology process module" (see below). Also, the user interface functionality of the client code module is transferred to a client terminal module in the client terminal. In this embodiment, a "pass through" client code module serves to "pass through" communications between the merchant server and the VirtualSAFE server 108.

Again, the VirtualSAFE server 108 effectively replaces the need for physical smart cards and card readers. To achieve this, the server 108 implements a "pseudo technology process module" and smart card emulator in software. A card database stores information representing "virtual" smart cards 106 (see below) in use within the system. The card emulator interacts with the card database and a crypto-engine (CEV) 109 (see below) to effectively replace physical smart cards and card readers. Thus, the client code module may be implemented as before unaware that it is interacting with a software emulation of a smart card rather then with a physical smart card.

The VirtualSAFE server 108 stores the same data used with physical cards in its database and handles incoming commands from initiation or payment servers to increment or decrement a "card" balance as appropriate. Important data is stored in encrypted form and all functions that require a change to important data or the generation or checking of digital signatures is performed by the CEV 109 (see below). The VirtualSAFE server 108 is typically located at an issuer's site. One such server may support multiple issuers provided appropriate safeguards are in place to partition data.

Furthermore, to support interoperability with existing financial networks, including different credit card vendors, financial institutions, and processing gateways, the VirtualSAFE server 108 may be located at an acquirer's site. This configuration does not change existing transaction flows and does not require additional investment to secure the financial network.

In an alternative embodiment, the client terminal includes a card reader and a smart card. In this embodiment, the client terminal includes a client code module with "pass through" functionality. The system may operate in either of two modes. The system may operate without using a physical smart card by using the emulation contained within the VirtualSAFE server 108. Concurrently, or at a later date when smart cards and readers are more common, the system may be upgraded to make use of a physical card and reader attached to the client terminal.

The VirtualSAFE server 108 communicates with the client terminal through a "user verification module" and with the payment server over a link. The server 108 emulates a physical smart card through the use of the pseudo technology process module, a "smart card emulator", the crypto-engine (CEV) 109, and the database 105, 106, 107, 114, 115.

The user verification module allows the VirtualSAFE server 108 to identify which user is logged on to the system and desires access to a virtual card in the database. The module provides a login procedure that requires a secret user identifier and PIN from each user. A combination of this user identifier and PIN is then used as an index into the database to identify the record that represents the virtual smart card 106 for that user. The user verification module may also include the card identifier (digital certificate digital signature) for the user, the funding account and its expiration date, and address information for address verification during the funding portion of the initiation transaction. An address verification system may compare billing information from an authorization to that on file to assure that the real cardholder is making the transaction.

The pseudo technology process module is a software module that performs the functionality of a physical card reader so that the emulation of a smart card is transparent to the client code module. The card reader module accepts the actual card reader commands from the client code module and, instead of using them to drive a physical card reader, places them into a format to communicate with the smart card emulator that is emulating a smart card. Thus, an existing application programming interface (API) used by the client code module to communicate with a smart card may continue to be used. In an alternative embodiment, the card reader module and the emulator may be collapsed into a single functional block although this may require modification of the commands issued by the client code module.

The smart card emulator emulates a physical smart card by accepting and passing the incoming card commands from the card reader module and determining actions to perform. In the course of performing these actions, the emulator handles the interface to the CEV 109, fetches data from, and stores data to, the database. For example, upon receiving a command to debit a card, the emulator fetches the balance from the appropriate record in the database and transfers the encrypted balance to the CEV 109 to be decrypted and decremented. Once the new balance is encrypted by the CEV 109, the emulator receives the new balance and stores it back in the transaction secure database.

Once an action has been performed, the emulator generates a simulated smart card response that is then relayed via the card reader module and the client code module to the payment server. The emulator generates card commands that appear as if they have been generated by a physical smart card, thus making emulation of the smart card transparent to the rest of the system. The emulator also updates the secure transaction database 114 at appropriate steps in the processing of a debit or an initiation.

In addition to debiting or initiating a virtual card in the card database, the server 108 is able to credit a virtual card if the card was debited by mistake. In other words, once a card has been debited to make a payment, the server 108 is able to recover that value and credit the virtual card in the card database, if necessary. For example, if a transaction fails and value has been taken off the card, but no value has been credited to a particular payment server, the system is able to credit the virtual card in the card database to replace the lost value. Such an operation is different from a formal initiation command in that a user's card is credited for a value that had earlier been taken off the card.

VirtualSAFE's databases 105, 106, 107, 114, 115 may be implemented in any suitable format and contain records for each virtual smart card in use within the system. A secure transaction repository 114 and a secure data repository 107 include the information for each virtual smart card in use and thus assists in the simulation of physical smart cards. An identifier such as a user name, PIN, or combination thereof is used as an index into the database in order to identify the appropriate virtual smart card 106 for initiating, debiting, or authentication. Advantageously, the information contained in the database is typically stored in an encrypted form for security. In one embodiment, the database are implemented in Sybase.

Records in the database store a variety of data for each virtual smart card 106. This information includes initiation and purchase key identifiers, card and issuer certificates, initiation algorithms, initiation key versions, purchase algorithms, purchase key versions, a bank identification number (BIN), a VirtualSAFE Deposit Box (VSDB) 115 number, a transaction ID, a balance, a currency and exponent, an expiration date, and a maximum balance. Initiation and business public keys indicate which keys should be used. Although all keys may be stored within CEV 109, in one embodiment, the keys are stored within the secure data repository 107 as well, with the exception of the CEV master key that is stored in the CEV 109.

The secure transaction repository 114 stores information regarding transactions that occur such as a debit or an initiation and may be implemented in a similar fashion as the other databases. Also referred to as a history database, the secure transaction repository 114 includes a purchase table (i.e. log full of transactions and timestamps) and an initiation table (i.e. log full of transactions, funding request/response, and timestamps).

Crypto-Engine (CEV) 109. The CEV module 109 is used to facilitate cryptographic processing. As will be described below, the CEV 109 stores secret keys and encryption algorithms, performs cryptographic functions on secret data and generates digital signatures. Typically, the CEV 109 is a tamper-proof device that employs a level of physical security as means to protect the sensitive information contained therein. The CEV 109 may be suitable security module, for example, it may be similar to the security box typically attached to automatic teller machines. In another embodiment, the CEV 109 may be implemented on a smart card within a card reader, on a series of smart cards, on any suitably secure computer, or in software.

In addition to other tasks, the CEV 109 performs encryption for physical smart cards. For a physical smart card, various data elements such as balance and currency are contained securely within the card. However, such data elements are not stored within the CEV 109 but are stored in the server's 108 database. Typically, important information is stored in an encrypted form in the database. The CEV 109 performs the task of receiving encrypted card data from the database via an emulator, decrypting the card data, performing required cryptographic functions on the data, and then encrypting the data and sending it back out to be stored in the financial information database 114 and secure data repository 107. For example, if the card balance is to be reduced, the encrypted balance is sent from the database to the CEV 109 where it is decrypted, reduced, and then finally encrypted again before it is returned to the database.

The CEV 109 also performs cryptograph functions related to digital signatures used within the system. Digital signatures are used during the initiation operation and typically are generated by the smart card. Some digital signatures are used during an initiation or purchase operation and are generated by the issuer or the payment server. Some digital signatures are generated by the smart card on occurrence of an initiation or debit and are considered the final digital signature after the card has either initiated value onto, or debited value from, itself. In VirtualSAFE, the CEV 109 performs these functions which are normally handled by a smart card as no physical smart card need be present with VirtualSAFE. The CEV 109 is used to generate digital signatures and verify digital signatures for an initiation operation, and is used to verify digital signatures and generate digital signatures for a purchase operation. The CEV 109 may also perform other cryptographic functions that would normally be performed by a physical smart card.

Initiation algorithms are identifiers that identify which cryptographic algorithm of the CEV 109 is to be used for the verification and generation of digital signatures during an initiation. The initiation key version is an identifier identifying which version of a key will be used for the generation or verification of a particular digital signature. Purchase algorithms and purchase key versions perform a similar function during a purchase.

A six-digit BIN in combination with the ten-digit TEP forms a sixteen-digit "identification number" that uniquely identifies a particular virtual smart card 106. This identification number may also be referred to as a "card identifier". Each BIN, or card range, has a single maximum balance and currency for all of its virtual cards. The balance keeps track of the value for the particular card. Currency and exponent information provide further details concerning the balance. An expiration date provides an expiration date for the card. The maximum balance provides a maximum for the virtual card, or could also indicate a maximum balance for all virtual cards associated with a BIN.

Public-Key Infrastructure (PKI) 101. VirtualSAFE is compliant with PKI standards for X.509 v1 and v3 certificates, RSA cryptography, PKCS #11 certificates, S/MIME certificates, PKIX v3 extensions, and Secure Electronic Transactions (SET). The PKI process 101 consists of multi-tiered and distinct Certificate Authorities (CA) defined as follows:

1. An External Certification Authority (ECA) designated to issue web certificates to user client computers. Each user has an ECA key pair as follows:
   ECA Public Key (ECApub)
   ECA Private Key (ECApriv)

2. An internal VirtualSAFE Certification Authority (VCA) designated to issue corresponding internal VirtualSAFE certificates for each external user web certificate. Each user has a VCA key pair as follows:
   VCA Public Key (VCApub)
   VCA Private Key (VCApriv)

3. The VCA issues an encryption certificate to the VirtualSAFE Web Server (VWS) with the following key pair:
   VSW Public Key (VSWpub)
   VSW Private Key (VSWpriv)

As will be described below, VirtualSAFE has an Attribute Authority (AA) 104 designated for managing access and network permission attributes for users.

Redirection Link (RL) 102. The redirection link 102 allows non-repudiation by using digital certificates and a secure algorithm and protocol residing on a remote merchant or business site. The redirection link 102 enables an online e-commerce process to access VirtualSAFE's secure transaction environment. The associated process consists of the following steps:

1. The user completes the required conditions for executing a transaction, or request for a resource, by selecting and retrieving the appropriate access query page from a merchant server.
2. The access query will be in the form "buy now" for a payment transaction or "access now" for a secure resource access or retrieval.
3. The redirection link 102 will capture the relevant data from the merchant server and redirect the contents of the request to VirtualSAFE. In the case of any transaction/access any amount/session unique identifier may be transferred. In the case of a resource access request, user attributes may be transferred to Virtual SAFE.

The redirection link 102 allows non-repudiation by using X.509 certificates and a secure algorithm and protocol residing on a remote merchant, business, or resource site. The redirection request, once processed, initiates the Secure Remote Pointer (SRP) 103 process for encrypting, signing, and hashing transferred data. The SRP 103 is described below. The merchant and/or user can digitally sign the transaction.

Secure Remote Pointer (SRP) 103. The SRP 103 is a composite secure algorithm and protocol residing on a remote site (i.e. VirtualSAFE, merchant, user or any other entity) that provides encrypt/decrypt and digital signing timestamp functionality for communicating with VirtualSAFE. The SRP 103 is a VirtualSAFE compatible application that runs as a web browser plug-in, applet, or standard application. The client browser, to conduct secure communications with VirtualSAFE, uses the SRP 103. The process is initiated when the user clicks on a redirection link (RL) 102 that requires an authentication and authorization check. Clicking on this RL 102, as described above, implies a commitment to access a resource, for example, a payment transaction or a secure database. In order to execute a transaction, authentication of the user is required. The process requires authentication of the user computer via an X.509 Digital Certificate or other standard PKI format. Once authenticated with a digital certificate the user, application, or browser will always communicate with VirtualSAFE via the secure web browser plug-in or the SRP 103 or application. The security approach to the SRP 103 includes multi-layer security via encryption and enveloping techniques. The SRP 103 functions include encryption of data that will be packaged and then encrypted via secure sessions in addition to an SSL communication channel with the VirtualSAFE database to complete transactions and store operational data, or for other accesses purposes.

Figure 2:
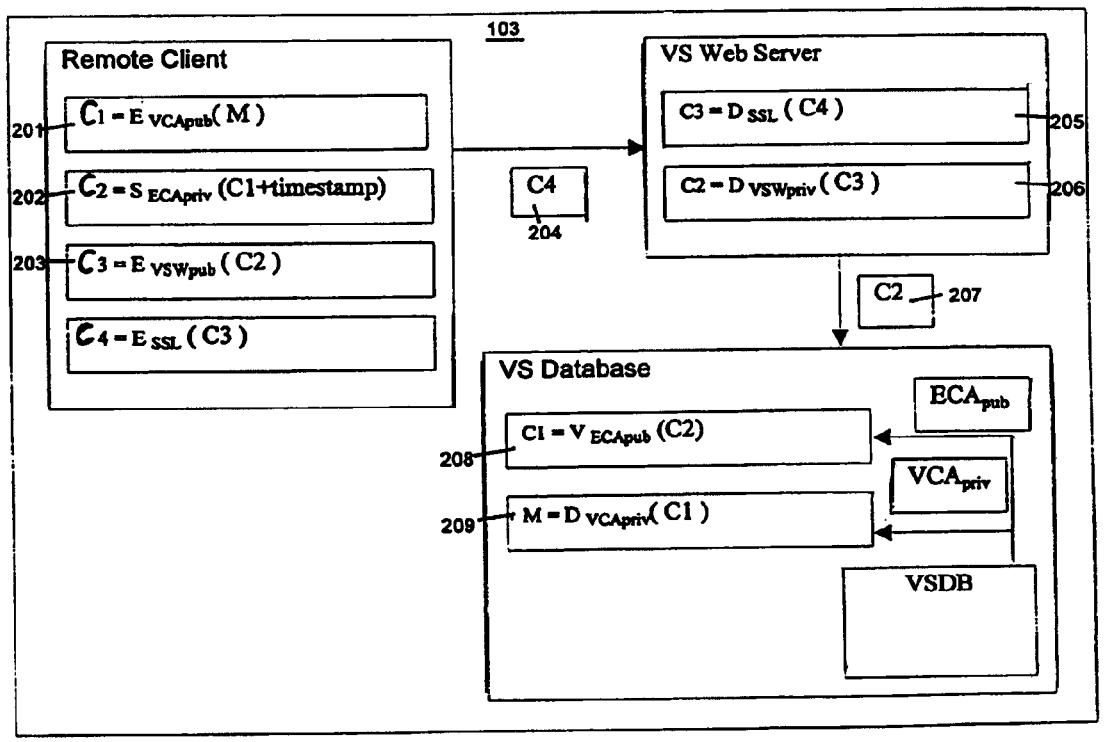
FIG. 2 is a flowchart illustrating the operation of the secure remote pointer component of VirtualSAFE in accordance with an embodiment of the invention.

Referring to FIG. 2, there is shown a flowchart illustrating the operation of the secure remote pointer (SRP) 103 in accordance with an embodiment of the invention. In order to securely capture and store data from the customer, the following steps and requirements are incorporated in the SRP 103:

1. The entire communication will take place over a client-server in addition to an authenticated SSL channel. Two-way authentication is established using the digital certificate distribution method described above.
    a) The SRP 103 will encrypt data being transmitted to VirtualSAFE prior to being placed in an electronic envelope. The envelope in turn will be transmitted over the secure session in addition to an SSL channel protocol. (Encrypted data is sent in accordance with VirtualSAFE policy through the SSL.)
    b) The VCA Public-key, VCApub, of the user that is stored in the browser, application, message, or cookie is used to encrypt data once, creating C1 201.
    c) A time stamp is concatenated to the encrypted data package C1 201, the ECA private key, ECApriv, belonging to the user signs the data to create C2 202.
    d) The result is encrypted with the VirtualSAFE Web Server Public-key (VSWpub) to create C3 203. This key can be obtained by the SRP 103 or in the case of dynamic application that will be transmitted with an ActiveX Control/Java Applet/Application, etc., at the time of page initiation.

2. Encryption and signing of the data package is completed entirely within the secure confines of the SRP 103. The following steps are carried out to securely communicate with VirtualSAFE.
    a) C3 203 is transmitted as C4 204 over SSL or other secured channel encrypted with the appropriate session keys.
    b) The data package C4 204 is decrypted 205 by the reciprocal SSL, or secure channel session keys, at the VirtualSAFE Web Server to reveal C3 203.
    c) The VirtualSAFE Web Server/Application will decrypt 206 the data package with its private key VSWpriv locally on the Web Server to reveal C2 202. Optionally, this may be performed by a VirtualSAFE Application behind the Web Server.
    d) The data is now ready to be used locally within VirtualSAFE.
    e) The data package C2 202 is passed 207 to the User's VirtualSAFE Deposit Box 115.

3. The data package in its new form may now be used by VirtualSAFE for various different operations including:
    a) Authentication. Data received for authentication is treated as an encrypted quantity that does not need to be decrypted. The encrypted data is compared with a database of encrypted PINs in the Virtual SAFE.
    b) Transaction. The VirtualSAFE private-key VCApriv of the customer is used to decrypt the transaction data received at the time of purchase. The encrypted private information of the customer in the customer repository is decrypted and hashed or encrypted, or digitally signed and sent to the payment processor, or other transaction engine. The VirtualSAFE Private-key (VCApriv) is used to decrypt the local customer credit information for the transaction. The credit information will then be passed to the payment processor or other transaction engine. The information may be optionally signed by the customer, hashed or encrypted by an administrator. The payment configuration will determine future processing and the necessary encryption or digital signing for the data.

Attribute Authentication Authority (AA) 104. The AA 104 is an internal and external VirtualSAFE module that enables the assignment of authorization to users and applications to access network resources, and remote non-repudiation providing valid digital signature and verification mechanisms for new or existing financial and other information infrastructures.

The implementation of a remote electronic commerce application requires managing access to electronic resources. The core value of an e-commerce application lies in the ability to manage identities and the associated privileges attached to these identities. In traditional approaches to PKI, a Certification Authority (CA) issues and revokes certificates used to bind a name to a public key. However, the existing certificate structure requires an existing name space where each individual is uniquely identified with a unique name and often a unique number. In e-commerce transactions, the merchant server may be assured of the customer's identity by means of digital certificate verification. However, the authorization of the customer identity to actually perform the transaction (or other access privilege) is not necessarily a given. Advantageously, VirtualSAFE provides a means for the merchant to be certain that the actions to be undertaken are legally binding and the signer indeed has the authority to execute them.

In VirtualSAFE, digital certificates are enhanced by including attributes that provide or grant a privilege to its owner. The benefit of this approach makes the attribute certificate well suited for system access control or authorization control.

By definition, access control entails the limiting of activities of a user on the system. Enforcement of such controls is accomplished by maintaining a reference monitor that mediates access attempts by consulting an authorization base to determine if the user attempting the access is authorized to gain access. A distinction is made here between authentication and access control; authentication confirms the identity of the user, while access control establishes identity privileges on the basis of successful authentication.

Access control may be deployed in one of two modes, namely, an activity-based mode or a group-based mode. In the activity-based mode, user access control is managed according to activity monitoring where each access is checked against an authorization table and permissions are granted or denied on that basis. In the group-based mode, user access control is based on the group to which a user belongs. Users of the same group are authorized to perform a specific set of system tasks or actions. Instead of specifying all the individual user authorizations, actions are assigned according to the group such that an individual user may perform the tasks assigned to the user's group.

Group-based access control is characterized by the following:

1. Authorizations are defined according to classes of objects or resources where a member of a group may be authorized to access a particular resource. This enables a class of resources to be accessible to a group of users without specifying individual resource access privileges.
2. Access to specific resources are defined by the activities required by a particular group. A group is defined by its authorizations and a user may be afforded access rights according to a group designation.

3. Groups may be nested in a hierarchical order wherein higher-class groups may inherit lower-class group authorizations.
4. Minimum access may be granted on the basis of a minimum group characteristic. Access for lower risk resources may be afforded by assigning a lower class role.
5. Access privileges can be specified according to Boolean constructs wherein several group authorizations may be afforded to a user to achieve a composite access portfolio.

A group-based model is advantageous on several levels. For example, overall administration is shifted to the group level from the individual user level.

A user may have several authentications including the following:

User authentication as described with respect to the authentication authority module 104 below. In addition, an enrolment value is exchanged between VirtualSAFE and a secure portal with a resource group. Any transaction/access session is performed by a minimum of two channels simultaneously (e.g. SSL and VPN, etc.), combining enroll value and session value digitally signed by all parties based on a digital identity group (i.e. secret, shared-secret, physical material).

Account/Resource digital signature authentication based a digital signature verified by a user public key attached to the account/resource.

The digital certificate infrastructure is well suited for this approach to access control. In the standard digital certificate, a public key is signed by a Certification Authority (CA) and distributed for authentication purposes. The same principle is applied to group-based access control. In this method, a group is described by a set of attributes that enable the members of the group to perform common functions. The attributes are bound together by a digital signature by a CA, creating an Attribute Certificate (AC), which is consequently unalterable until a new set of attributes is designated and signed. The Attribute Certificate may contain the following fields:

Version: Designates format of the AC currently in use.
Subject: Context of the AC usage in terms of the given application.
Issuer: Issuer of the certified AC.
Digital signature: Digital signature of the AC data by the Issuer.
Issuer Unique ID
Serial Number: A unique identifier of the AC.
Expiry: Defines the validity period of the AC.
Attributes: Access control definitions for the AC.

The attribute authentication authority (AA) 104 is advantageous for authentication and authorization of business processes. Typically, existing business processes use some means of account-based protocol to evaluate attributes. However, these methods are reliant on knowledge factor authentication where the user divulges a previously agreed secret. That is, typical business processes supporting authentication are primarily "shared-secret" based (e.g. PINs, mother's maiden name, SIN#, SSN#, etc.). The "shared-secret" has the disadvantage that the shared-secret can both originate as well as authenticate a transaction (i.e. existing business infrastructures need extra levels of security to prevent divulging the shared secret). Upgrading these existing authentication business infrastructures to PKI is straightforward and eliminates the vulnerability associated with divulging the authenticating value.

Advantageously, VirtualSAFE includes a straightforward upgrade to existing "shared-secret" authentication processes to a "secret", "shared-secret", and "physical material" authentication process using existing business processes. By including an Attribute Certificate in a transaction, the authentication of the user is enhanced. Consider the following access control system, which is in accordance with an embodiment of the invention:

1. A Trusted-Third Party Certification Authority CA(x)
2. An Authentication Authority AA(y)
3. Organization Resource R(1), R(2), R(3), R(4), ... R(n)
4. Groups described by attributes G(1), G(2), ... G(n)
5. Users designated as U(1), U(2), ... U(n)

The Certification Authority CA(x) is capable of issuing public key certificates and of signing the root issuing certificate of the Authentication Authority AA(y). Resources are classed and labeled such that access to resource R(1) is distinct and non-connected with R(2), or any other resource R(n). Each group G(n) is assigned authorization to access a particular set of resources based on policy, for example, G(1) may access R(1), R(3), and R(4).

In this embodiment, a method by which an authorization environment for resource access is made instantaneous, may include the following steps:

1. The root certificate CA(x) is distributed to all users U(n) and resources R(n).
2. The root certificate AA(y) is also made publicly available.
3. Authentication Authority AA(y) is able to issue ACs to all users U(n) in G(n).

To exercise a resource access authorization, the following steps may now be followed:

1. An access request to resource R(1) is made by a user member U(1) of group G(1), where G(1) is granted access to R(1), R(2), and R(4), and is digitally signed by the user.
2. Resource R(1) verifies the digital signature of U(1) with U(1)'s public-key certificate.
3. Resource R(1) checks the validity of U(1)'s certificate by verifying the digital signature with CA(x)'s root certificate.
4. The AC of U(1) is verified using AA(y)'s root certificate.
5. The attributes in U(1)'s certificate are then used to grant access, according to the group membership of U(1), to G(1) which includes R(1) access.

Given the successful verification of these queries on U(1)'s AC, then the result will be either to deny access or to grant access on the basis of identity authentication and appropriate access authorization.

Virtual Identity (VI) 105. The VI module 105 is a composite secure algorithm and protocol for creating a digital certificate based virtual identity based on the above described secret, shared-secret, and physical material process. VI 105 includes the use of X.509 Digital Certificates in the internal VirtualSAFE Certification Authority (VCA), as described above. VI 105 also includes the following:

1. The Web certificate from a third party or ECA public and private key of the user:
   Public Key (ECApub)
   Private Key (ECApriv)
2. The VirtualSAFE CA public and private key of the user:
   VCA Public Key (VCApub)
   VCA Private Key (VCApriv)

3. The private data of the user is encrypted with the user's public key (VCApub) and committed to the local database.
4. The user's private key (VCApriv) is stored securely elsewhere in Virtual SAFE.
5. VirtualSAFE then executes a retrieval of the information in the Virtual Identity 105 by employing a composite secure algorithm and protocol described below in conjunction with the Virtual Smart Card module 106. The retrieval and storage of the secure data is performed on the basis of a secret, shared-secret, and physical material process.
6. The user data stored in the Virtual Identity 105 may include the following:
   Encrypted PIN and other access data
   AA Reference Data
   Personal User Data
   Financial User Data Virtual Smart Card (VSC) 106. The Virtual Smart Card module 106 enables authentication and secure, isolated encrypt/decrypt and digital verification functionality. Remote or roaming VirtualSAFE digital certificate storage is an important part of this configuration. The VSC module 106 is an internal VirtualSAFE application that acts as a local secure proxy to an external virtual authentication token accessed via the Secure Remote Pointer (SRP) 103. The VSC 106 authenticates, encrypts and decrypts VirtualSAFE user data using a multi-tiered Public Key Infrastructure (PKI) 101 managed service. The VSC 106 implements a multi-tiered PKI by designating a dual set of key pairs for each user. As described above, the first set is an External Public-Private key pair, issued by the External Certification Authority (ECA), which resides on the client or web browser and interoperates with the SRP 103. The second set is a local VirtualSAFE Public-Private key pair issued by the VirtualSAFE Certification Authority (VCA) that resides securely and inaccessibly to the outside network within VirtualSAFE. The Virtual Smart Card (VSC) 106 is part of VirtualSAFE's secure backend Virtual Identity 105 management system. As described above, a system in which VirtualSAFE is deployed typically includes the following:

1. Client Terminal. The client terminal typically includes a personal computer with network interface communication capability, and a World Wide Web browser application. The client terminal runs the Secure Remote Pointer 103 that makes a secure connection with the merchant server.
2. Merchant Server. The merchant server (i.e. WWW server) is configured to serve web pages. The merchant server can serve pages related to an e-commerce shopping-cart application or it can serve pages relating to the access of controlled resources (e.g. documents, applications, etc.).
3. VirtualSAFE server 108. The VirtualSAFE server 108 includes the VSC process 106 and the requisite VirtualSAFE Deposit Box 115 (see below) containing Virtual Identities 105.
4. Payment Server. The payment server (i.e. fulfilment resource) is in communication with VirtualSAFE and may include of any valuable or sensitive services or systems, including but not limited to payment servers, secure data repositories, or other information.

The method by which the VSC 106 is accessed by the remote client terminal and by which it executes an online interaction is as follows:

1. A communication channel is opened between the client terminal and the merchant server. The client terminal is presented with content from the merchant server. The user browses this content for items and makes an access decision. In the case of an e-commerce application, this is equivalent to browsing an electronic shopping cart application and composing a list of items for a purchase decision.
2. Upon making an access decision, a signal to actuate a resource access process on behalf of the user is transmitted when the customer clicks the Redirection Link 102 on the merchant server's resource decision web page.
3. The merchant server communicates the requirement to execute the resource access process to the VirtualSAFE server over a secure channel whereby authentication is initiated between the client terminal and VirtualSAFE.
4. VirtualSAFE initiates Virtual Smart Card (VSC) 106 authentication by immediately downloading the Secure Remote Pointer (SRP) 103 to the client terminal.
5. The SRP 103 requires PIN and PIN authentication from the user.

The VSC module 106 includes a multi-tiered authentication mechanism that consists of the elements described above with respect to PKI 101, that is, the ECA, VCA, and AA.

The VSC 106 may be initiated through the following method:

1. A User VCA Public-Private key-pair is generated by VirtualSAFE and stored as follows:
   a) The VCA public key (VCApub) is combined with the Certificate Digital Signature from the External Public Key Certificate, ECA, and used as a unique identifier or footprint.
   b) This combined unique identifier and digital certificate data is stored in an online application, browser cookie, or dynamic header of a web page, and automatically downloaded to the client terminal or web browser.
   c) The unique identifier and digital certificate data is also stored with the user's Virtual Identity (VI) 105 in the user database. As the database's user information is entirely encrypted, the unique identifier and digital certificate data, as described, is used as a search index in order to retrieve encrypted information about a particular user.
   d) Every query communicated to the VSC 106 from the SRP 103 contains the user's unique identifier and digital certificate data for identification purposes. Note that the data from the SRP 103 is signed and encrypted to help prevent fraud.
2. All the user data stored in the VirtualSAFE database is encrypted with the individual user's VirtualSAFE private key (VCApriv). Any key that is external to VirtualSAFE cannot decrypt the local data, for example, the ECApriv key. The VCApriv key is stored securely in VirtualSAFE, apart from the VSDB 115.
3. When a query is made via the Secure Remote Pointer (SRP) 103 it can arrive in either of the following two forms (as described above with respect to the SRP module 103):
   a) Authentication. The SRP 103 query composed of a data package C1 is decrypted 208 (see FIG. 2) and verified for use by VirtualSAFE as described above.
   I. In this case the data contained in the data package is the user footprint and the verified but still encrypted (with VCApub) Personal Identification Number (PIN) from the remote client terminal.

II. The user footprint is used to locate the VirtualSAFE database Virtual Identity 105 of the particular user.

III. Upon retrieval of the VI 105 of the particular user, the encrypted PIN from the SRP 103 is compared to the PIN in the VI 105 record.

IV. If the encrypted data fields match, then an authentication is affirmed, and authorizations associated with this VI 105 are requested from the AA 104.

V. The remaining authorizations are queried and verified as described above with respect to the Authentication Authority 104.

b) Transaction. The SRP 103 query composed of a data package C1 is decrypted and verified for use by the VirtualSAFE as described above.

I. In this case, the data contained in the data package is the user footprint and the verified but still encrypted (with VCApub) resource access query C1 from the remote client terminal.

II. The user footprint is used to locate the VirtualSAFE VSC 106 and Virtual Identity 105 for the particular user.

III. Upon retrieval of the VI 105 for the particular user, the encrypted resource access query in C1 from the SRP 103 is decrypted 209 (see FIG. 2) with VCApriv that reveals message M.

IV. The message M contains formatted instructions for VirtualSAFE to perform some transaction or resource access.

V. In order to carry out the transaction or resource access the local VI 105 data must be decrypted with VCApriv. Upon decryption of user data, the transaction must be authorized by the AA 104.

VI. The transaction authorization is queried and verified as described above with respect to the authentication authority module 104.

VII. The transaction or resource access is executed.

VIII. The decrypted VI 105 data is destroyed, and the existing user VI 105 record remains encrypted in the VirtualSAFE Deposit Box 115.

IX. Results of the transaction or resource access are returned to VirtualSAFE and the VI 105 record is updated and encrypted/hashed.

X. A confirmation of the transaction or resource access is communicated to the client terminal via the SRP 103 and merchant through a dedicated channel or another form of messaging.

The Virtual Smart Card (VSC) 106 process may be used in the context of a Point-of-Sale (POS) card-swipe terminal at a merchant's store or shop, as follows. Assume that the customer maintains an account with an existing financial institution. The following steps may be included in the use of the VSC 106:

1. The merchant swipes the magnetic stripe customer debit or credit card at the POS terminal.
2. The POS terminal transmits a request for authorization through the financial network. A connection is made to an intermediate smart card reader at the merchant's store or shop.
3. The smart card reader includes the merchant's smart card.
4. The transaction authorization request from the POS terminal prompts the smart card reader to encrypt and sign the data prior to transmission.
5. VirtualSAFE requires a PIN identification to authenticate the customer.
6. VirtualSAFE performs an authentication of the customer using the Virtual Smart Card process 106 (as described above).
7. The customer is authenticated.
8. VirtualSAFE sends an encrypted or digitally hashed and signed transaction request to the financial institution or to an Interac switch.
9. An authorization message is returned to VirtualSAFE or to the merchant.
10. The authorization message is decrypted by the smart card reader.
11. The authorization message is returned to the POS terminal.

The Virtual Smart Card (VSC) 106 process may also be used in the context of check processing, as follows. Assume that the customer is already enrolled in VirtualSAFE. The following steps may be included in the use of the VSC 106:

1. The customer requests a payment be made to a merchant using a VirtualSAFE check by clicking the appropriate Redirection Link (RL) 102 on the merchant's web site.
2. The customer is forwarded to VirtualSAFE.
3. VirtualSAFE performs a remote authentication of the user and passes the customer to their VSC 106.
4. The customer approves a check payment from their personal financial credit portfolio.
5. VirtualSAFE signs the data request and sends it to the financial institution.
6. An optional printout of the check is generated inside the physically secure facilities of the financial institution.
7. VirtualSAFE receives confirmation of check status (e.g. processed, returned, NSF, etc.).
8. VirtualSAFE encrypts and stores the transaction data in the customer's Virtual Identity 105.
9. An optional message or printout of the transaction is forwarded to the customer or merchant.

Secure Data Repository 107. The secure data repository 107 is an internal VirtualSAFE module that enables secure storage of dynamic and/or static application data, using a unique PKI based encryption scheme 101 and different crypto-engine security 109, in the same database. Existing standards and business practices allow VirtualSAFE to maintain an internal secure data repository of certificates in optimized format as long as the original certificate format can be exactly reproduced bit-for-bit. These optimizations are implementation dependent for specific operations and may contain a combination of data compression and/or field elimination.

VirutalSAFE includes the following Database Repositories (DR):

1. VSC/Customer Database. This DR is controlled by VirtualSAFE and contains customer Virtual Identities (VI) 105.
2. VSC/Merchant Repository. This DR is controlled by VirtualSAFE and interfaces with a designated payment server (or other fulfillment resource).

The VSC/Customer and Merchant Repositories are interlinked based on the business rules and policies defined in accordance with business requirements. The VSC/Customer Repository is a composite of customers' VI 105 records. These records include all personal, financial, and credit data belonging to each customer.

VSC/Merchant Repository is based on a fixed schema developed for payment and contains merchant data profiles.

The VSC/Merchant Repository also contains payment transactions in various states of completion with a credit payment processor. These states may include the following:

Validated

Failed

Settled

These states may be managed, voided, cancelled, etc., and queries, such as retrieving transaction history, return various responses including transaction content which may include the following:

Payment Server Transaction ID

Credit Card Number

Expiry Date

Amount

Transaction Date

Transaction Status

External financial systems are securely interfaced with VirtualSAFE in that transaction communications are digitally encrypted and signed.

Payment Processing Engine 110. The payment processing engine 110 enables the processing of financial transactions with remote payment providers. The payment processing engine 110 may include a server and connectivity to a payment gateway that supports wherein the servers support VirtualSAFE's compatible client-server SSL authentication. Payment processing may include the following: credit card payment, debit card payment, direct debit, check processing, wire, and EFT. Payments in VirtualSAFE may be processed in several modes including batch processing and real-time processing. Each mode achieves the same set of possible results from a payment request, whether it is authorized, settled, or declined. Real-time processing is achieved by executing a single payment request in real-time while the customer is connected. VirtualSAFE's payment processing engine 110 may support several transactions including the following:

Credit Card Authorization

Address Verification

Payment Submission

Payment Settlement

Transaction Void

Transaction Credit

Draw Request Messages. In the follow, a detailed description of one method for processing a draw request message in conjunction with a virtual smart card is presented. Recall that draw request messages were introduced in the description of the VirtualSAFE sever 108 above.

Once a draw request message has been received by the payment server and passed along its terminal, the terminal parses the message back into individual responses and passes these responses sequentially to the virtual smart card. In an alternative embodiment, a dumb terminal is used and the draw request is parsed into its components and otherwise processed by the payment server, which then sends the responses to the virtual smart card itself.

The payment code module of the payment server edits the draw request for syntactic correctness and logs the draw request message as being received. The draw request is passed to the terminal interface of the payment server. In one embodiment, the terminal interface then requests a terminal from the payment server's terminal pool. The payment server may have a pool of terminals connected to a terminal concentrator that is established at start-up. At start-up, the payment server receives a list of all valid terminal identifiers. The payment server uses these identifiers and its knowledge of transactions in progress to determine an appropriate terminal to process the transaction. Once a terminal is determined, the terminal interface builds a terminal specific message based upon the draw request and the type of terminal.

The terminal specific draw request is sent to the chosen terminal over a local area network. A concentrator may act as a router between a transaction thread in the payment server and a corresponding terminal if many terminals are attached to the payment server. The concentrator looks at a header on the draw request to determine to which terminal the transaction should be routed. In one embodiment of the invention, the concentrator is not necessary and the payment server communicates directly with the terminal.

The terminal parses the draw request message into its various components and processes each component in turn to emulate a card interacting with the virtual smart card in a physical terminal. Prepackaging of a variety of data into the draw request message results in fewer exchanges over the Internet between the VirtualSAFE server 108 and the payment server. By simulating an interaction, the virtual smart card behaves as if it were in a physical terminal along with an actual smart card. A variety of responses from a smart card may be emulated. In one embodiment, the terminal sends each of the two commands "Answer to Reset" and "Initialize IE-W for Purchase" down to the virtual smart card individually and waits for a return message, "Debit IE-W," before sending the next response. For a public key transaction, the certificates read by the client are also included as individual responses. In this way, even though all of the smart card information (the draw request) originating from the VirtualSAFE server 108 has been sent at once in prepackaged form over the Internet, the interaction between the smart card and virtual smart card in a physical terminal is simulated at the terminal in a remote location.

The terminal reaches a "draw amount" state, indicating that the virtual smart card is able to generate a debit command. The virtual smart card generates its virtual smart card digital signature and the command "Debit IE-W". The digital signature and debit commands are sent to the terminal. The debit command issued by the virtual smart card may contain a wide variety of information including the virtual smart card identifier, the transaction identifier, the amount to be debited, the currency and currency exponent for the amount, the virtual smart card digital signature, the date, time, and location. The terminal in turn sends the digital signature, command, and the terminal identifier to the payment server.

Risk Management Engine 111. The risk management engine 111 is determines transaction validity using detailed heuristic processes.

Certificate authority digital signatures are not only expensive to manage and computationally burdensome, but they place the issuer, typically a bank, in a risky position. In a Certification Authority Digital Signature (CADS) model, the compromise of a Certification Authority's (CA) private key can be catastrophic. For example, bogus certificates may be issued and fraudulent transactions initiated, all seemingly authorized by the CA. To remedy such a problem, the CA may have to re-issue certificates to every certificate holder and put every previously issued certificate on a CRL. While a breach is undetected, the CA is in a very risky position. Consequently, Certification Authorities guard their private keys with expensive physical and procedural security measures.

The Account Authority Digital Signatures (AADS) model, on the other hand, carries no systemic risk. Without digital certificates, there is no technical need for a bank to have a private key. Most likely, any bank involved in PKI transactions will likely have a private key, but no certificates (or hierarchy of certificates) are inherently dependent on the security of that key in the AADS model. As attractive as AADS may sound, it will never eliminate the need for digital certificates. In cases where two parties have no prior relationship, third-party certification makes sense. For example, consider a retail customer wanting to open a new account with a bank over the Internet. The concept of a third-party certificate would aid the bank tremendously in making quick work of the electronic sign-up process. This resembles the role that credit bureaus play today.

Third-party digital certificates will exist. Account authority digital signatures do not preclude the use of CADS. They rely on the same cryptographic operations to validate digital signatures. The latter simply requires additional steps in the validation process. An account authority can easily become a certification authority by applying its digital signature to a customer's public key rather than storing the public key in the account record. If an account authority wants to support trust propagation by issuing certificates, it should, but it should do so based on a conscious business decision. By requiring certificate authority digital signatures, as most existing methodologies do, banks are thrust into the position of propagating trust via digital certificates. It is no longer a business decision but a technical requirement. Banks may not want to take on the risk of trust propagation. As account authorities they don't have to, and they can still remain central to the transaction processing business.

VirtualSAFE's risk management engine 111 augments the payment processing functionality by providing intermediate vetting of transactions prior to execution by a remote processor. Credit Risk Management occurs in different scenarios of customer enrolment, management, and payment processing. An individual customer's credit rating is used to determine acceptability of payment transaction processing. This value is collected either at enrolment time or during a profile update. It is retrieved by calling the local database using various information fields belonging to the customer. The risk value returned is stored in the VSDB 115. At transaction processing time, the credit value rating is retrieved from the VSDB 115 and used to evaluate whether a transaction should be transmitted to the payment processor. VirtualSAFE maintains ongoing transaction logs or a system transaction journal. That is, any transaction (e.g. payment, customer profile modification, etc) executed using VirtualSAFE is stored along with the information identifying the transaction, issuer, date, resources affected, and Registered Resource Site status.

Transaction Fulfillment Mechanism (TFM) 112. The transaction fulfillment mechanism 112 is completes e-commerce transactions by means of a secure connection with fulfillment providers. The TFM 112 includes a set of fraud management heuristics that are invoked in a progression that leads to a final fulfillment condition. The fulfillment condition will dictate what type of delivery is to be made and the associated criteria for completion. The TFM 112 and fraud management heuristic is comprised of several steps including the following:

1. Customer Authentication Scoring
2. Credential Identification Scoring
3. Transaction Risk Scoring
4. Fulfillment Response
5. Fulfillment Delivery The first three of these steps are combined to achieve a transaction score that is used to determine the fulfillment response and type of fulfillment delivery. Each step is mutually exclusive with the combined result determining fulfillment completion. The above steps may be described in more detail as follows:

Customer Authentication Scoring. This step is initiated by compiling the browser logon criteria into a composite score. Elements from the browser logon that may be considered include the following:

Certificate Authentication
Secure Cookies
PIN or PIN value
SRP Verifications
Other Credential Identification Scoring. This step creates a composite score based on the identifying elements in the order information. Each are weighted and summed based on various criteria which may include the following:

Address
Amount
Over Limit
Declined
Plug-in Verifications
Risk Assessment
Transaction type
Payment type
Fraud
Third party assessment proof or change Transaction Scoring. This step involves computing a value and risk for the actual transaction being processed based on transaction attributes as follows:

External: Third Party Fraud Assessment that is used for clarification of internal scoring and adjusts final conclusion and instruction for fulfillment execution.

Internal: Primary Attribute, Secondary Attribute, Reduction, Tune Up, Risk Adjustment, and Fraud Data Configuration.

Fulfillment Response. This is the required response to the established criteria. The transaction will be treated as a variant of "card present", where the physical credit card is actually present, or "authorization", where the credit issuer must confirm available credit.

Card Present V
Card Present R
Authorization

Fulfillment Delivery. This is the resulting action taken on the composite score after all of the scoring attributes are evaluated and checked. The resulting delivery may include the following:

Request for signature
Drop off
Delivery
Signature
Photo ID

Insurance Module 113. Through the insurance module 113, VirutalSAFE provides liability and transaction value insurance. A transaction value insurance algorithm is an active link to the Risk Management Engine. The adjustable architecture of this module provides a full and flexible policy for cumulative, minimum, and contractual coverage related to policy and deductions.

Secure Transaction Repository 114. The transaction secure repository 114 records and securely stores every single transaction that is made by the user.

VirtualSAFE Deposit Box (VSDB) 115. Through VirtualSAFE's implementation of an authentication authourity server 108, multiple entities (see below) may inter-operate on an open and non-trusted network by means of AC access control. VirtualSAFE permits electronic payment, credit collection, and secure remote fulfillment processes. Through the use of the Virtual Smart Card 106, Secure Remote Pointer 103, Attribute Authority 104, and other modules, VirtualSAFE may be implemented in a variety of ways. Modularity of security objects and application objects enable VirtualSAFE to be applied to numerous electronic commerce environments. In VirtualSAFE, an electronic inter-networking payment system provides for transactions using an electronic payment VSDB 115 for keeping money, credit cards, and other forms of payment organized. Access to the instruments in the VSDB 115 is restricted by encryption and authentication to avoid unauthorized payments. A successful cryptographic authentication is required in order to obtain access to the VSDB 115. The authentication protocol obtains the information necessary for creating a network session granting authority to use an instrument, a payment holder, and a complete electronic wallet. Electronic approval results in the generation of an electronic transaction to complete the order.

Figure 30:
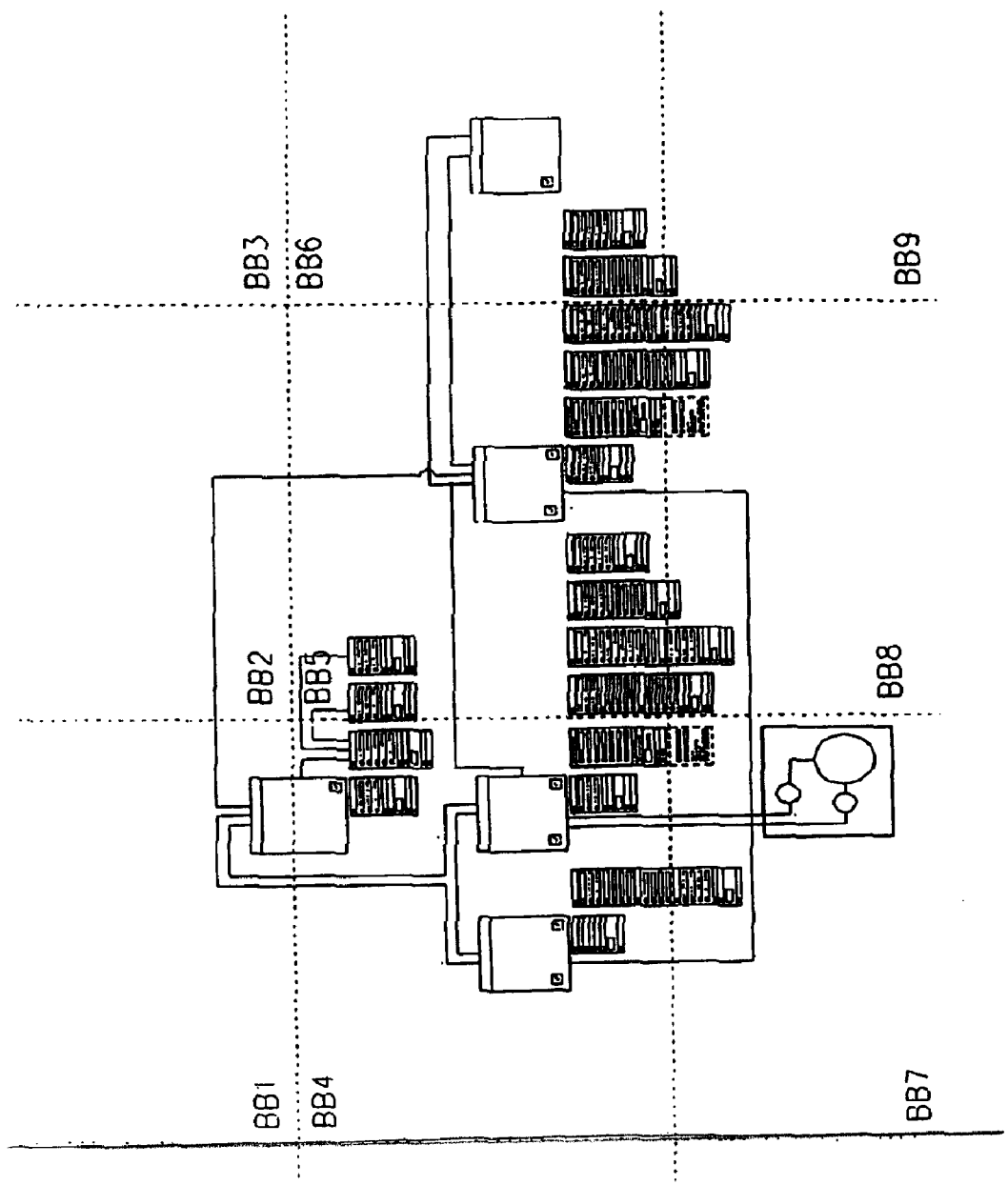
FIG. 30 is a block diagram illustrating VirtualSAFE from a business-to-business perspective, and including an e-portal, in accordance with an embodiment of the invention; and, FIG. 31 is a block diagram illustrating VirtualSAFE from a business-to-consumer perspective, and including a merchant, in accordance with an embodiment of the invention.
Figure 30:
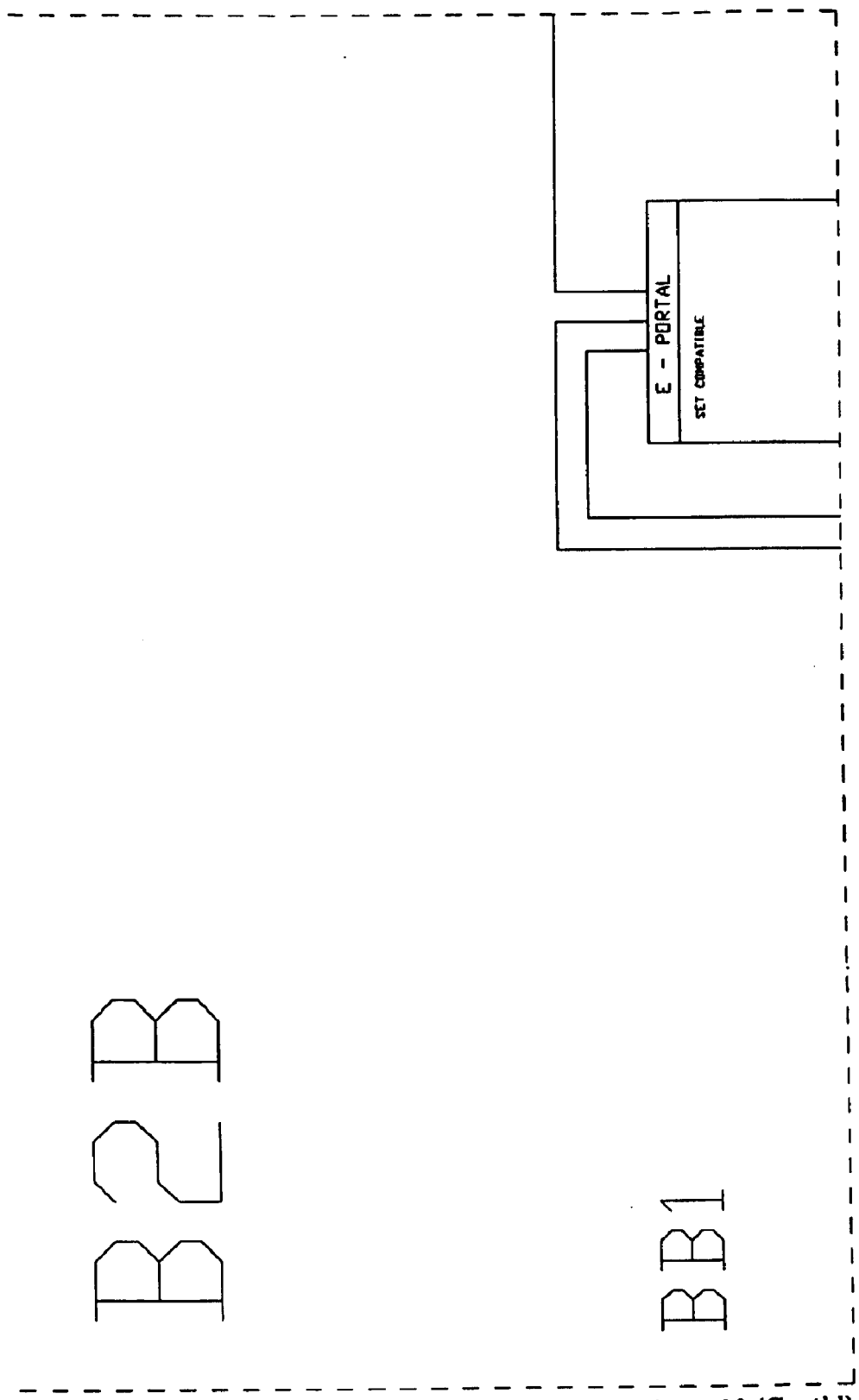
Figure 30:
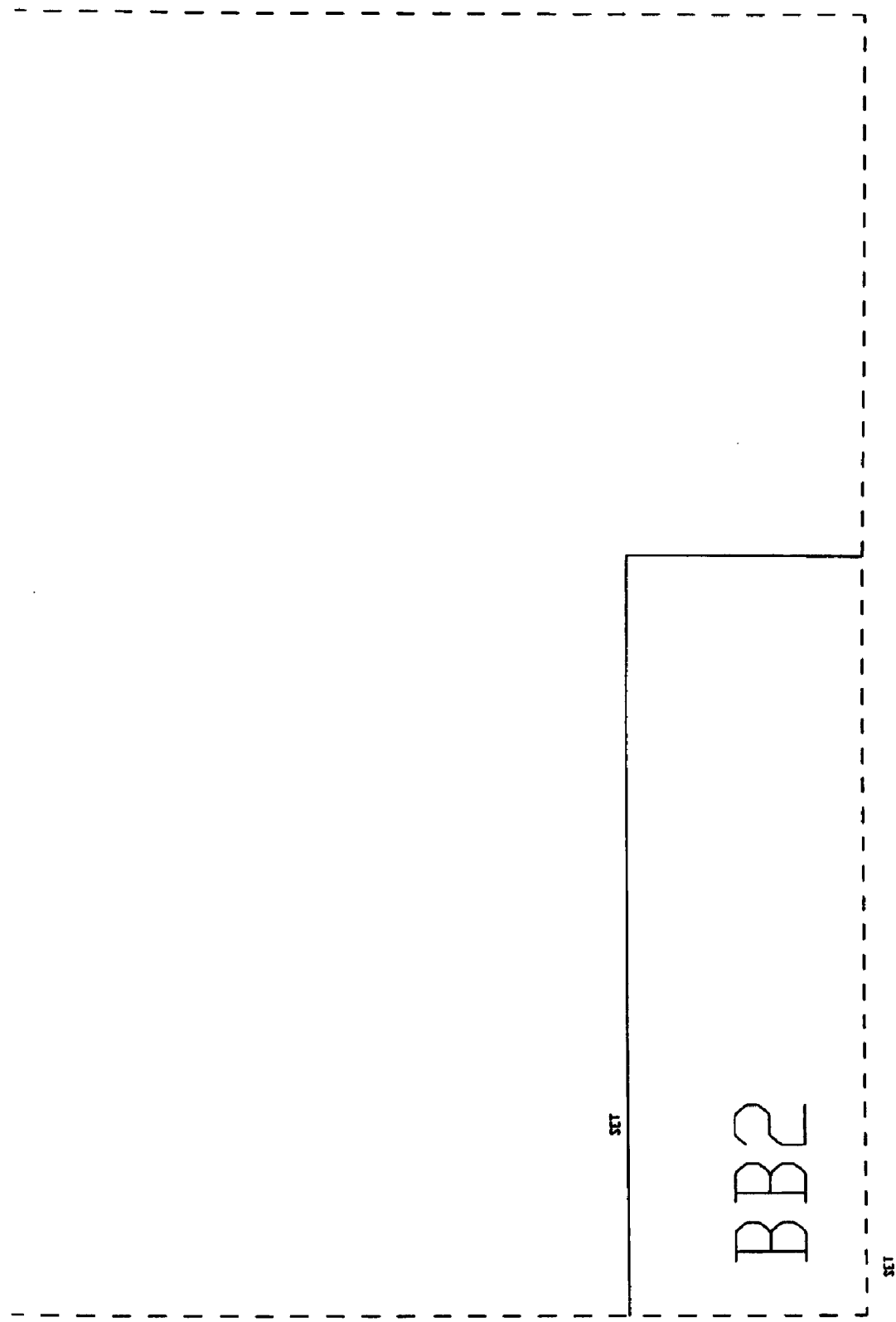
Figure 30:
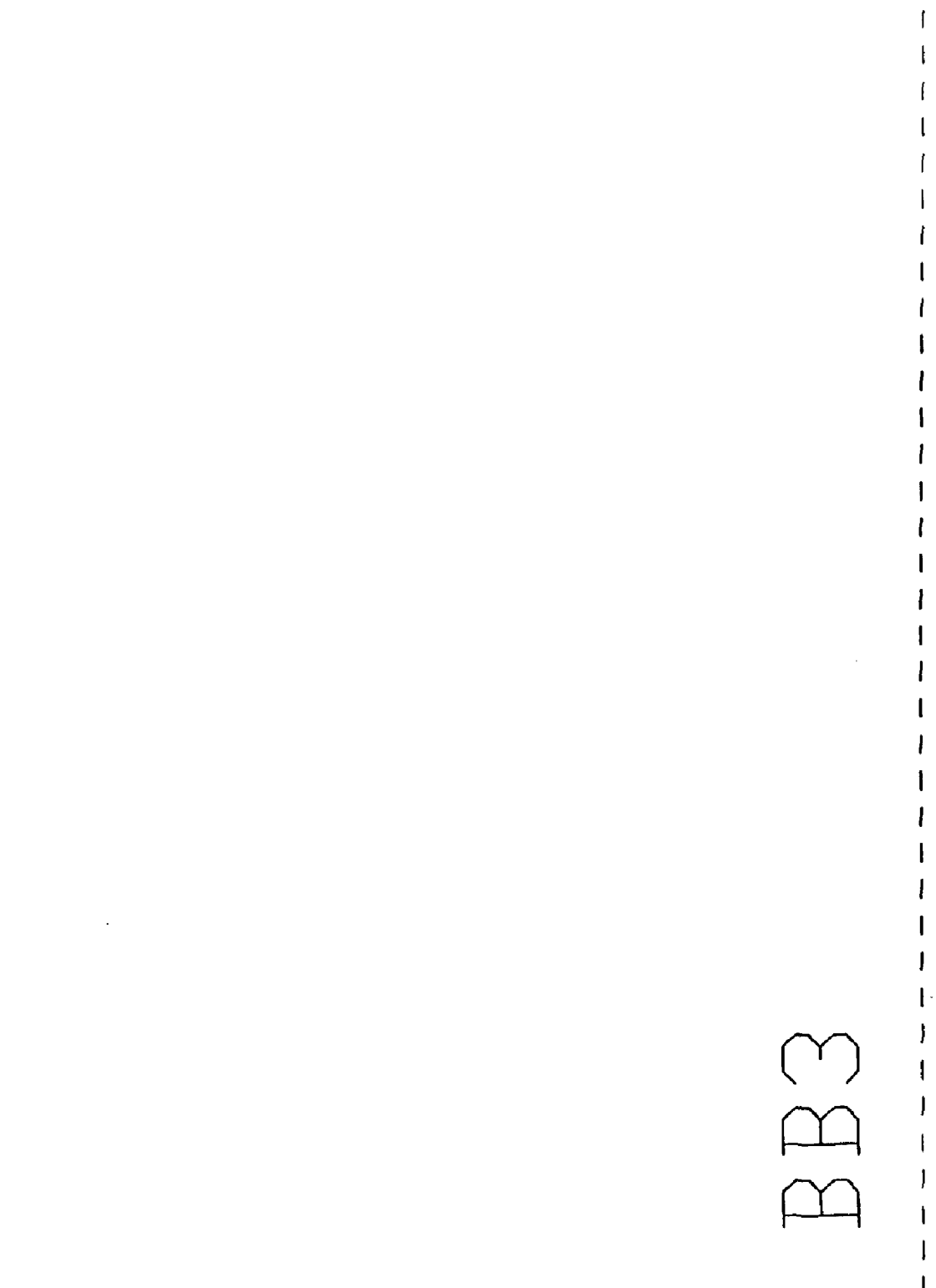
Figure 30:
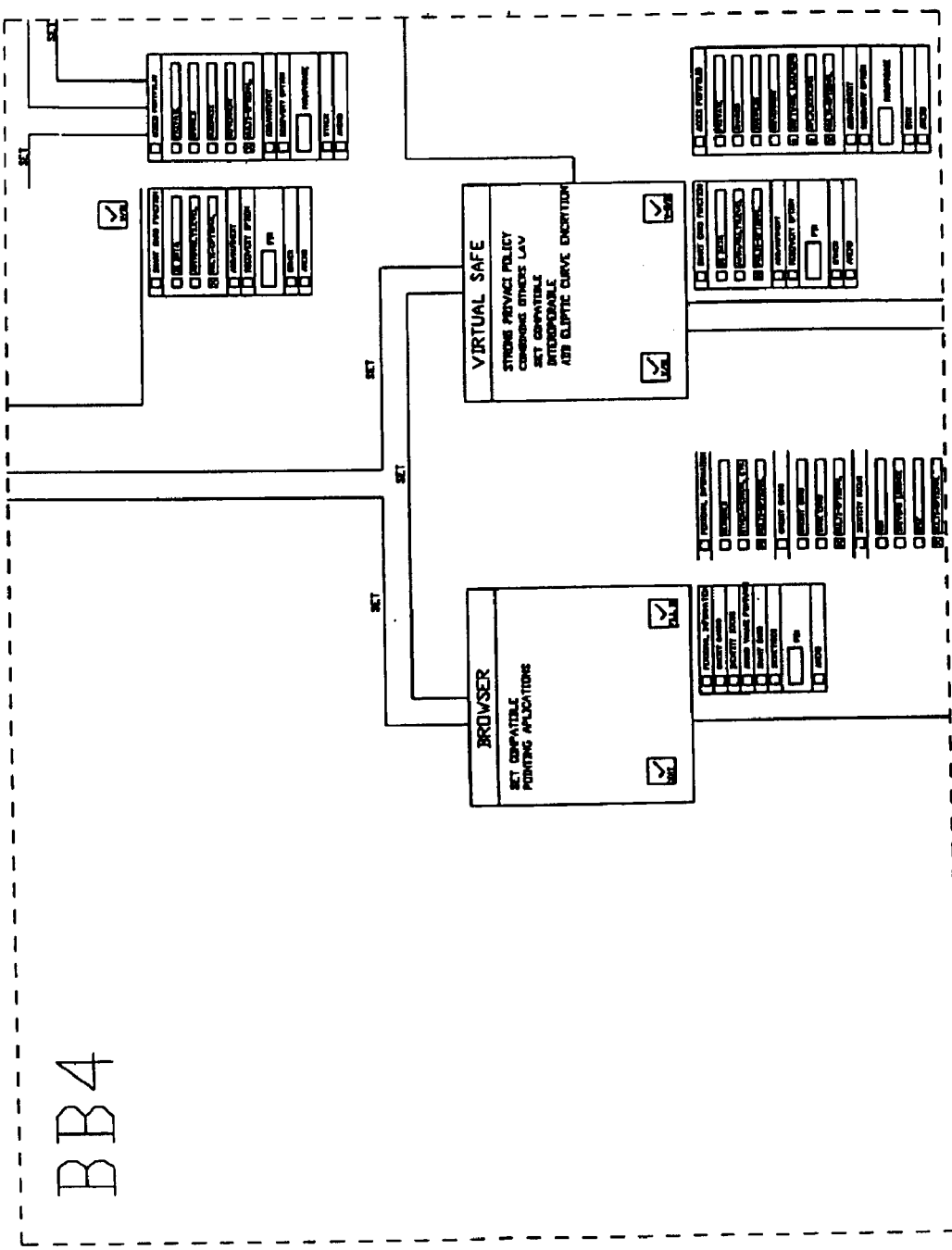
Figure 30:
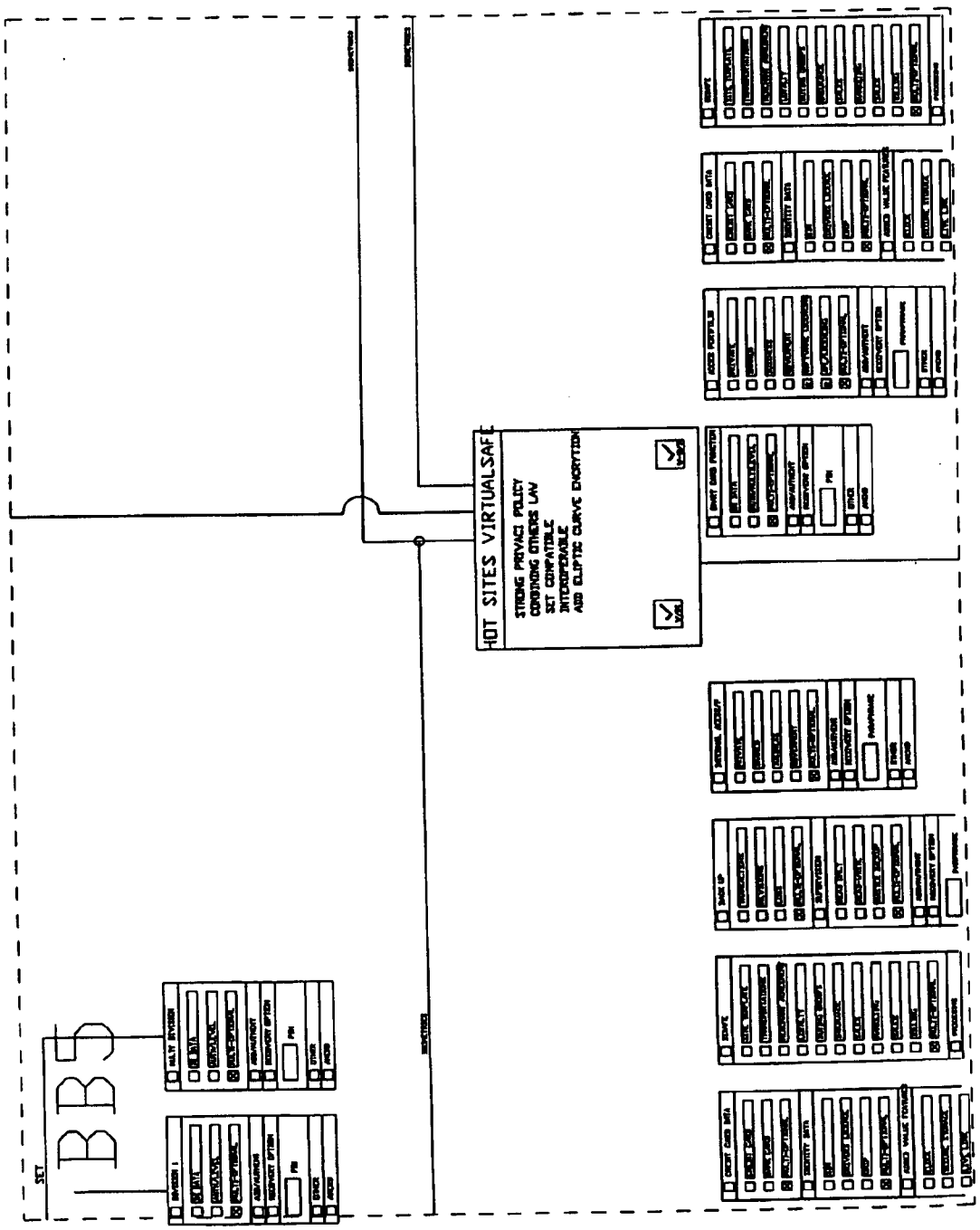
Figure 30:
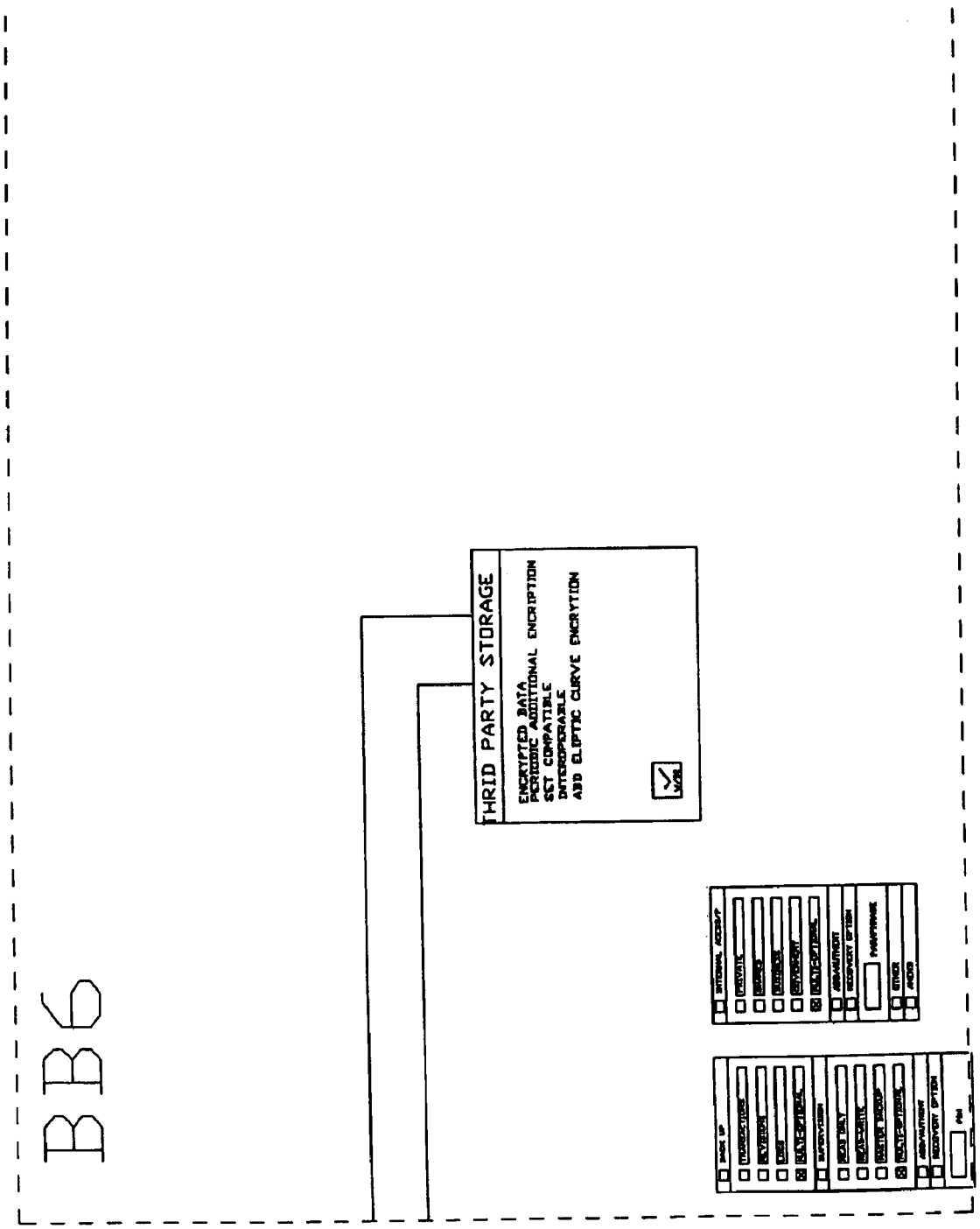
Figure 30:
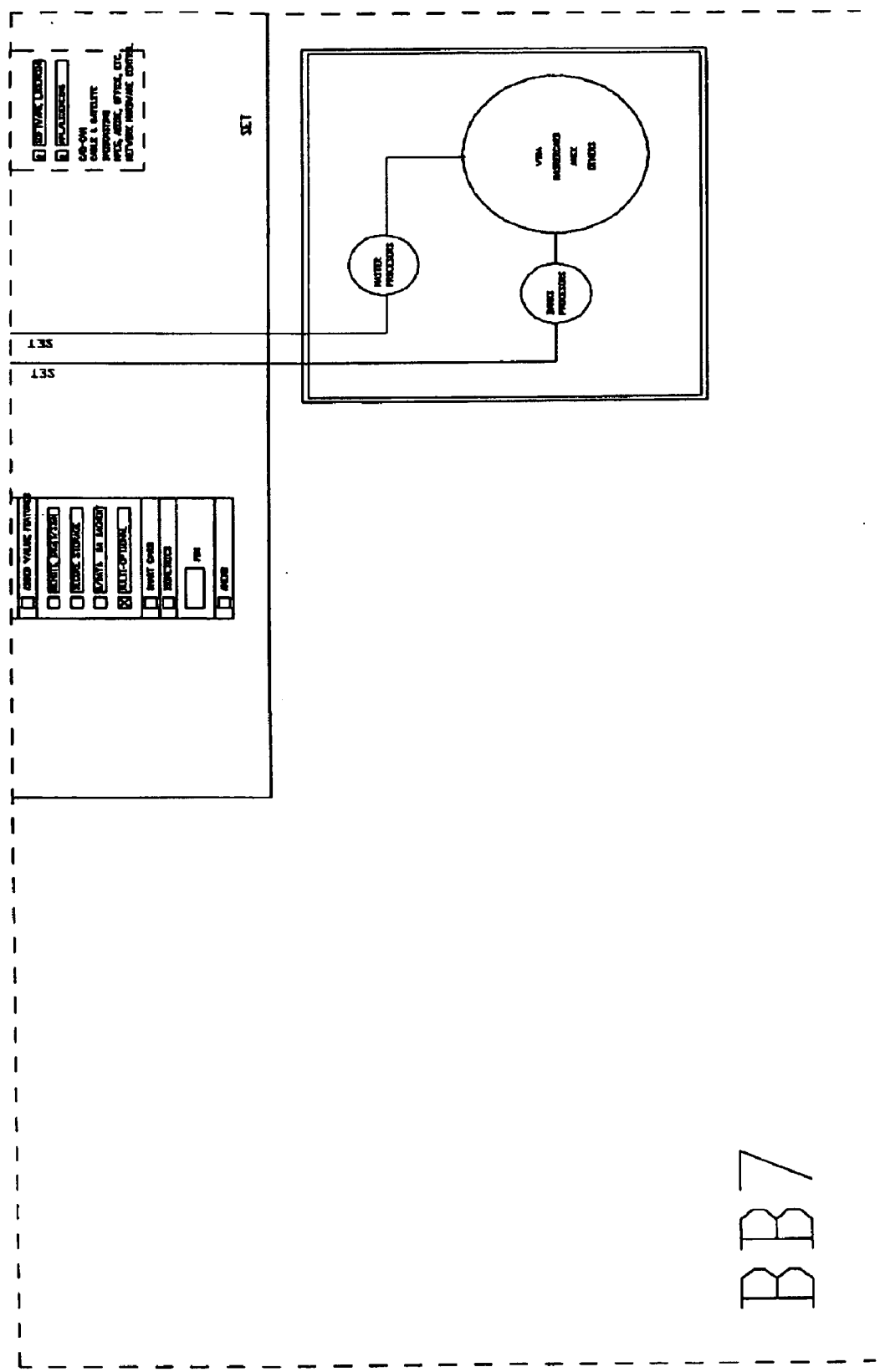
Figure 30:
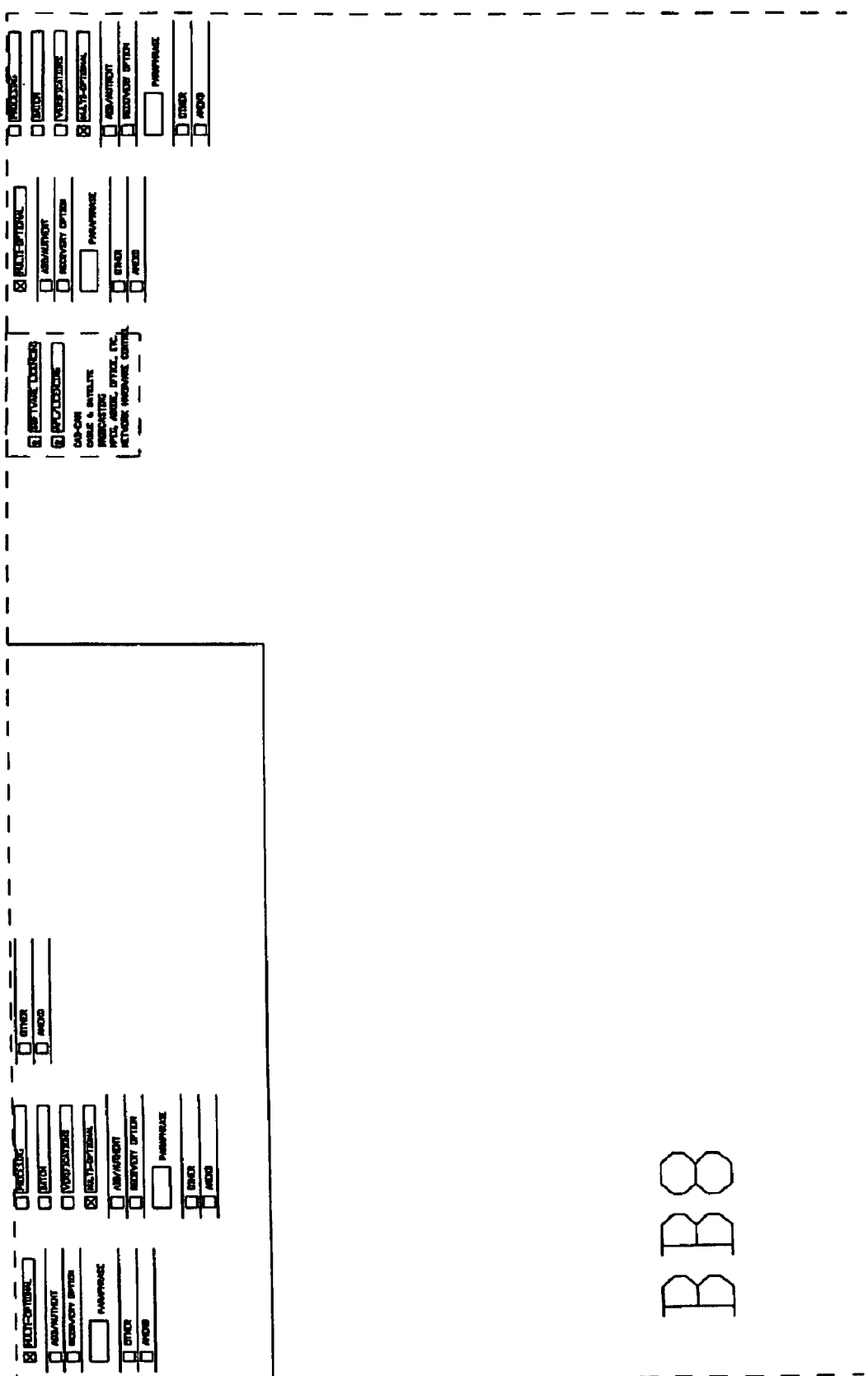
Figure 30:
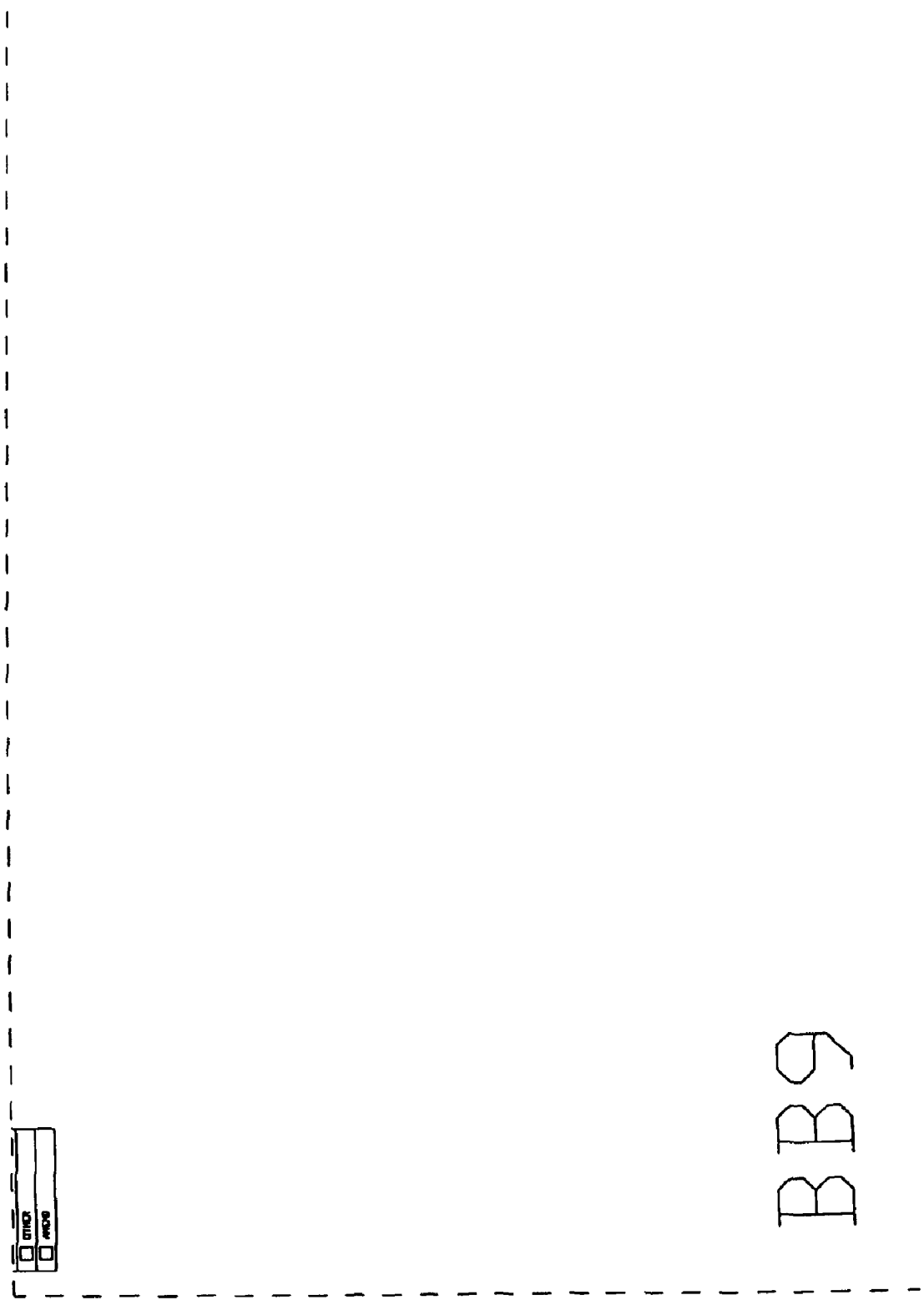
Figure 31:
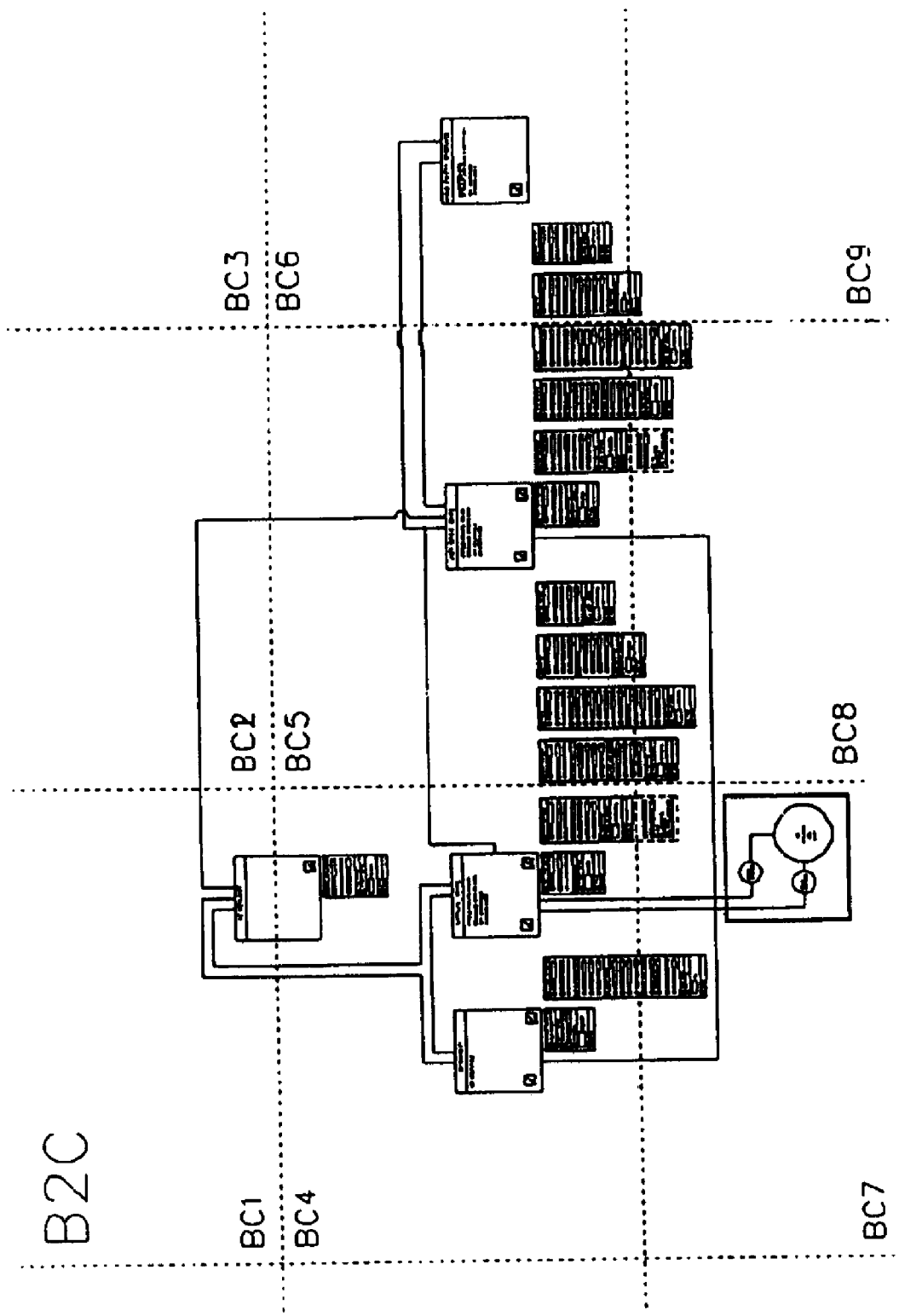
Figure 31:
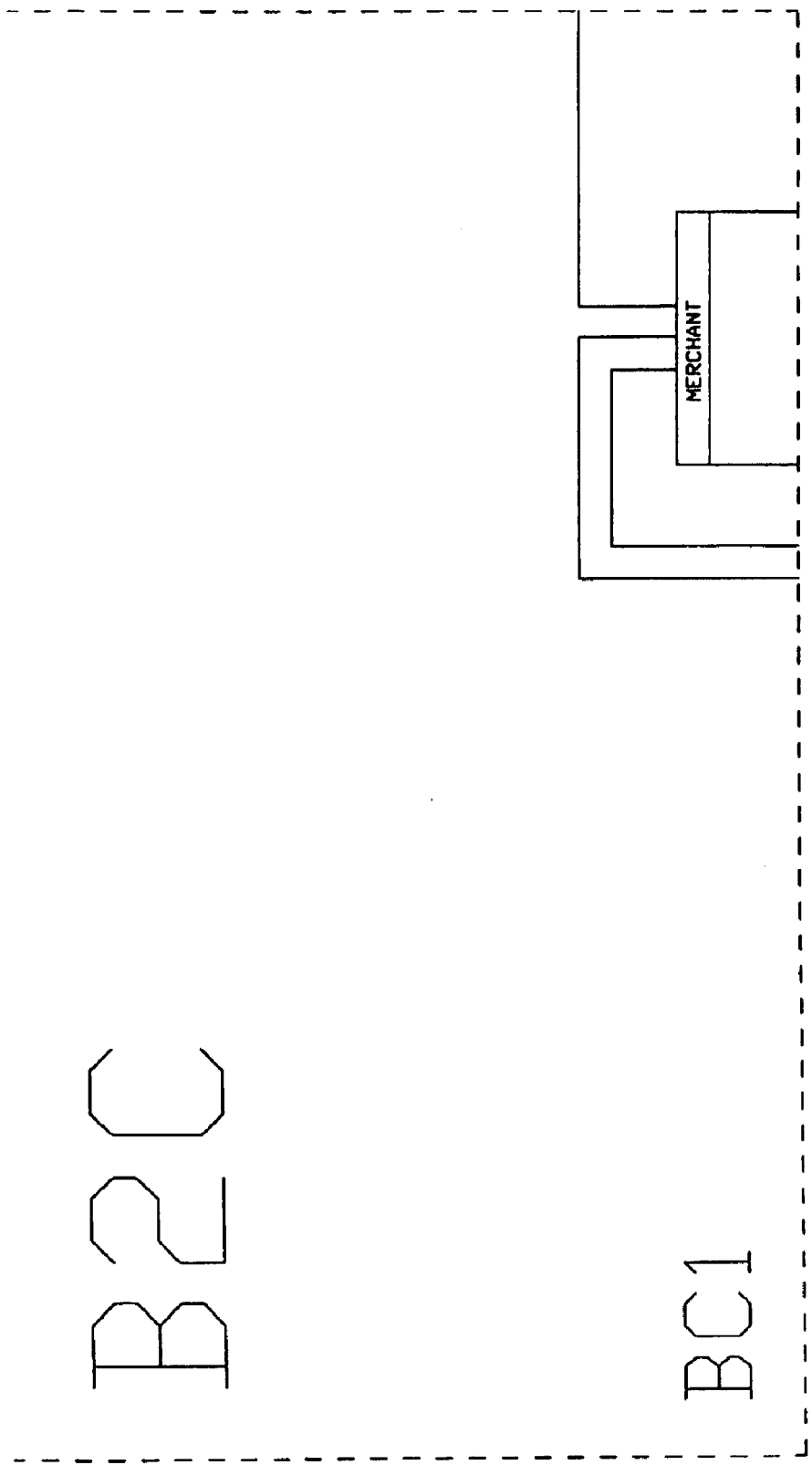
Figure 31:
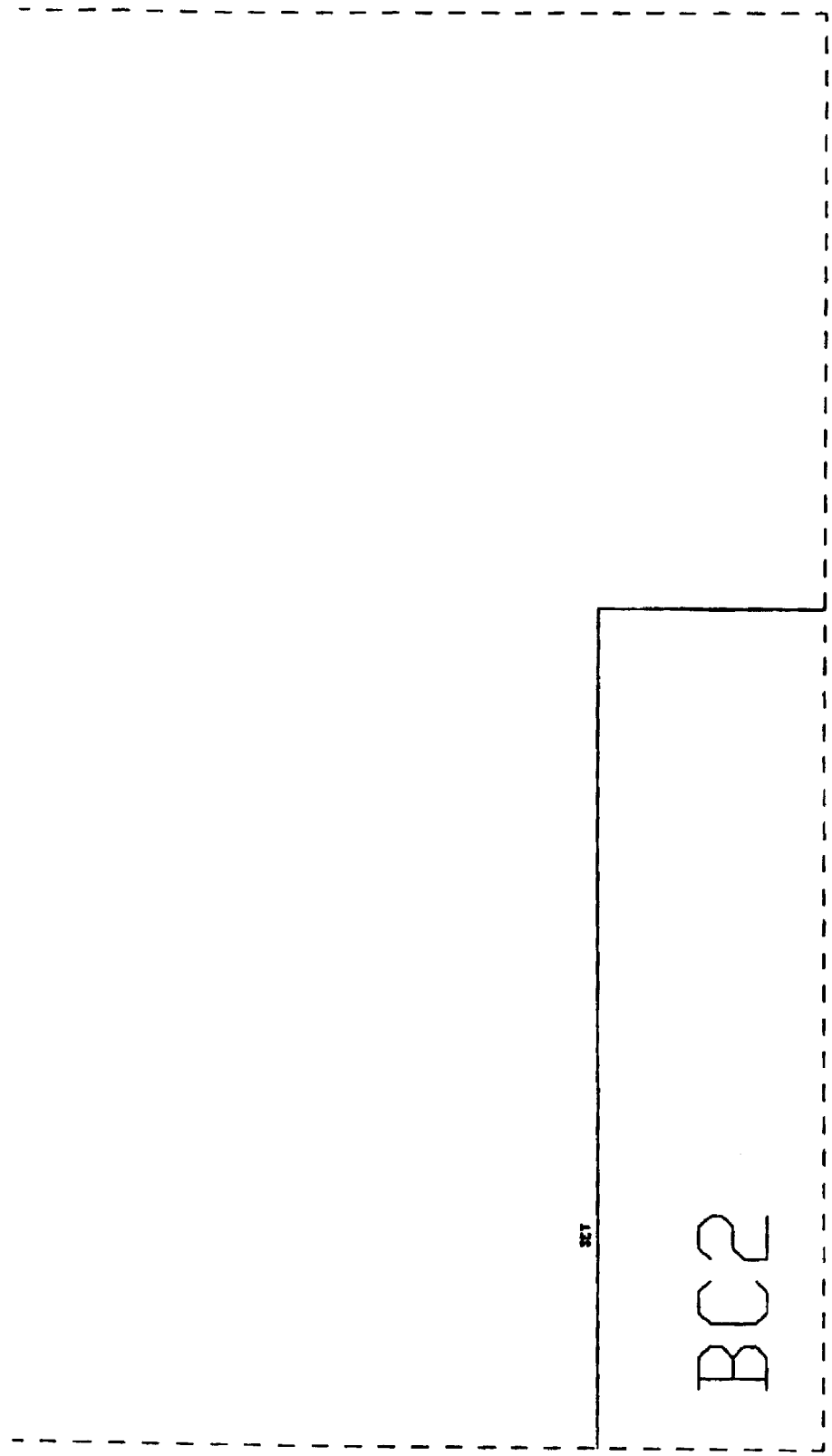
Figure 31:
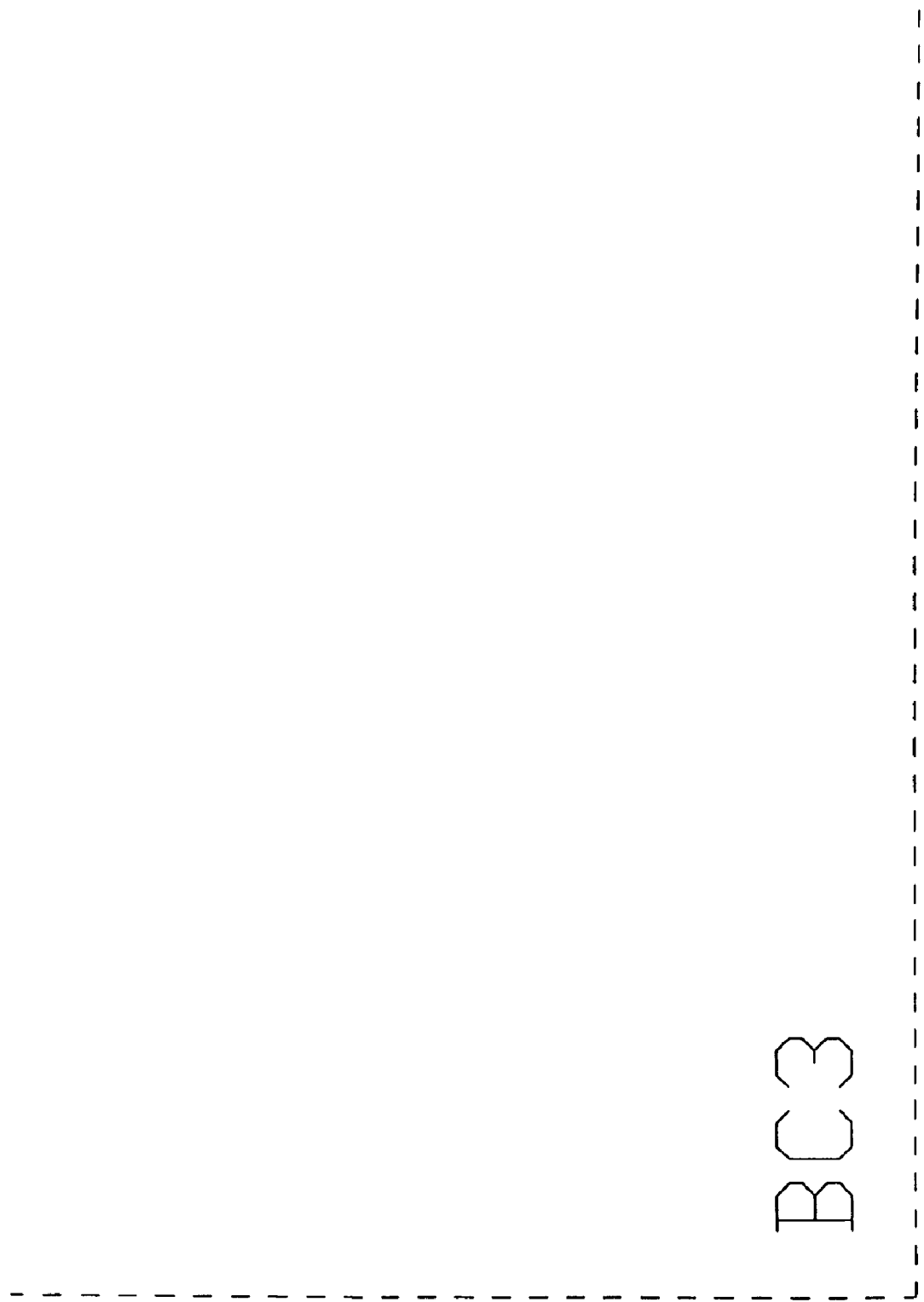
Figure 31:
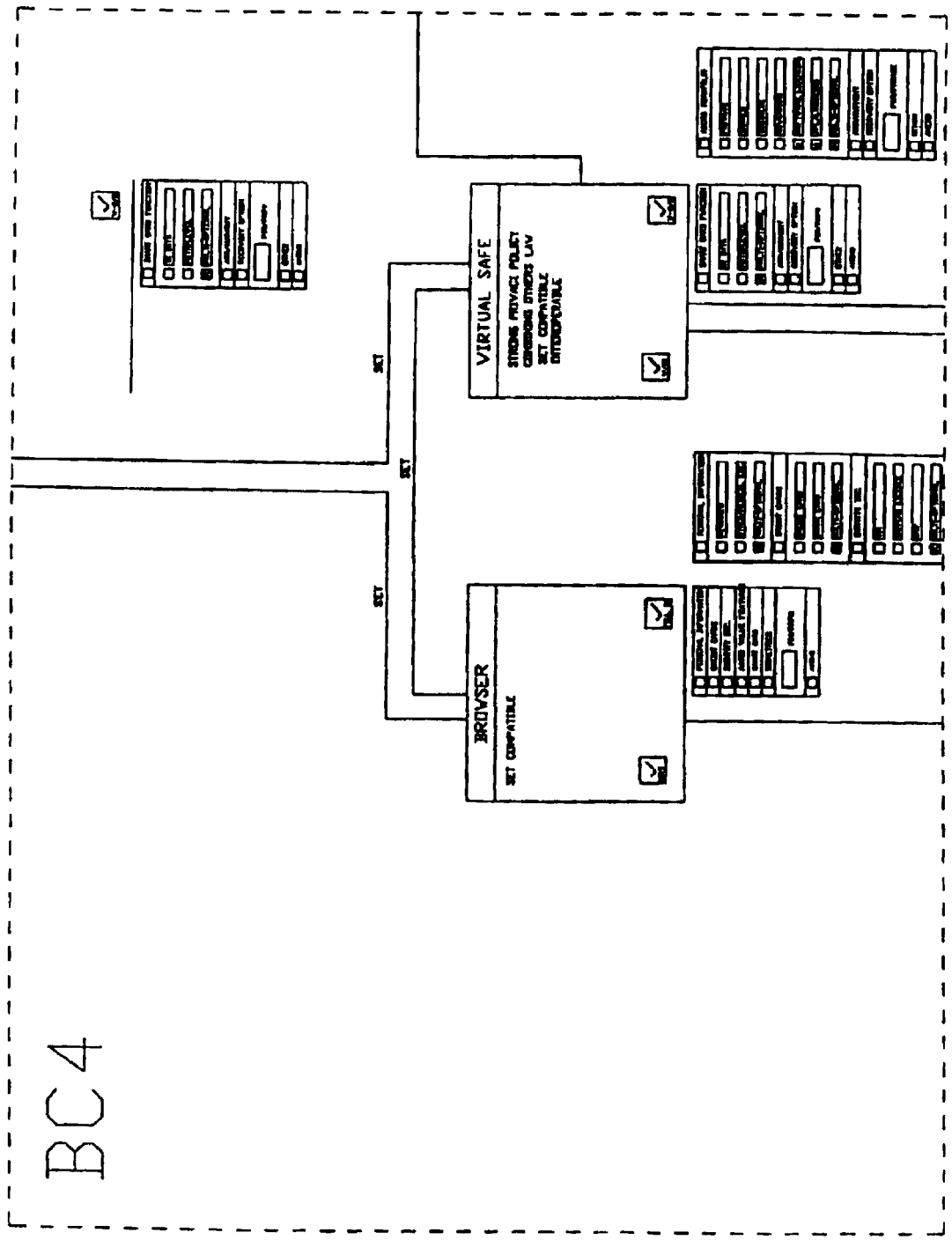
Figure 31:
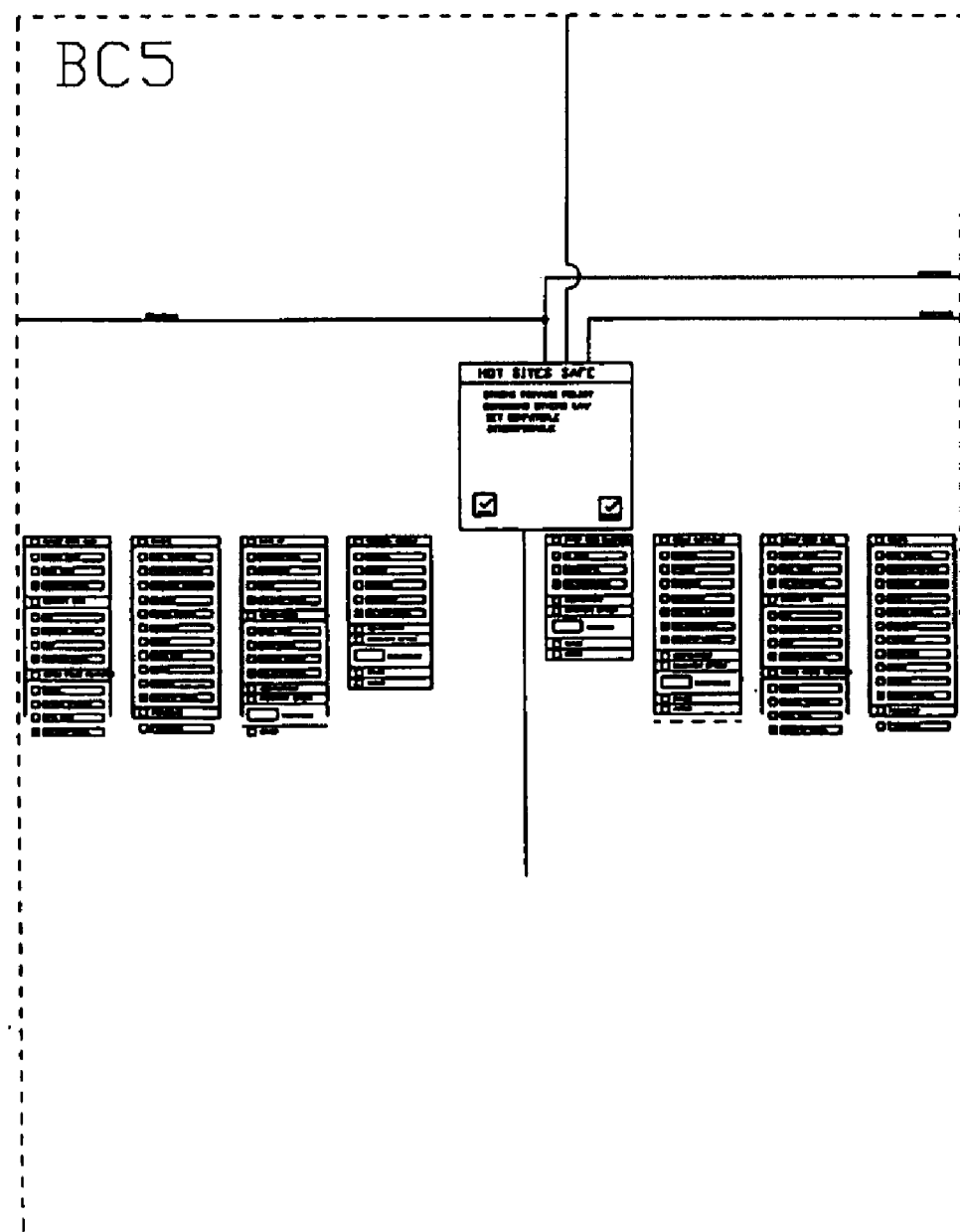
Figure 31:
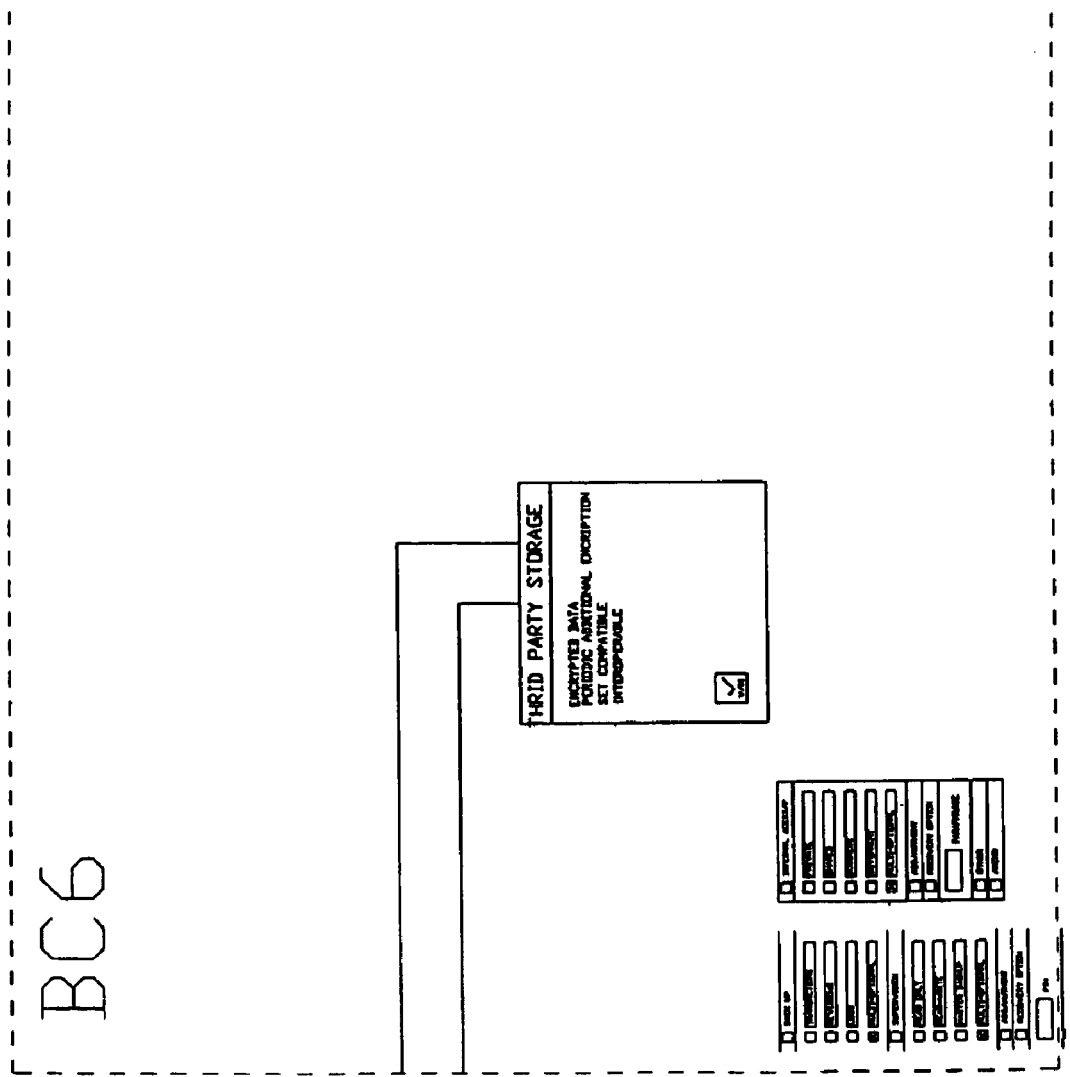
Figure 31:
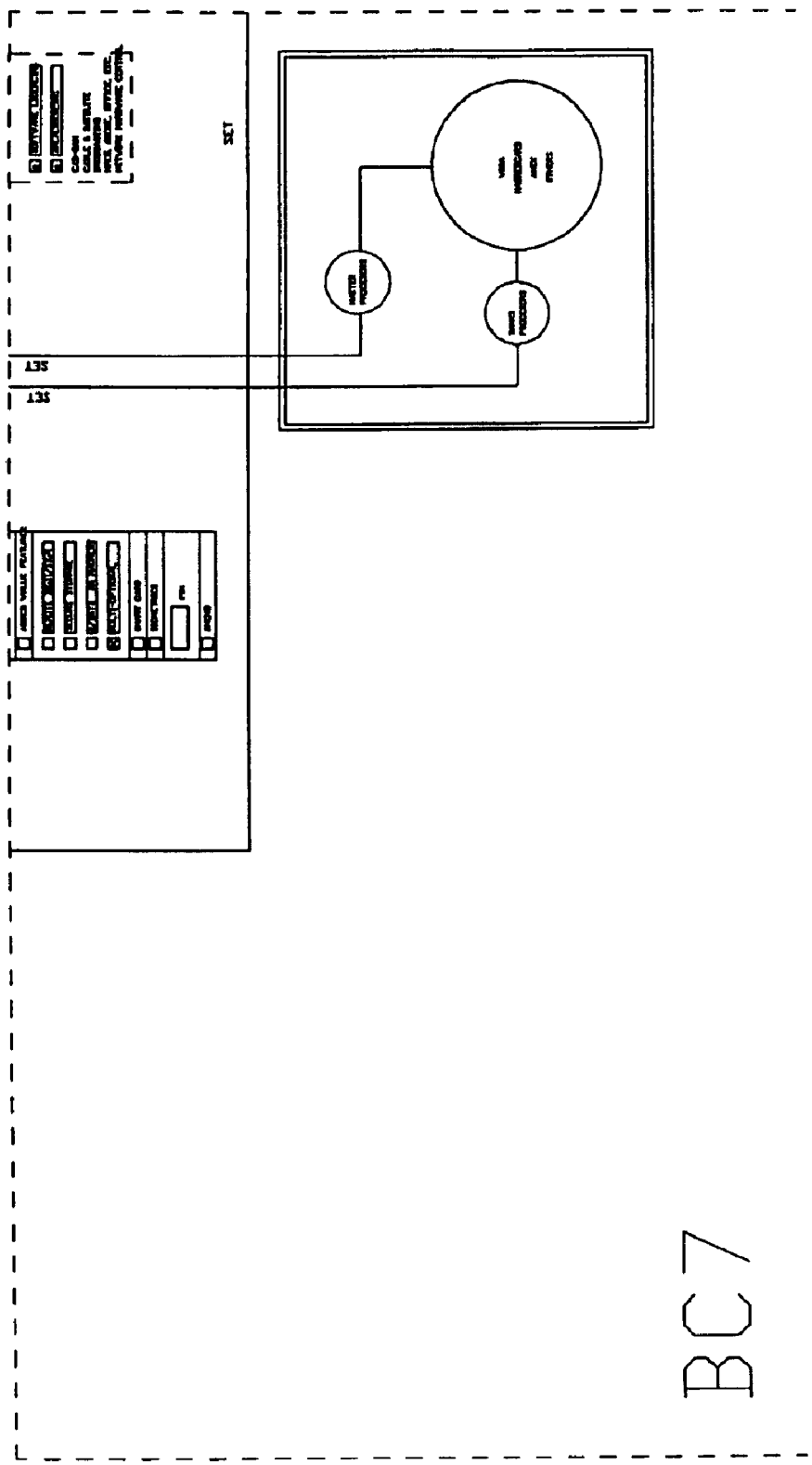
Figure 31:
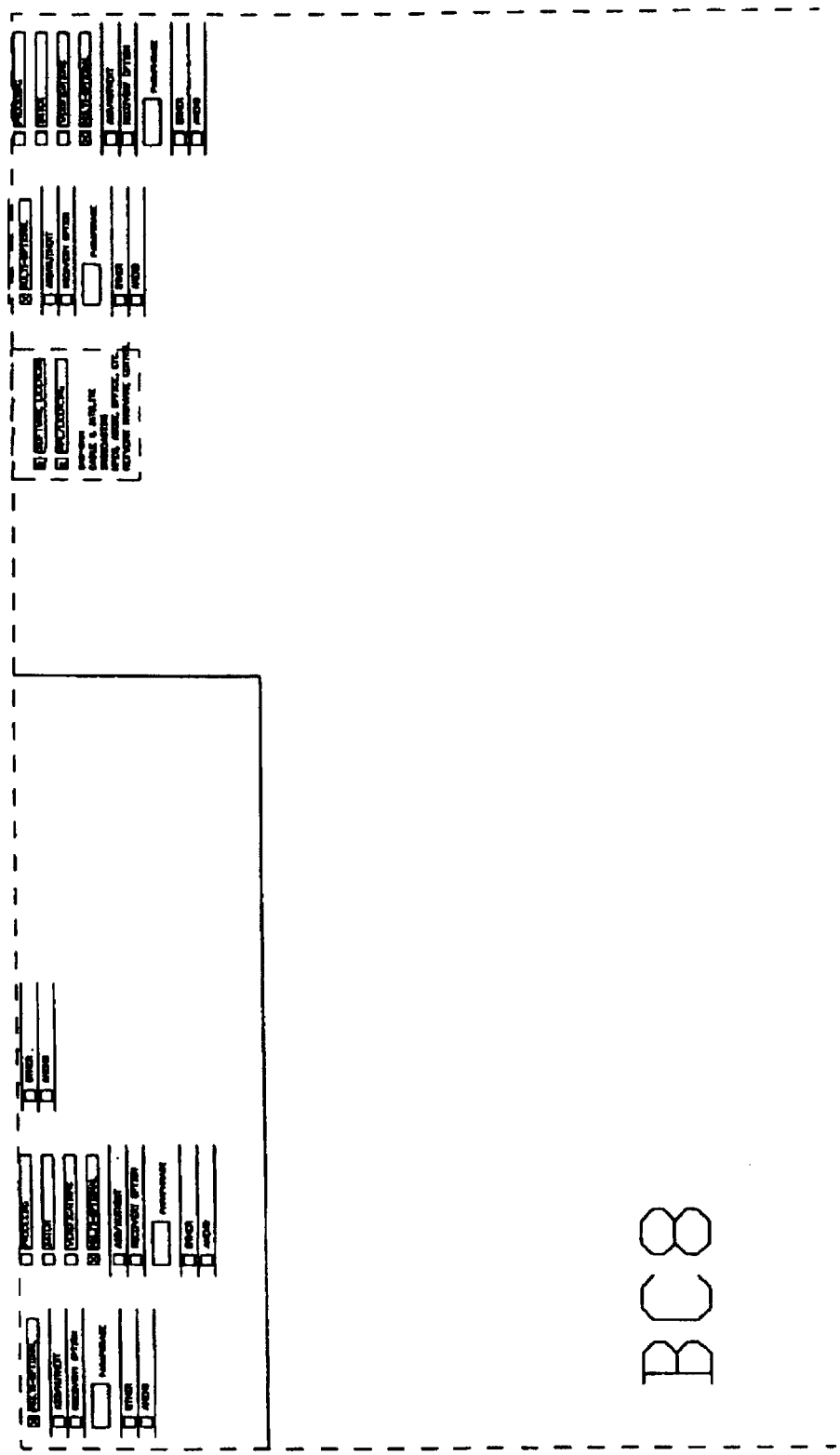
Figure 31:
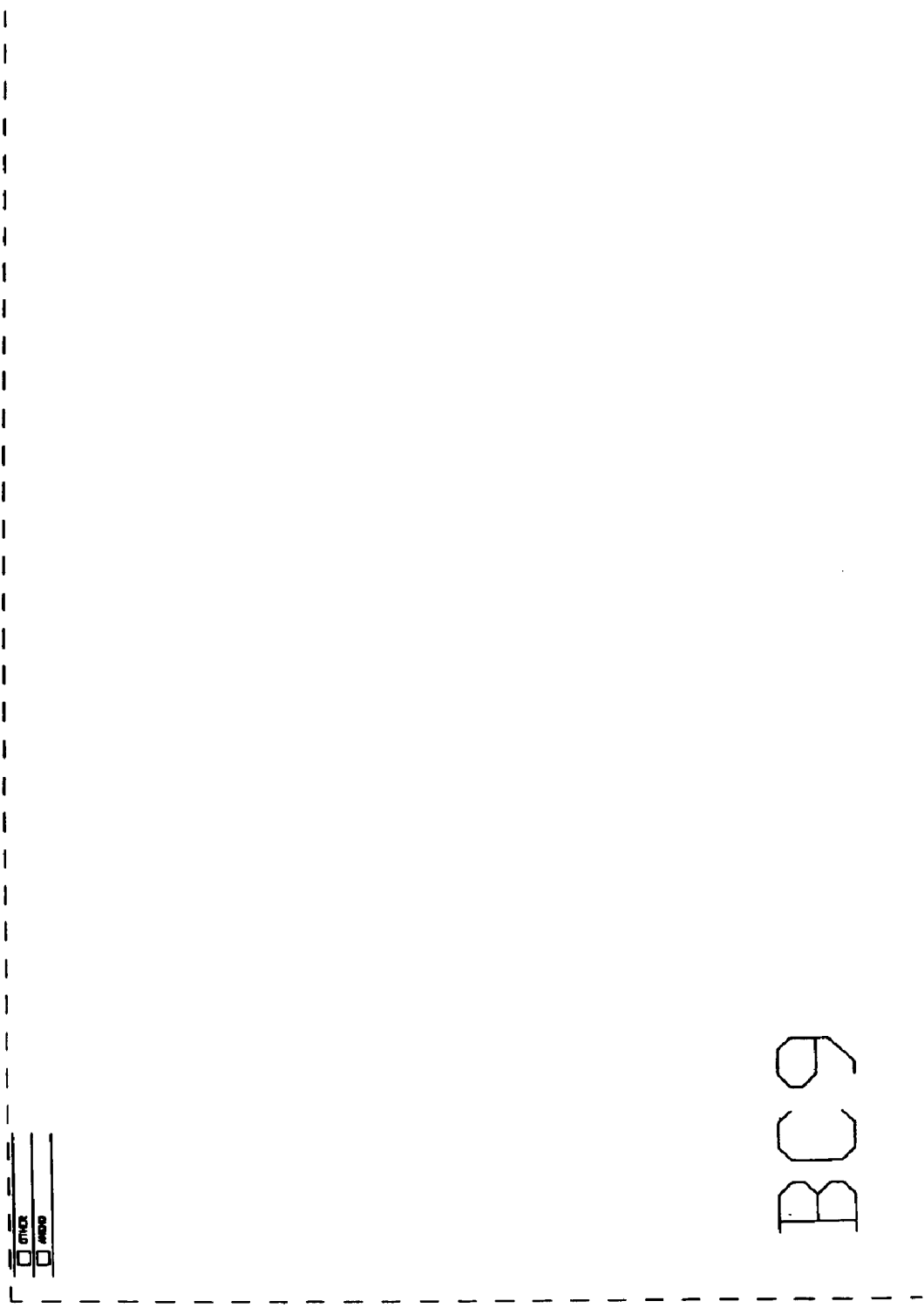

Operation. Referring to FIG. 30, there is shown a block diagram illustrating VirtualSAFE from a business-to-business perspective, and including an e-portal, in accordance with an embodiment of the invention. Referring to FIG. 31, there is shown a block diagram illustrating the VirtualSAFE system from a business-to-consumer perspective, and including a merchant, in accordance with an embodiment of the invention. VirtualSAFE ensures security through a combination of public key certificates and attribute certificates which are deployed for authentication and authorization purposes for each entity in the typical e-commerce transaction. The following entities are typically involved in an electronic commerce (e-commerce) transaction: Customer (or User); Merchant/ Business; Shipper; Payment Processor; Credit Issuer/Credit Acquirer/Credit Card Vendor; and Bank Account. In order to maintain a strong connection between security and business process, security objectives and business requirements are defined and merged in VirtualSAFE. The security objectives are based on fundamental principles of confidentiality, entity authentication, data integrity, and non-repudiation. In general, VirtualSAFE provides the following features and advantages to e-commerce entities:

1. Customer (or User).
   Customers may affect confidential purchases from merchants.
   Only customers may access their purchase data.
2. Merchant/Business
   Merchants have access to the following information: purchase related data submitted by customers; shipping related data (e.g. personal contact information); and, relevant payment information.
3. Payment Processor.
   The Payment Processor require only payment processing credit information.
4. Credit Issuer/Credit Acquirer/Credit Card Vendor.
   The Credit Issuer requires all of the above information.
5. Bank Account.
   The Bank requires only confirmation of the payment transaction.

In operation, an electronic commerce system in accordance with an embodiment of the invention includes a client terminal, a merchant server, a payment server, and a VirtualSAFE server 108. A virtual smart card inside the terminal is in communication with the payment server and other modules supported by a multi-tiered authentication authority. A method for conducting an electronic commerce transaction over the Internet using this electronic commerce system may be described as follows:

Initially, a suitable web browser initiated on the client terminal is used to access a merchant server web site. The user selects goods and/or services from the merchant site and indicates to the site that the he or she wishes to purchase these items using a virtual smart card.

The merchant server receives this request for a virtual card transaction.

The merchant server builds an HTML page that includes several parameters. These parameters include the total cost of the transaction as determined by the merchant server, the type of currency being used, the port and IP address of the payment server, and a unique transaction identifier used by both the payment server and the merchant server to track a transaction. Also included is a unique merchant identifier assigned to the merchant by the acquirer and known to the payment server. Other information may also be included such as the currency's exponent, a status URL address of the merchant server used for communication from the client terminal, and a merchant server generated key and other security information to ensure the identity of the merchant server and the integrity of the message. Other process related information such as software release level, encryption methodology, and keys may also be conveyed. Once this page has been built, the page is sent to the requesting client browser and triggers the initiation of a client terminal module in the client terminal.

Some browsers may not allow an applet to invoke a dynamic link library ("DLL") due to security reasons. As such, in one embodiment of the invention, the client terminal applet, along with any DLLs needed, are pre-initiated on the client terminal. Then, the merchant server is allowed to invoke the client terminal applet and DLLs dynamically to circumvent this security precaution. In an alternative embodiment, the client applet is signed to ensure its authenticity and integrity.

The client terminal module then displays a screen containing the amount provided by the merchant and requests that the user authorize the amount by entering their user identifier (which preferably is masked on screen) and PIN. Once entered, the client terminal module routes the purchase request (including purchase parameters from the merchant server, user identifier and PIN) to the VirtualSAFE server 108. The VirtualSAFE server 108 then validates the user identifier and PIN with the user verification module.

The client code module of the VirtualSAFE server 108 then interacts with the pseudo technology process module to build a draw request message for later transmission to the payment server. It should be noted that at this point two types of emulation occur. The VirtualSAFE server 108 neither includes a physical smart card nor a virtual smart card. The physical card is represented as a virtual card in a record of the card database, while the virtual smart card is attached to a remote payment server. Thus, the client code module will emulate commands that a virtual smart card would issue to build the draw request, while the pseudo technology process module, the smart card emulator and the database emulate a physical smart card.

In one embodiment of the invention, the client code module initiates a local DLL, makes an API call to that library, which in turn makes a call to another DLL that finally makes a call to the pseudo technology process. An "Initiate VSDB for Purchase" command (Initiate VSDB) is created and forwarded to the emulator via the card reader module. This command is modified in a suitable fashion to identify which record in the database will be debited (i.e. which virtual card). For example, the user identifier or PIN may be included. Next, the emulator parses the incoming command and does a database fetch to obtain the virtual card record from the database. In another embodiment of the invention, the fetch may be optimized to only retrieve certain information. The emulator then sends the record to the CEV 109 for decryption of the card data found in the record.

Once responses to the "Initiate IE-W" (i.e. Intersector Electronic-Wallet) command from the reader are received, the client module combines these responses into a byte stream suitable for transmission over a network to a payment server. Also at this point, the currency type and expiration date of the virtual card in the database are checked, and the total cost of the ordered merchandise is checked against the card balance to ensure that the value on the card is great enough to cover the transaction. If the checks are not successful, a message to that effect is delivered to the user and the transaction terminates.

Since the virtual smart card is remotely located, it would not be advantageous to engage in numerous commands and responses between the virtual smart card and the client code module over an open network such as the Internet. In the interests of speed and reliability, it is advantageous to have fewer messages exchanged. Accordingly, the client module emulates a variety of virtual smart card commands in order to receive responses to these commands from the pseudo technology process. To operate securely and reliably in this environment, in one embodiment of the present invention, the client module emulates a virtual smart card and gathers all the responses for transmission in one draw request message. The commands and responses take place between the client code module and the pseudo technology process as if there were an actual card reader with a physical smart card inside. In other words, the client code module need not be aware that a virtual card is being used. The draw request message may include a variety of data including a draw request token, state information, the merchant identifier, the transaction identifier, security information, a wallet provider identifier, and an intersector electronic wallet ("IE-W") identifier. Also the message may include an algorithm used by the card, an expiry date, the balance of the card, a currency code, a currency exponent, the authentication mode of the IE-W, the transaction number of the IE-W, a key version, and the purchase amount. As all of this information is prepackaged into a single draw request message, the number of messages over the Internet between the VirtualSAFE server 108 and the payment server is greatly reduced.

In one embodiment, the draw request message is built by packaging the virtual card's response to the "Reset" and "Initiate IE-W for Purchase" commands, any public key certificates, the total cost, and the currency of the transaction received from the HTML page. For public key cards, the card and the issuer certificates are obtained from read commands and may also be included in the draw request. By packaging all of this information together into one draw request message, it is possible to cut down on the number of messages exchanged between the VirtualSAFE server 108 and the payment server and hence reliability and speed are improved.

Next, the VirtualSAFE server 108 accesses the payment server using the IP address received from the merchant server. The VirtualSAFE server 108 sends the draw request message to the payment server. The VirtualSAFE server 108 also creates a log of the message being sent.

The payment server sends to the client terminal the draw request and processes the draw request in conjunction with an associated virtual smart card. In one embodiment of the invention, the payment server creates a transaction thread for each connected client module to service it through the life cycle of the transaction. The payment server receives a debit command and a virtual smart card digital signature from the virtual smart card.

The virtual smart card digital signature is a value that uniquely identifies and validates the virtual smart card to prove to the VirtualSAFE server 108 that the incoming debit command is a valid command from a real virtual smart card. This validation ensures that when the virtual card is debited the financial totals in the virtual smart card are updated. Thus, the user of the virtual card is guaranteed that a valid debit of the card has occurred. In one embodiment of the invention, the virtual smart card digital signature is an encrypted value ensuring that no other entity can forge an identity of a virtual smart card.

The payment server sends the debit command along with the virtual smart card digital signature to the VirtualSAFE server 108 to allow the virtual card to accept the debit. At this time, the payment server also logs the debit command into its database. Upon receiving the debit command from the payment server, the client module replaces the amount in the debit command with the original amount (from the merchant server) to ensure that the amount has not been tampered with while traveling over the network. At this time, the client module may also create a log of the debit command.

The client module forwards the debit command and virtual smart card digital signature to the emulator and it again retrieves the appropriate virtual card record from the database for processing. The card record is retained in memory while a transaction is occurring. The card record, debit command, and digital signature are sent to the CEV 109 where the virtual smart card digital signature is verified and a virtual card digital signature is generated. The card record is updated in the CEV 109 with revised parameters (including balance and transaction ID) to reflect the purchase transaction and returned to the card database. The client module receives the CEV 109 response and generates a "Debit Response" message along with the card digital signature. If the virtual card does not have enough value to satisfy the purchase amount, then a "Debit Response" message indicates as such. The card digital signature is a unique value identifying a valid virtual card in the card database. In one embodiment of the invention, the digital signature is in encrypted form to prevent tampering.

The emulator sends the response message along with the card digital signature back to the client module. At this point, the purchase amount has been deducted from the balance on the virtual card (assuming a successful transaction). Next, the client module packages the response message along with the card digital signature and sends them back to the payment server. The client module also logs the result of this virtual card debit.

The payment server receives the incoming message and creates a log and updates the transaction status in its database for future error recovery. The payment server then directs this received message to the virtual smart card in the terminal. Next, the virtual smart card processes this response from the VirtualSAFE server 108 and verifies the received virtual card digital signature.

As the virtual smart card contains the keys and algorithms necessary to compute card digital signatures, the virtual smart card is able to validate that a received virtual card digital signature is in fact a valid one by comparing this card digital signature with a generated expected value. A successful comparison indicates that a response message received from the virtual card is in fact a valid message and that the virtual card has been debited. An error result code or a comparison that is not successful potentially indicates that the virtual card has not been debited. This comparison of card digital signatures by the virtual smart card ensures that a virtual card is in fact debited before the merchant server is directed to release the purchased merchandise to the user. The virtual card digital signature is compared to an expected value and performed by the virtual smart card for the highest level of security possible. This comparison of virtual card digital signatures may also take place in the payment server, in the VirtualSAFE server 108, in the client terminal, or in the merchant server, with a variety of other advantages. Assuming that the transaction is so far valid, the virtual smart card sends a response indicating the result of the digital signature verification. The payment server uses this response to build a "Debit Result" message. If the transaction was invalid or if the verification failed, then an exception would be returned.

The terminal updates its data store with the virtual card number, a transaction count, and the total sale amount. Also updated is the response from the virtual smart card and transaction numbers from the virtual card and from the virtual smart card. The payment server also logs the response received from the terminal along with the merchant identifier, etc. Next, the payment server packages the result message including the transaction identifiers and sends this message to the VirtualSAFE server 108 in encrypted form. The server then passes the result to the emulator for appropriate database updates such as balance and ID. The transaction is also logged in the history file.

The result message is then forwarded to the client terminal. At this point, the transaction thread of the payment server that was used for the current transaction may release the terminal, thus allowing the terminal to be used by other transactions. The transaction thread then exits at this time.

By sending this result message in encrypted form, the confirmation included in the message may be passed to the merchant server by way of the client terminal without fear of tampering. As the result message is encrypted, it would be extremely difficult for the client terminal or another entity to forge a confirmation and trick the merchant server into thinking that a transaction had taken place. In one embodiment of the invention, if the client terminal is a trusted agent, then the result message need not be encrypted. In yet another embodiment of the invention, the payment server may send two confirmation messages, one not encrypted for the client terminal to process, and one encrypted for the merchant server, or both messages encrypted under different keys.

The client terminal then passes the result message on to the merchant server at the URL address previously received from the merchant server. The client may also post a message to the user informing that the debit has been completed. The client may also log confirmation of the payment. The merchant server registers the confirmation included in the message and checks for success. The merchant server calls a validate routine within the merchant code module to validate the result message received via the client terminal. The validation routine decrypts the transaction identifier along with the encrypted result message. If the decrypted result message is acceptable, the merchant server then determines that a successful transaction has occurred. Next, the merchant server generates a message with the purchased information and delivers this information to the client terminal. The merchant server may generate a purchase receipt to deliver to the client terminal indicating that goods and services are to be rendered. At this point, the client terminal may log the merchant server's response. Completion of these steps indicates a successful financial transaction over the Internet using a virtual smart card.

For greater clarity, the above method may be described from a user's perspective as follows.

First, a user sets up his or her virtual card within VirtualSAFE. In one embodiment of the invention, a physical card in the possession of the user is used to provide some of the information requested by the VirtualSAFE server 108. The user accesses the VirtualSAFE server 108 over the Internet using a VSAA login URL to access the user verification module. A screen is presented to the user which requests that the user enter his or her user identifier, a funding account number, the card verification value ("CVV"), expiration date of that account, billing address, electronic mail address, and a chosen PIN. Typically, the card verification value is a 3-digit value on the digital signature panel of a card and is used internationally for fraud deterrence. The first time the user identifier is entered it is in the clear. However, when the identifier is entered again by the user, this time perhaps for a transaction, it appears masked on the screen so as to be kept secret. The user verification module then presents a screen to the user indicating that a confirmation will be sent to the user's electronic mail address. The user then logs out.

Later, an electronic mail confirmation is sent that contains a one-time logon PIN. The user receives the electronic mail and begins the setup process by logging on to the URL of the VirtualSAFE server 108 and entering his or her user identifier and one-time PIN for checking by the user verification module. Once these are verified, the user is prompted to change the one-time PIN to a new user-selected PIN. The user verification module then assigns a unique identification number ("VSAA card identifier") to the user.

During this session or at a later time, the user initiates value onto the virtual card. Initiation may be accomplished in several different ways. In one embodiment of the invention, a virtual card may come pre-initiated with a certain amount when an account is set up, that is, the balance in the database is positive for a particular record. Other methods of initiation may also be used.

The user accesses the merchant server web site via a communication link over the Internet. This web sit access may be performed in any suitable fashion such as by using any commercially available web browser. Once at the merchant web site, the user is prompted to choose payment via either a physical smart card or via the virtual smart card of the present invention. If the user chooses payment via a physical smart card, then a purchase may proceed as described in U.S. patent application Ser. No. 08/951,614, which is incorporated herein by reference. If the user chooses the virtual card method, then the user is prompted for his or her user identifier (which preferably is masked on screen) and PIN that is verified by the VirtualSAFE server 108.

Next, the user browses the merchant web site and selects goods and services for purchase from the merchant using the web site interface that the merchant has provided. The user then selects an appropriate button on the merchant web site to indicate what the user wishes to make a purchase. Next, the user receives a total sale amount from the merchant server, a current balance from the VirtualSAFE server 108, and is directed to actuate a button on the web site indicating that the user wishes to proceed with the purchase using the virtual card.

The system processes the user order by way of the payment server, the VirtualSAFE server 108, the terminal, and the virtual smart card. The user's virtual smart card is debited by the total sale amount and the user receives a "debited" message at the user's terminal. This message is optional and is dependent on system design. The user receives a confirmation message from the merchant server indicating that the transaction has been completed. The user may now download the purchased information and/or receive a receipt for goods and services to be rendered or delivered from the merchant at a later date. The merchant, via a clearing and settlement system, receives payment to its bank account for the goods and services rendered by way of information collected from the payment server. In one embodiment of the invention, an existing clearing and settlement system is used as is existing methodology for transferring information from a smart card for later reconciliation. This use of an existing "back end" allows the present invention to be implemented more quickly and less expensively.

User Enrollment. Before using VirtualSAFE, users must be enrolled. Referring to FIGS. 3 through 12, the following is a description of the enrolment and sign-up process when a user is initially introduced and registered as a primary new user within Virtual SAFE.

Merchant Enrolment. For merchant enrolment, the merchant has to authenticate an authorized person for VirtualSAFE. The authorized person enrolls the merchant by providing required information and documents, necessary for credit checks by a credit bureau or equivalent, as per local government regulations.

Figure 3:
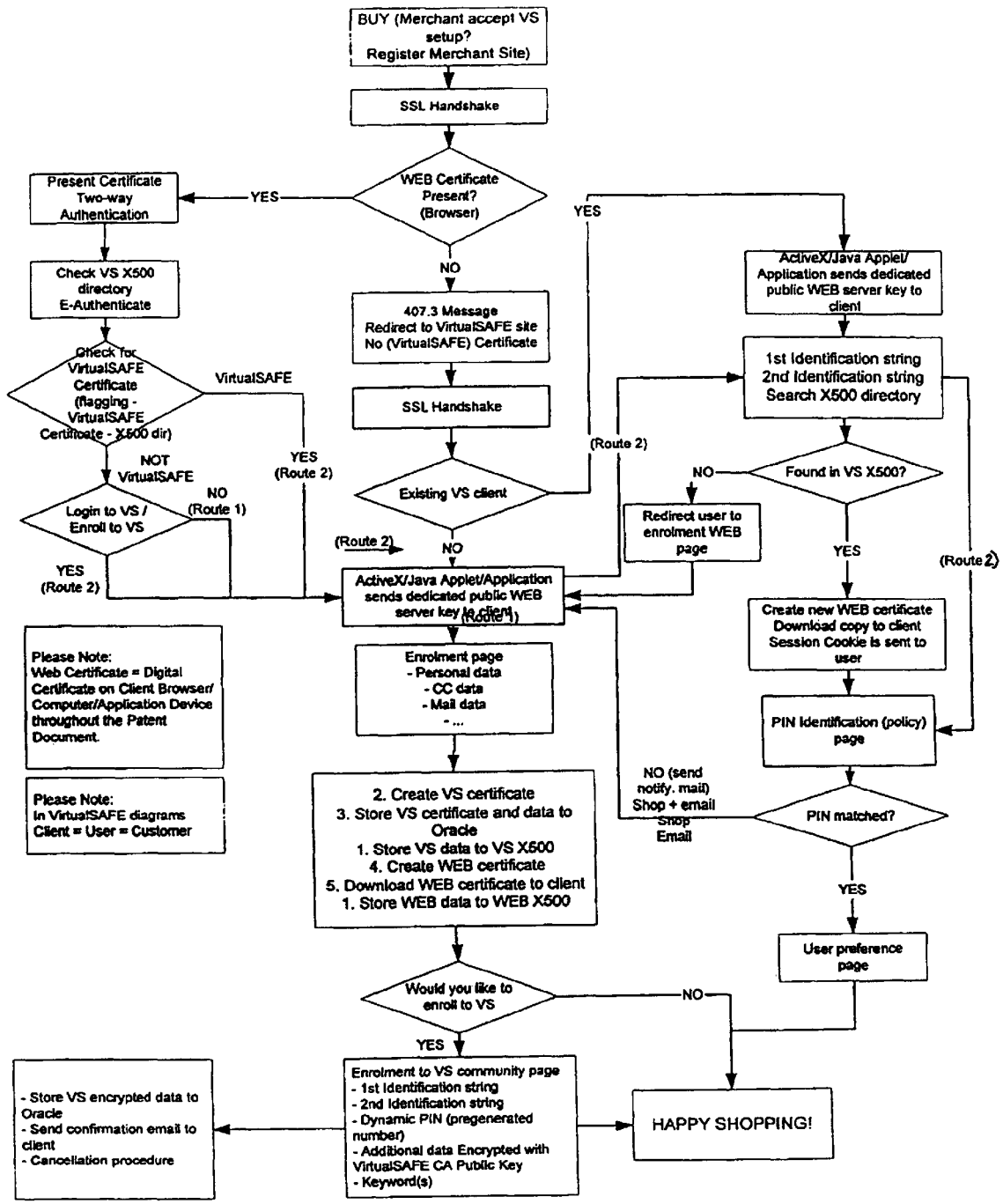
FIG. 3 is a flowchart illustrating the steps for user enrollment in VirtualSAFE in the general case in accordance with an embodiment of the invention.

User Enrolment: Case 1. Referring to FIG. 3, there is shown a flowchart illustrating the steps for user enrollment in VirtualSAFE, in the general case, in accordance with an embodiment of the invention.

Figure 4:
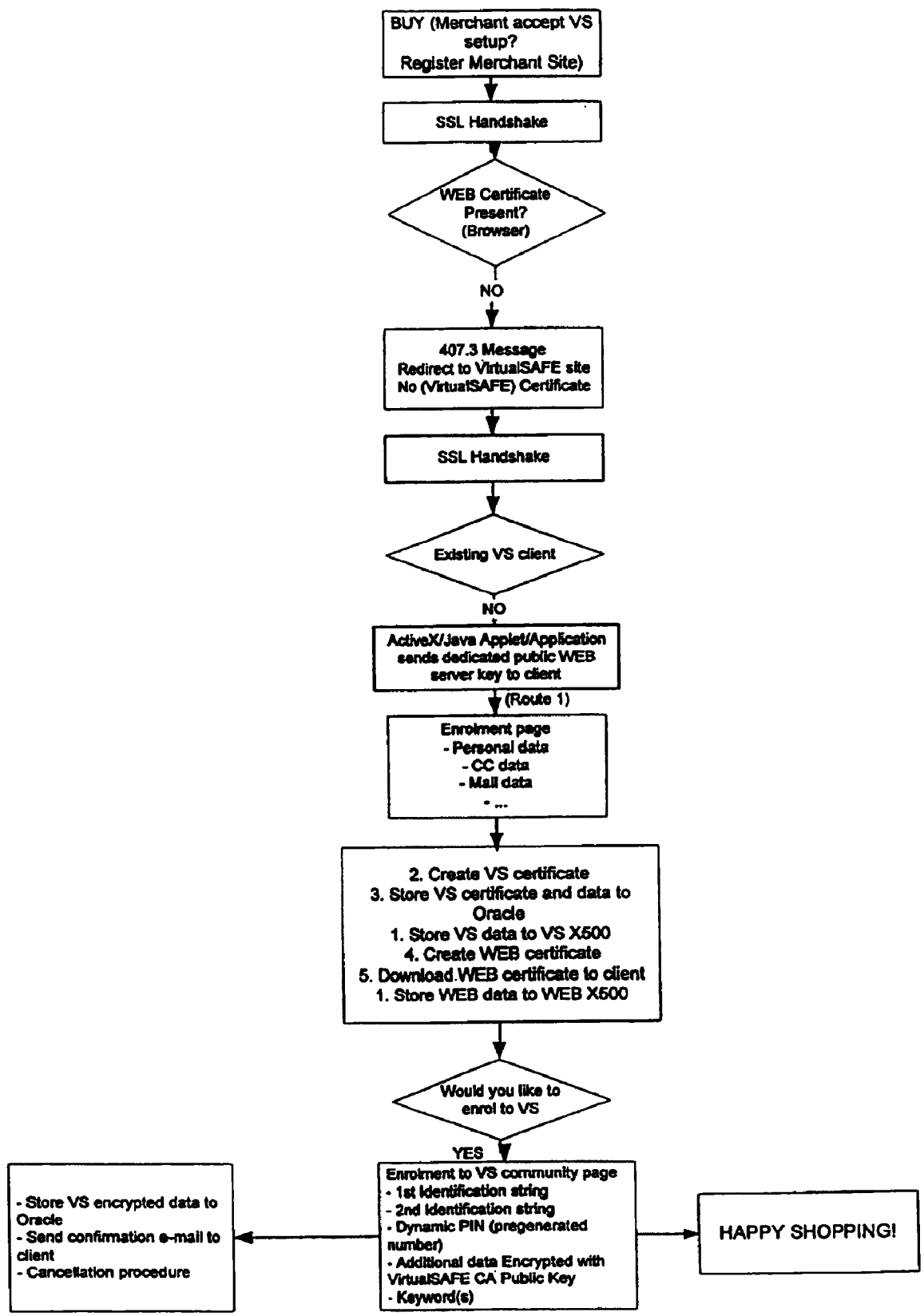
FIG. 4 is a flowchart illustrating the steps for user enrollment in VirtualSAFE in a second case in accordance with an embodiment of the invention.

User Enrolment: Case 2. Referring to FIG. 4, there is shown a flowchart illustrating the steps for user (or resource) enrollment in VirtualSAFE, in the case of "No Web certificate+Full VirtualSAFE Sign-Up Process+Payment Processing", in accordance with an embodiment of the invention. The following steps are included:

Step 1—ACCESS
  User decides to proceed with purchase (BUY)
Step 2—SSL Certificate Handshake Attempted
  The first authentication takes place as soon as the user has been accepted as a Registered User Site by use of the Secure Sockets Layer (SSL).
Step 3—Is the User's WEB Certificate present?
  The system checks to see whether or not the user's WEB certificate is present. In the case illustrated by FIG. 4, it isn't available or present. Therefore, message 407.3 gets sent through the VirtualSAFE Web Certificate present site to the VirtualSAFE Web Certificate not present site indicating that no Web Certificate exists to authenticate the user. The user is redirected.
Step 4—No Certificate SSL Session
  SSL session is established by the Web Server generating a temporary user session certificate.
Step 5—Existing VirtualSAFE User
  Is the user an existing VirtualSAFE client or is this the first time they are trying to sign-up and process a payment? NO
Step 6—Active X/Java Applet/Application sends dedicated public WEB server key to client
  Once this has been done.
Step 7—Enrolment/registration page
  The client is hyperlinked to the Enrolment/registration page where they enter their personal data, credit data, email data, etc. Note: The data entered by the user will not have to be entered again, as all of the information provided will be stored in VirtualSAFE. Once the user has completed entering their information:
Step 8—Partial Enrolment
  A VirtualSAFE certificate will be created for the user
  The user's data and the user's VirtualSAFE certificate will be stored to the Secure Data Repository.
  All of the user's VirtualSAFE data will be stored to the VirtualSAFE x500
  The user's WEB certificate will be created
  The user's WEB certificate will be downloaded and sent to them
  The user's WEB data will be stored to the WEB x500
Step 9—Confirmation to the user—Full enrolment
  Would you like to enroll with VirtualSAFE? YES
Step 10—Enrolment to VirtualSAFE community
  This is where the final user setup is confirmed and additional data is encrypted with the VirtualSAFE Certification Authority Public Key, which also includes:
    1st identification string
    2nd identification string
    Dynamic PIN (pre-generated number)
    Additional data encrypted with a VirtualSAFE CA Public Key
    And, any keyword(s) that may be need for further authentication
Step 11—The enabler
  The user has become a registered and authenticated VirtualSAFE user and can now shop anywhere on the net, their information is stored in encrypted form to Oracle, or any database, etc., and an email of registered confirmation is sent to them, as well as a cancellation procedure.

Figure 5:
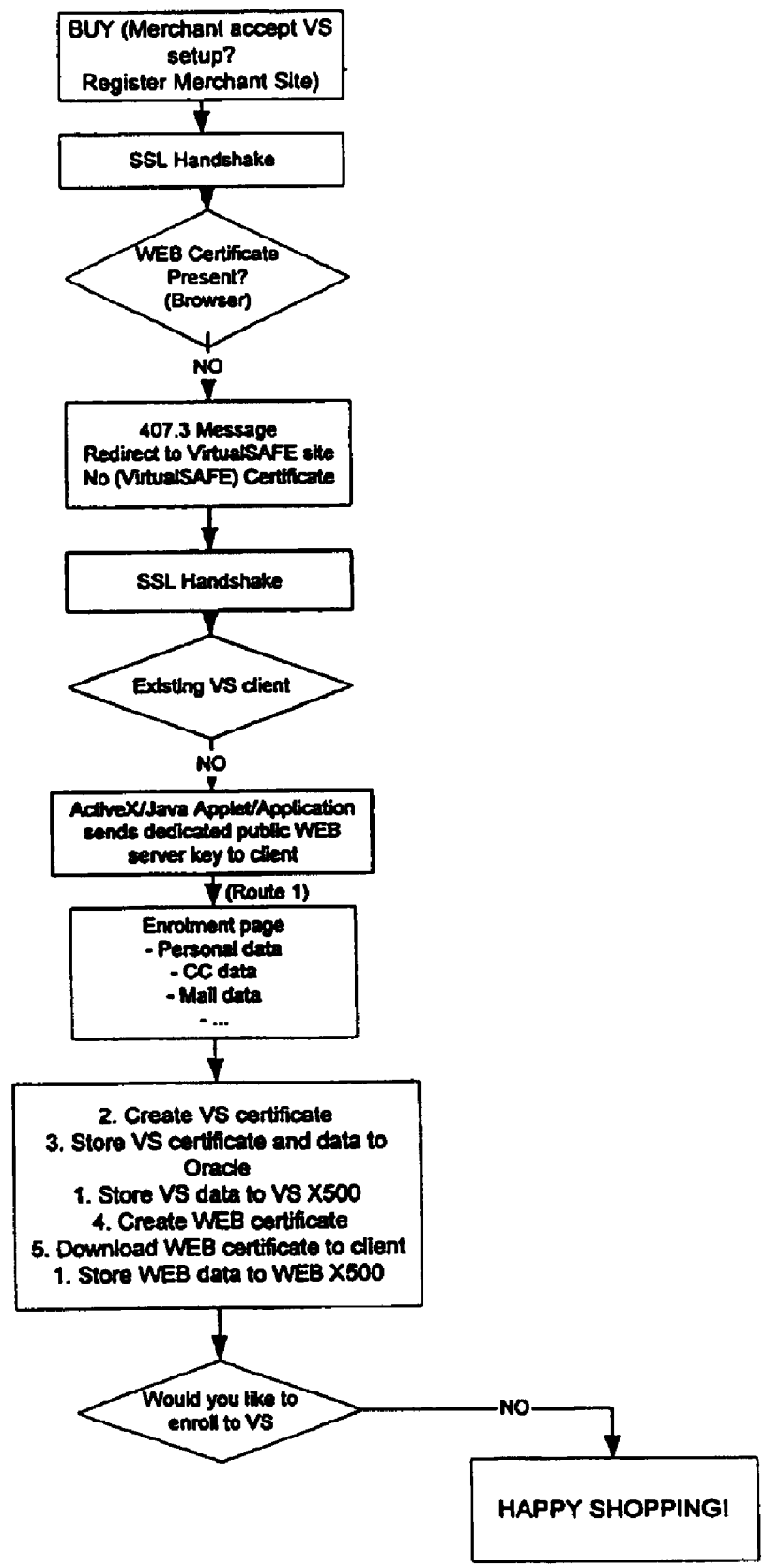
FIG. 5 is a flowchart illustrating the steps for user enrollment in VirtualSAFE in a third case in accordance with an embodiment of the invention.

User Enrolment: Case 3. Referring to FIG. 5, there is shown a flowchart illustrating the steps for user (or resource) enrollment in VirtualSAFE, in the case of "No WEB certificate+Only Payment Processing", in accordance with an embodiment of the invention. The following steps are included:

Step 1—ACCESS
  User decides to proceed with purchase (BUY)
Step 2—SSL Certificate Handshake Attempted
  The first authentication takes place as soon as the user has been accepted as a Registered User Site by use of the Secure Sockets Layer (SSL).
Step 3—Is the User's WEB Certificate present?
  The system checks to see whether or not the user's WEB certificate is present. In the FIG. 5 case, it isn't available or present. Therefore, message 407.3 gets sent through the VirtualSAFE Web Certificate present site to the VirtualSAFE Web Certificate not present site indicating that no Web Certificate exists to authenticate the user. The user is redirected.
Step 4—No Certificate SSL Session
  SSL session is established by the Web Server generating a temporary user session certificate.

Step 5—Existing VirtualSAFE User
Is the user an existing VirtualSAFE client or is this the first time they are trying to sign-up and process a payment? NO Step 6—Active X/Java Applet/Application sends dedicated public WEB server key to client
Once this has been done.

Step 7—Enrolment/registration page
The client is hyperlinked to the Enrolment/registration page where they enter their personal data, credit data, email data, etc. Note: The data entered by the user will not have to be entered again, as all of the information provided will be stored in the VirtualSAFE. Once the user has completed entering their information:

Step 8—Partial Enrolment
A VirtualSAFE certificate will be created for the user
The user's data and the user's VirtualSAFE certificate will be stored to the Secure Data Repository.
All of the user's VirtualSAFE data will be stored to the VirtualSAFE x500
The user's WEB certificate will be created
The user's WEB certificate will be downloaded and sent to them
The user's WEB data will be stored to the WEB x500

Step 9—Confirmation to the user—Full enrolment
Would you like to enroll with VirtualSAFE? NO Step 10—The enabler
The user has become a registered and authenticated VirtualSAFE user and can now shop anywhere on the Internet, their information is stored in encrypted form to Oracle, or any other database, etc., and an email of registered confirmation is sent to them, as well as a cancellation procedure.

Figure 6:
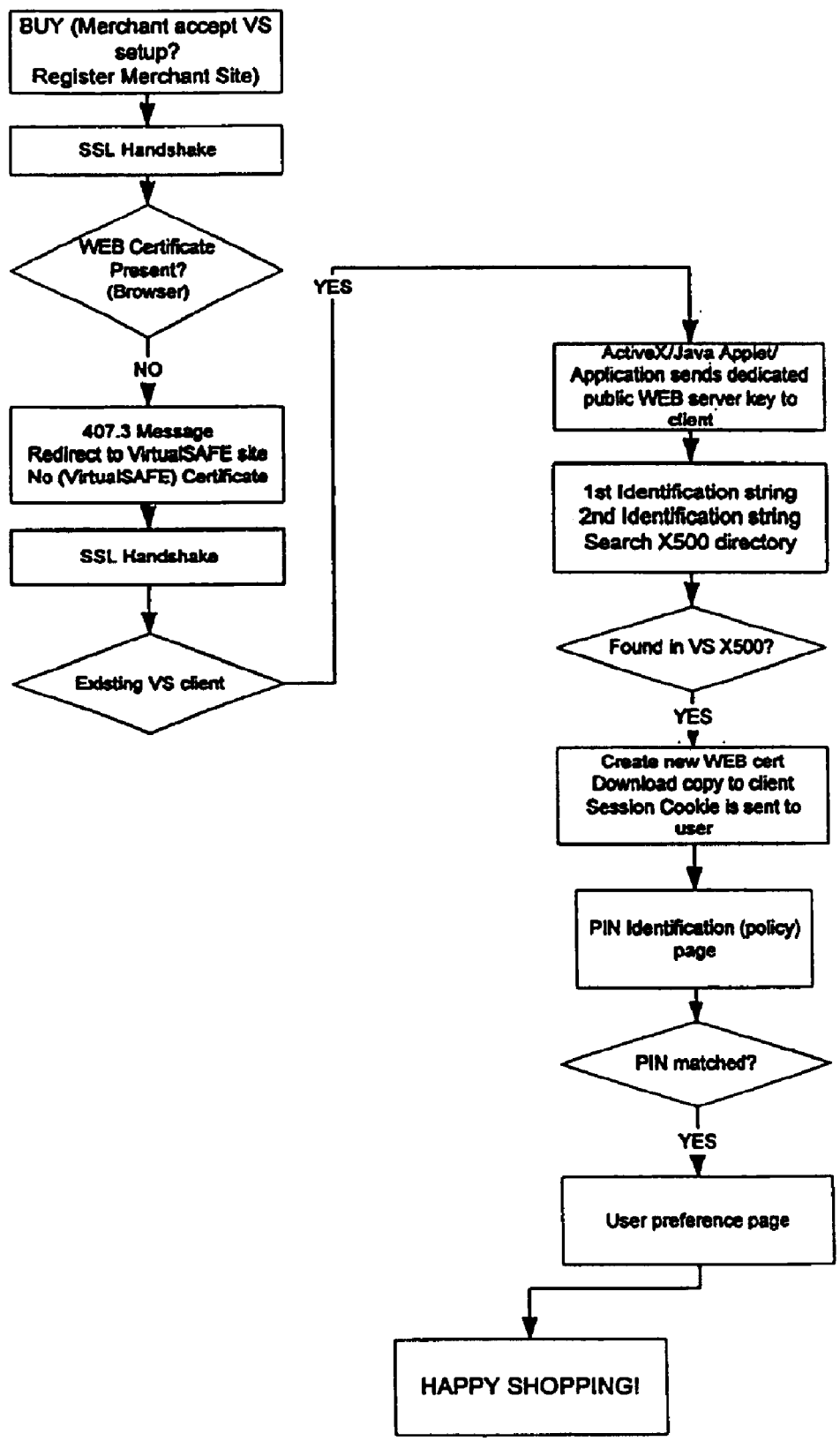
FIG. 6 is a flowchart illustrating the steps for user enrollment in VirtualSAFE in a fourth case in accordance with an embodiment of the invention.

User Enrolment: Case 4. Referring to FIG. 6, there is shown a flowchart illustrating the steps for user (or resource) enrollment in VirtualSAFE, in the case of "No Web certificate+Already a VirtualSAFE member+Known PIN", in accordance with an embodiment of the invention. The following steps are included:

Step 1—ACCESS
User decides to proceed with purchase (BUY)

Step 2—SSL Certificate Handshake Attempted
The first authentication takes place as soon as the user has been accepted as a Registered User Site by use of the Secure Sockets Layer (SSL).

Step 3—Is the User's WEB Certificate present?
The system checks to see whether or not the user's WEB certificate is present. In the FIG. 6 case, it isn't available or present. Therefore, message 407.3 gets sent through VirtualSAFE Web Certificate present site to the VirtualSAFE Web Certificate not present site indicating that no Web Certificate exists to authenticate the user. The user is redirected.

Step 4—No Certificate SSL Session
SSL session is established by the Web Server generating a temporary user session certificate.

Step 5—Existing VirtualSAFE User
Is the user an existing VirtualSAFE client or is this the first time they are trying to sign-up and process a payment? YES Step 6—Active X/Java Applet/Application sends dedicated public WEB server key to client
Once this has been done.

Step 7—Identification strings authenticated
1st identification string
2nd identification string
Search of x500 directory is done Step 8—Is the user authenticated?
The system checks the VirtualSAFE x500 for verification. YES.

Step 9—Creates new WEB certificate
Once the user has been authenticated, the system creates a new WEB certificate and downinitiations it to the client, and the Session Cookie is sent to the user.

Step 10—PIN identification (policy)
The system displays to the user the PIN Identification Policy page.

Step 11—Encrypted PIN authentication page
The system checks to ensure whether the encrypted PIN number entered by the user matches the encrypted PIN on the system.
If YES, the encrypted PIN matches, then the user is sent to:

Step 12—User Preference Page, and then to wherever they would like to shop on the net.
However, if NO the encrypted PIN doesn't match, then the method illustrated in FIG. 5 is followed.

Figure 7:
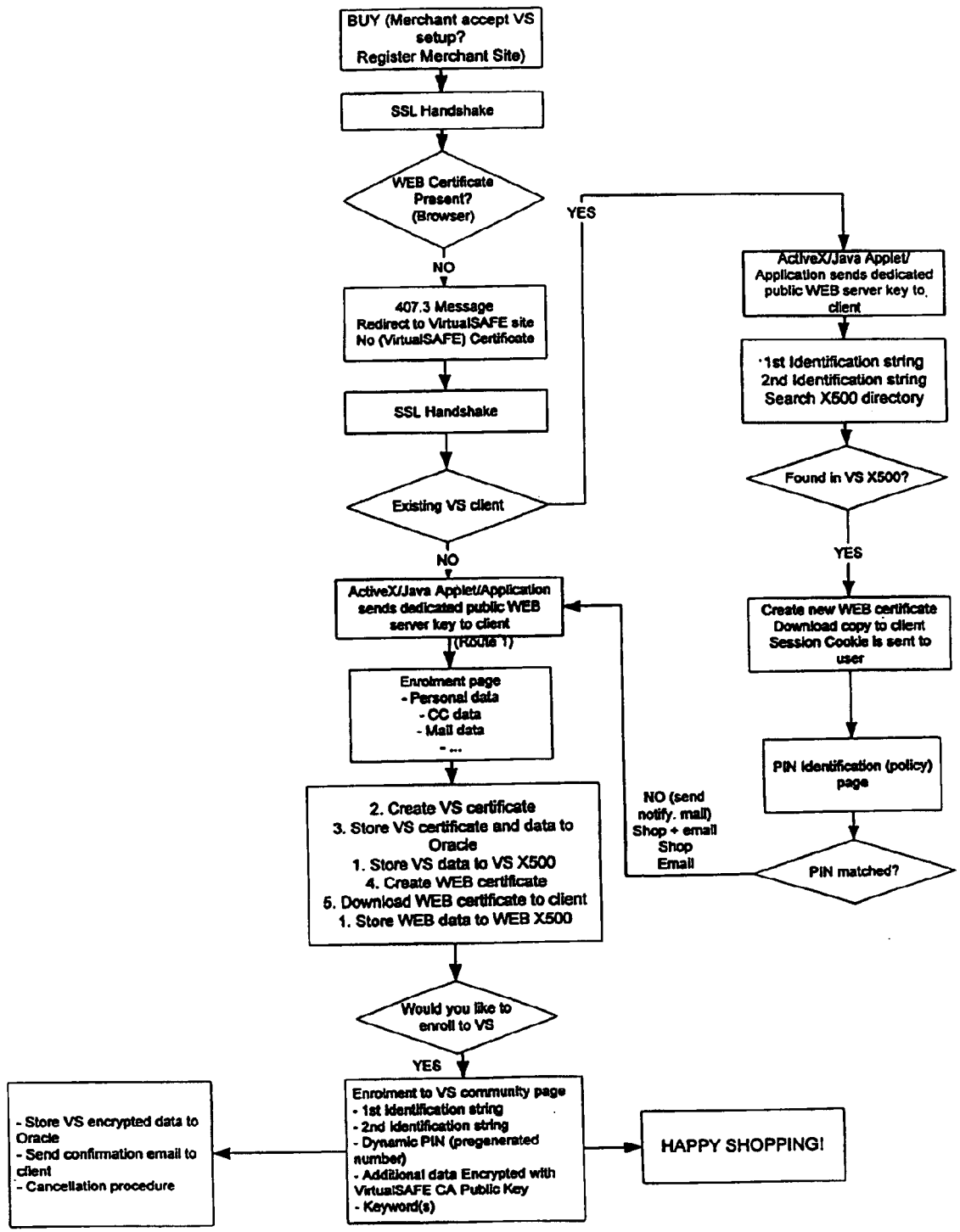
FIG. 7 is a flowchart illustrating the steps for user enrollment in VirtualSAFE in a fifth case in accordance with an embodiment of the invention.

User Enrolment: Case 5. Referring to FIG. 7, there is shown a flowchart illustrating the steps for user (or resource) enrollment in VirtualSAFE, in the case of "No Web certificate+Already a VirtualSAFE member+Unknown encrypted PIN+email notification", in accordance with an embodiment of the invention. The following steps are included:

Step 1—PIN authentication page
The system checks to ensure whether the encrypted PIN number entered by the user matches the encrypted PIN on the system. If NO the encrypted PIN doesn't match, then: Message is sent by email to the user, and the user is redirected to the WEB enrolment page.

Step 2—Enrolment/Registration page
The client is hyperlinked to the Enrolment/Registration page where they re-enter/or confirm their personal data, credit data, email data, etc. Note: The data entered by the user will never ever have to be entered again, as all of the information provided will be stored in the VirtualSAFE. Once the user has completed entering their information:

Step 3
A VirtualSAFE certificate will be created for the user
The user's data and the user's VirtualSAFE certificate will be stored to the Secure Data Repository.
All of the user's VirtualSAFE data will be stored to the VirtualSAFE x500
The user's WEB certificate will be created
The user's WEB certificate will be downinitiationed and sent to them
The user's WEB data will be stored to the WEB x500

Step 4—Confirmation to the user
Would you like to enroll with VirtualSAFE? NO

Step 5—The enabler
The user has become a registered and authenticated VirtualSAFE user and can now shop anywhere on the net, their information is stored in encrypted form to Oracle, or any other database, etc., and an email of registered confirmation is sent to them, as well as a cancellation procedure.

Figure 8:
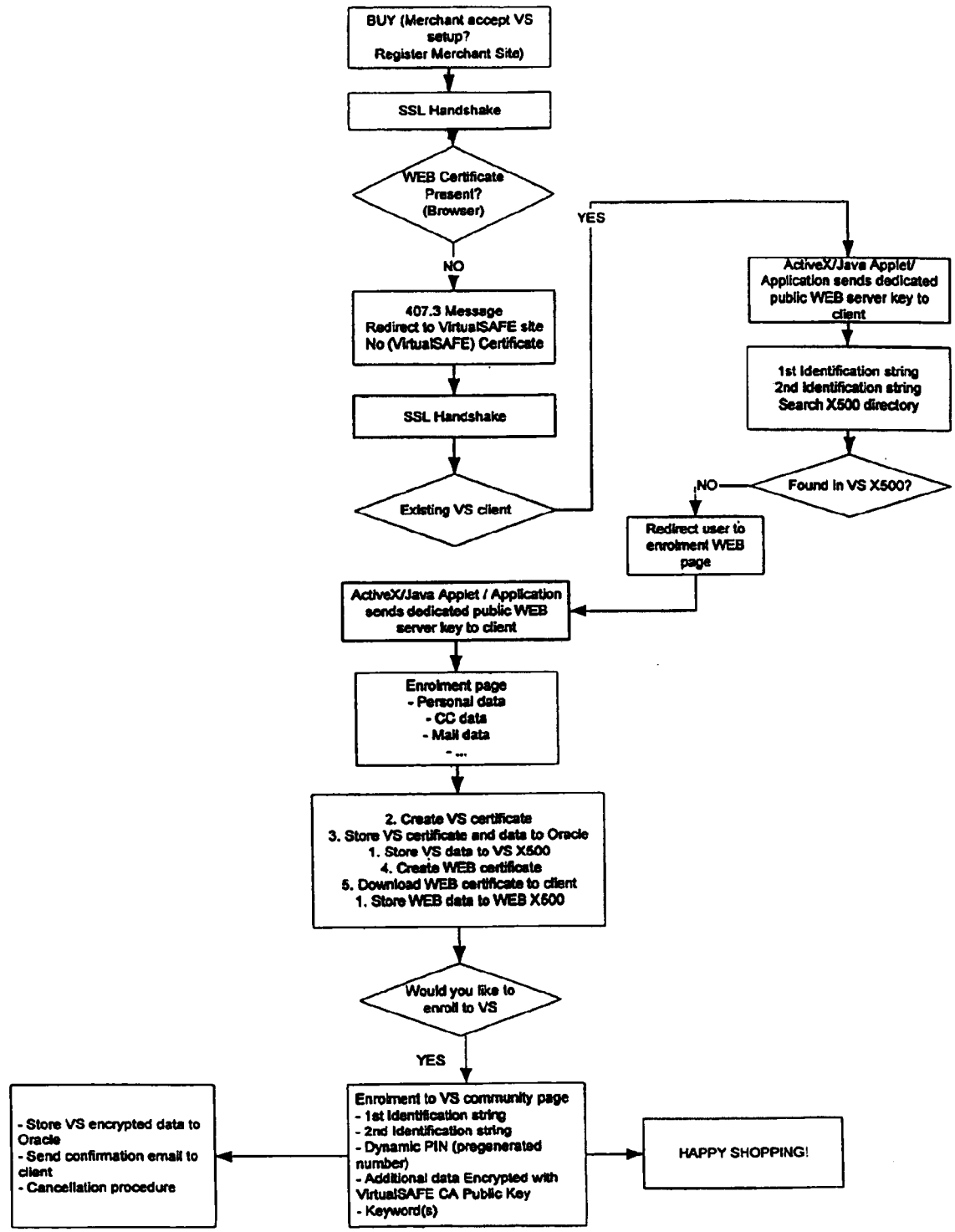
FIG. 8 is a flowchart illustrating the steps for user enrollment in VirtualSAFE in a sixth case in accordance with an embodiment of the invention.

User Enrolment: Case 6. Referring to FIG. 8, there is shown a flowchart illustrating the steps for user (or resource) enrollment in VirtualSAFE, in the case of "No Web certificate+Already a VirtualSAFE member+no x500 entry", in accordance with an embodiment of the invention. The following steps are included:

Step 1—ACCESS
   User decides to proceed with purchase (BUY)

Step 2—SSL Certificate Handshake Attempted
   The first authentication takes place as soon as the user has been accepted as a Registered User Site by use of the Secure Sockets Layer (SSL).

Step 3—Is the User's WEB Certificate present?
   The system checks to see whether or not the user's WEB certificate is present. In the FIG. 8 case, it isn't available or present. Therefore, message 407.3 gets sent through VirtualSAFE Web Certificate present site to the VirtualSAFE Web Certificate not present site indicating that no Web Certificate exists to authenticate the user. User redirected.

Step 4—No Certificate SSL Session
   SSL session is established by the Web Server generated a temporary user session certificate.

Step 5—Existing VirtualSAFE User
   Is the user an existing VirtualSAFE client or is this the first time they are trying to sign-up and process a payment? NO Step 6—Active X/Java Applet/Application sends dedicated public WEB server key to client
   Once this has been done.

Step 7—Identification strings authenticated
   1st identification string
   2nd identification string
   Search of x500 directory is done Step 8—Is the user authenticated?
   The system checks the VirtualSAFE x500 for verification. NO.

Step 9—Enrolment/Registration page
   The client is hyperlinked to the Enrolment/Registration page where they re-enter/or confirm their personal data, credit data, email data, etc. Note: The data entered by the user will never ever have to be entered again, as all of the information provided will be stored in the VirtualSAFE. Once the user has completed entering their information:

Step 10
   A VirtualSAFE certificate will be created for the user
   The user's data and the user's VirtualSAFE certificate will be stored to the Secure Data Repository.
   All of the user's VirtualSAFE data will be stored to the VirtualSAFE x500
   The user's WEB certificate will be created
   The user's WEB certificate will be downinitiationed and sent to them
   The user's WEB data will be stored to the WEB x500

Step 11—Confirmation to the user
   Would you like to enroll with VirtualSAFE? YES/NO Step 12—The enabler
   The user has become a registered and authenticated VirtualSAFE user and can now shop anywhere on the net, their information is stored in encrypted form to Oracle, or any other database, etc., and an email of registered confirmation is sent to them, as well as a cancellation procedure.

Figure 9:
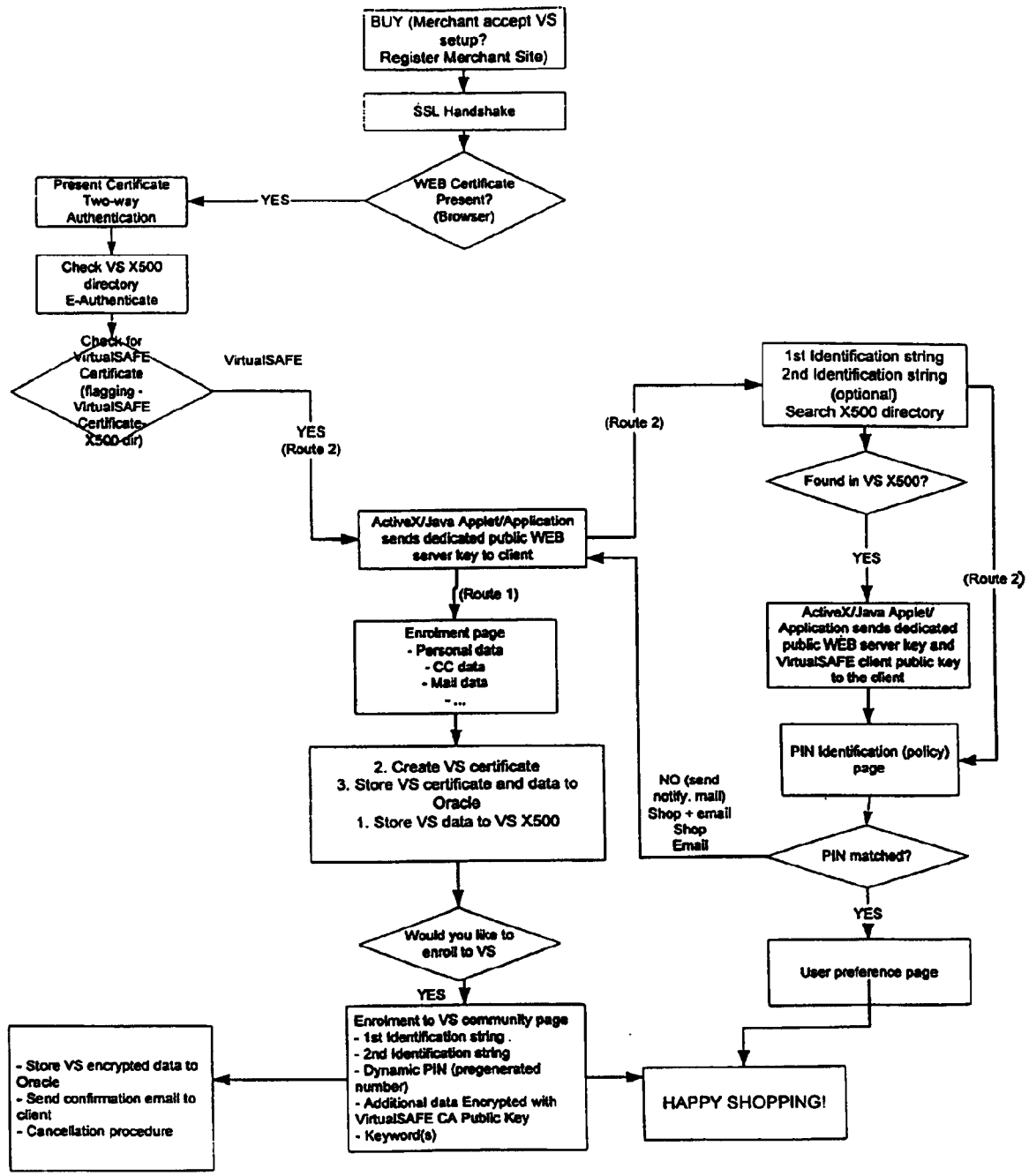
FIG. 9 is a flowchart illustrating the steps for user enrollment in VirtualSAFE in a seventh case in accordance with an embodiment of the invention.

User Enrolment: Case 7. Referring to FIG. 9, there is shown a flowchart illustrating the steps for user (or resource) enrollment in VirtualSAFE, in the case of "Web certificate+Unknown/Known PIN", in accordance with an embodiment of the invention. The following steps are included:

Step 1—ACCESS
   User decides to proceed with purchase (BUY)

Step 2—SSL Certificate Handshake Attempted
   The first authentication takes place as soon as the user has been accepted as a Registered User Site by use of the Secure Sockets Layer (SSL).

Step 3—Is the WEB Certificate present?
   The system checks to see whether or not a WEB certificate is present. In the FIG. 9 case, the WEB certificate is present.

Step 4—WEB Certificate is present
   The system performs a two-way authentication process.

Step 5—Checks VirtualSAFE certificate-x500
   The system checks the VirtualSAFE x500 to Electronically Authenticate the computer.

Step 6—Checks for VirtualSAFE certificate
   The system checks for a VirtualSAFE certificate by flagging the VirtualSAFE x500 directory. When the system confirms that the VirtualSAFE certificate is available, the user is routed to Step 7.

Step 7—Active X/Java Applet/Application sends dedicated public WEB server key to client
   Once this has been done.

Step 8—Identification strings authenticated
   1st identification string
   2nd identification string (optional)
   Search of x500 directory is done Step 9—Is the user authenticated?
   The system checks the VirtualSAFE x500 for verification. YES.

Step 10—Active X/Java Applet/Application sends dedicated public WEB server key to client
   Once this has been done.

Step 11—PIN identification (policy)
   The system displays to the user the PIN Identification Policy page.

Step 12—PIN authentication page
   The system checks to ensure whether the PIN number entered by the user matches the PIN on the system. If YES, the PIN matches, then the user is sent to: Step 13—User Preference Page, and then to wherever they would like to shop on the net. However, if NO the PIN doesn't match, then the FIG. 7 method is followed to completion.

Figure 10:
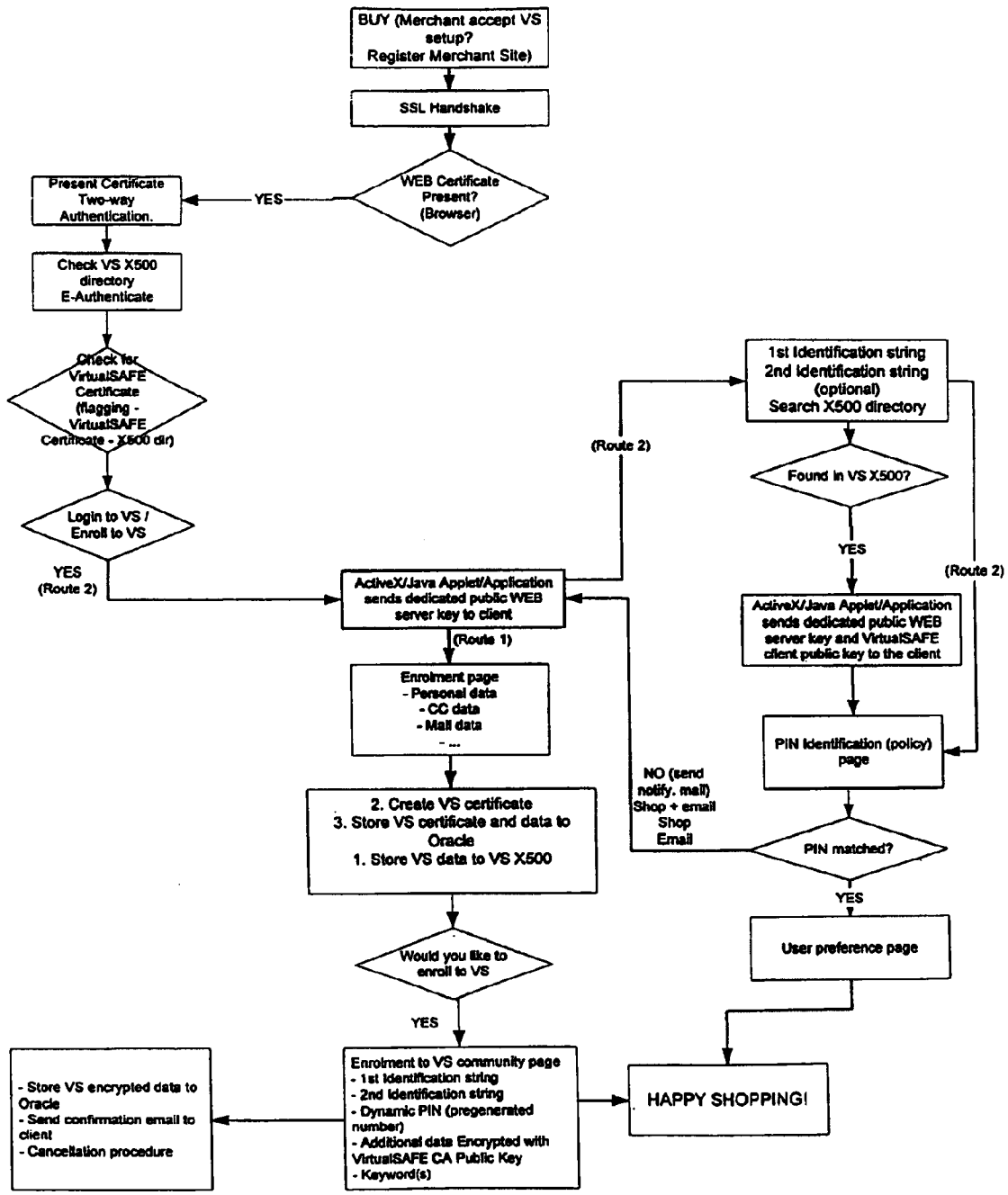
FIG. 10 is a flowchart illustrating the steps for user enrollment in VirtualSAFE in an eighth case in accordance with an embodiment of the invention.

User Enrolment: Case 8. Referring to FIG. 10, there is shown a flowchart illustrating the steps for user (or resource) enrollment in VirtualSAFE, in the case of "Web certificate (No VirtualSAFE)+Unknown/Known PIN", in accordance with an embodiment of the invention. The following steps are included:

Step 1—ACCESS
   User decides to proceed with purchase (BUY)

Step 2—SSL Certificate Handshake Attempted
   The first authentication takes place as soon as the user has been accepted as a Registered User Site by use of the Secure Sockets Layer (SSL).

Step 3—Is the WEB Certificate present?
The system checks to see whether or not a WEB certificate is present. In the FIG. 10 case, the WEB certificate is present.

Step 4—WEB Certificate is present
 The system performs a two-way authentication process.
Step 5—Checks VirtualSAFE x500
 The system checks the VirtualSAFE x500 to Electronically Authenticate the user. The e-authenticate interoperable module checks the validity of the web certificate by checking the content of the directory of the originating CA. The VirtualSAFE Policy will determine whether the VirtualSAFE directory, or the originating directory is checked or both are checked.
Step 6—Checks for VirtualSAFE certificate
 The system checks for a VirtualSAFE certificate by flagging the VirtualSAFE x500 directory. If the VirtualSAFE certificate cannot be verified, then the user will go to Login to VirtualSAFE/Enrol in VirtualSAFE to be confirmed and then carry on to Step 7.
Step 7—Active X/Java Applet/Application sends dedicated public WEB server key to client
 Once this has been done.
Step 8—Identification strings authenticated
 1st identification string
 2nd identification string (optional)
 Search of x500 directory is done
Step 9—Is the user authenticated?
 The system checks the VirtualSAFE x500 for verification. YES.
Step 10—Active X/Java Applet/Application sends dedicated public WEB server key to client
 Once this has been done.
Step 11—PIN identification (policy)
 The system displays to the user the PIN Identification Policy page.
Step 12—PIN authentication page
 The system checks to ensure whether the PIN number entered by the user matches the PIN on the system. If YES, the PIN matches, then the user is sent to: Step 13—User Preference Page, and then to wherever they would like to shop on the net. However, if NO the PIN doesn't match, then the method of FIG. 5 is followed to completion.

Figure 11:
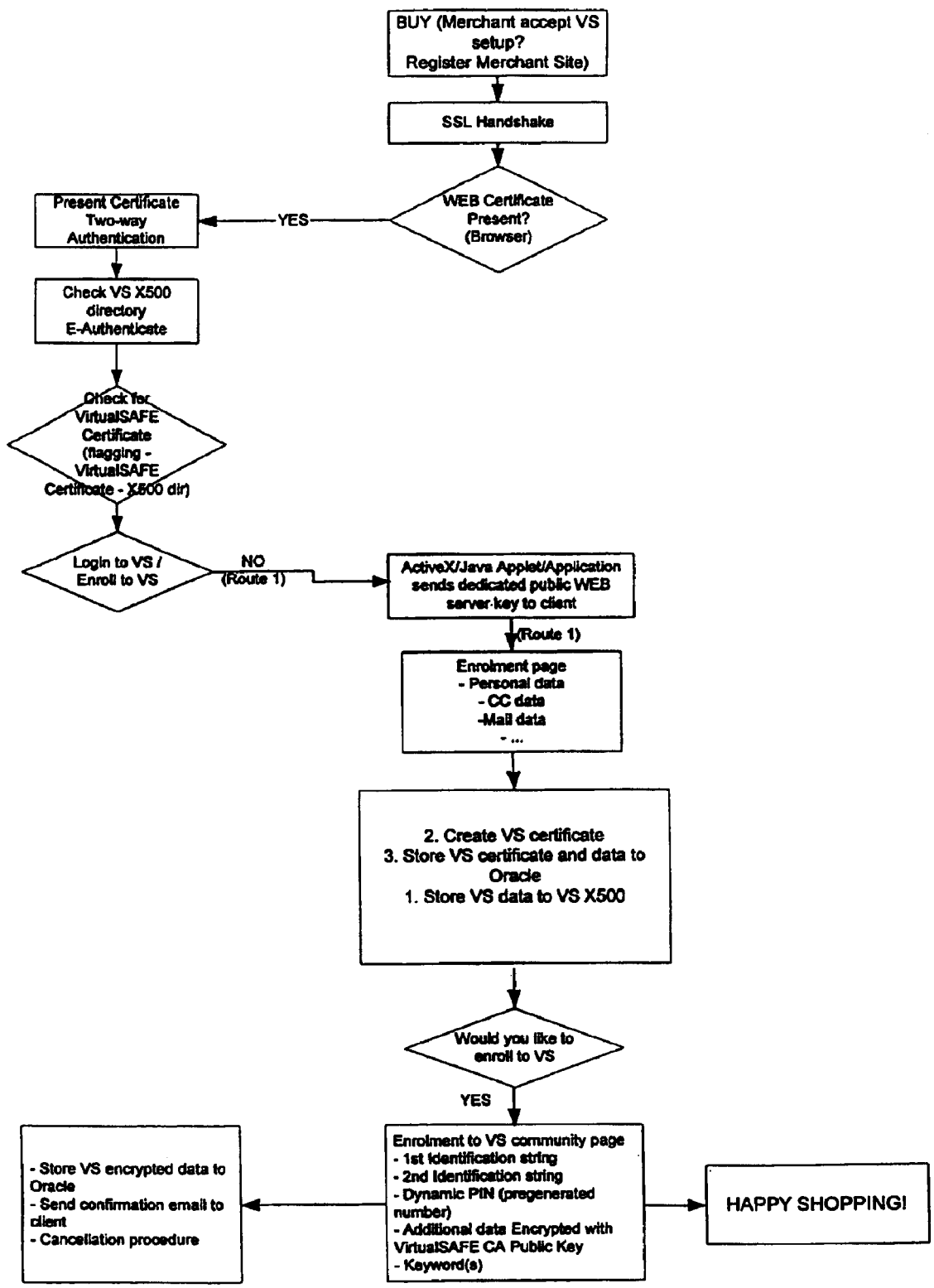
FIG. 11 is a flowchart illustrating the steps for user enrollment in VirtualSAFE in a ninth case in accordance with an embodiment of the invention.

User Enrolment: Case 9. Referring to FIG. 11, there is shown a flowchart illustrating the steps for user (or resource) enrollment in VirtualSAFE, in the case of "WEB certificate (No VirtualSAFE)+Enrolment/Payment Process", in accordance with an embodiment of the invention. The following steps are included:

Step 1—ACCESS
 User decides to proceed with purchase (BUY)
Step 2—SSL Certificate Handshake Attempted
 The first authentication takes place as soon as the user has been accepted as a Registered User Site by use of the Secure Sockets Layer (SSL).
Step 3—Is the WEB Certificate present?
 The system checks to see whether or not a WEB certificate is present. In the FIG. 11 case, the WEB certificate is present.
Step 4—WEB Certificate is present
 The system performs a two-way authentication process.
Step 5—Checks VirtualSAFE x500
 The system checks the VirtualSAFE x500 to Electronically Authenticate the user. The e-authenticate interoperable module checks the validity of the web certificate by checking the content of the directory of the originating CA. The VirtualSAFE Policy will determine whether the VirtualSAFE directory, or the originating directory is checked or both are checked.
Step 6—Checks for VirtualSAFE certificate
 The system checks for a VirtualSAFE certificate by flagging the VirtualSAFE x500 directory. When the system confirms that the VirtualSAFE certificate is available, the user is routed to Step 7. If the VirtualSAFE certificate cannot be verified, then the user will go to Login to VirtualSAFE/Enroll in VirtualSAFE to be confirmed and then carry on to Step 7.
Step 7—Active X/Java Applet/Application sends dedicated public WEB server key to client
 Once this has been done.
Step 8—Enrolment/Registration page
 The client is hyperlinked to the Enrolment/Registration page where they re-enter/or confirm their personal data, credit data, email data, etc. Note: The data entered by the user will never ever have to be entered again, as all of the information provided will be stored in the VirtualSAFE. Once the user has completed entering their information:
Step 9
 A VirtualSAFE certificate will be created for the user
 The user's data and the user's VirtualSAFE certificate will be stored to the Secure Data Repository.
 All of the user's VirtualSAFE data will be stored to the VirtualSAFE x500
Step 10—Confirmation to the user
 Would you like to enroll with VirtualSAFE? NO
Step 11—The enabler
 The user has become a registered and authenticated VirtualSAFE user and can now shop anywhere on the net, their information is stored in encrypted form to Oracle, or any other database, etc., and an email of registered confirmation is sent to them, as well as a cancellation procedure.

Figure 12:
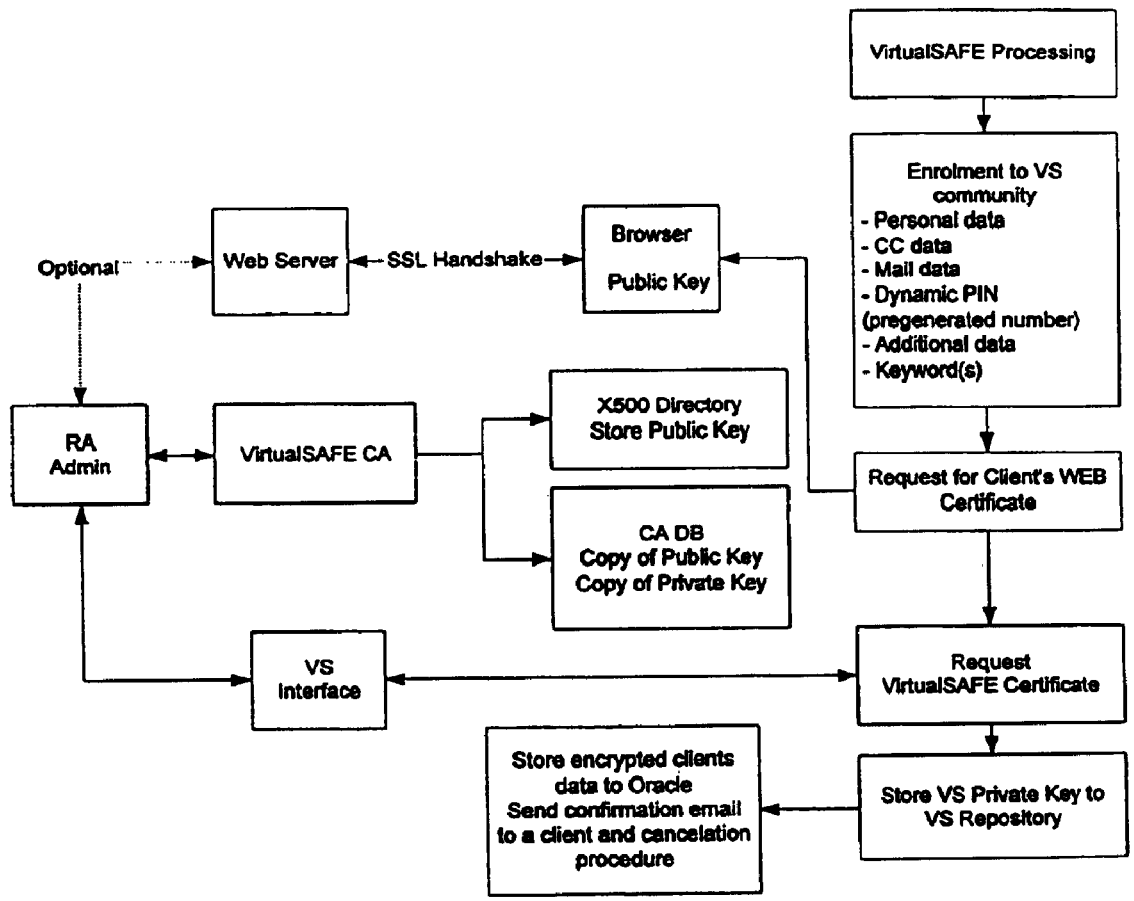
FIG. 12 is a flowchart illustrating CA process steps in VirtualSAFE in accordance with an embodiment of the invention.

CA Processes. Referring to FIG. 12, there is shown a flowchart illustrating CA process steps in accordance with an embodiment of the invention. The steps to be followed are as per Certificate Policies (CP) and Certificate Practice Statements (CPS).

Enrolment Policy. Procedures for handling incorrect PIN or mistyped PIN are handled in accordance to VirtualSAFE Policy and/or Merchant/Business Policy.

Module Block Diagrams. In the following, and referring to FIGS. 13 through 29, block diagrams and more detailed descriptions are included for selected VirtualSAFE modules.

Figure 13:
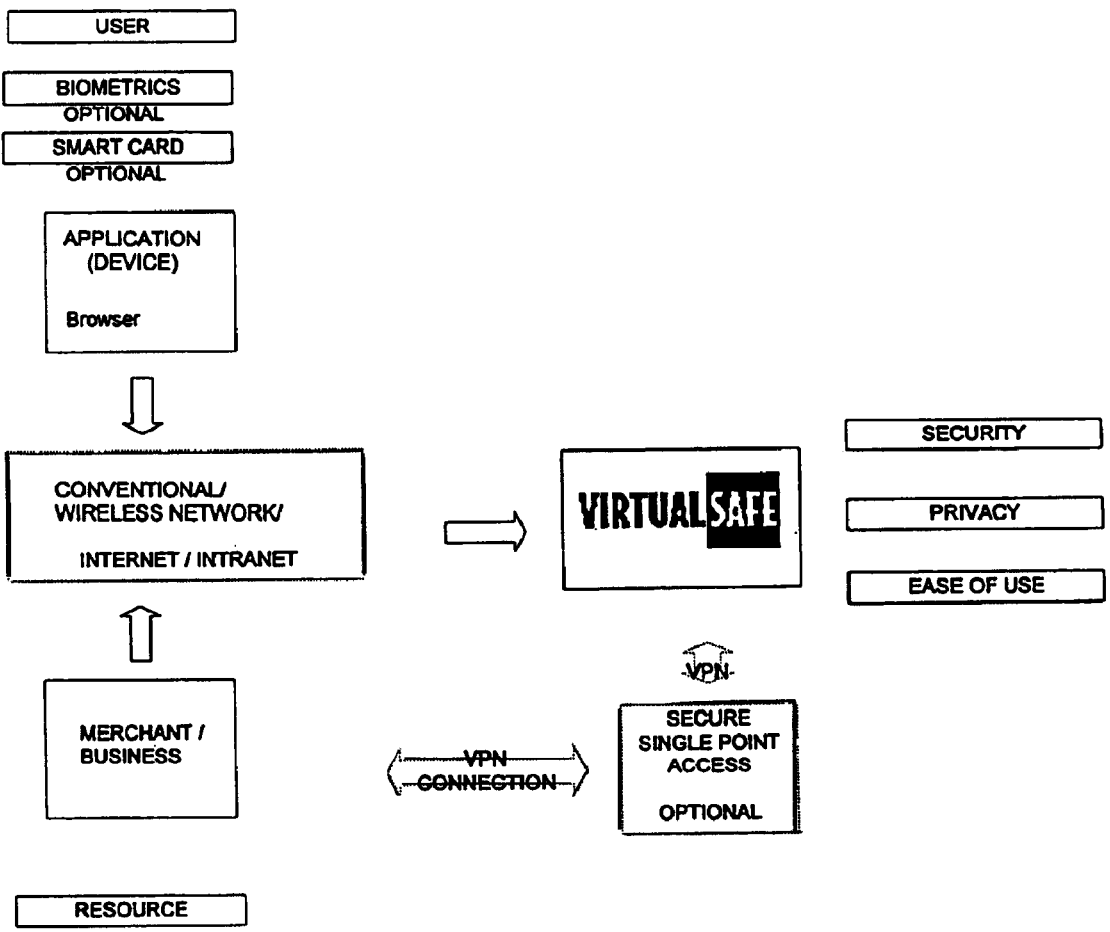
FIG. 13 is a block diagram illustrating participants and their contractual relationships in VirtualSAFE in accordance with an embodiment of the invention.

Participants. Referring to FIG. 13, there is shown a block diagram illustrating the participants and their contractual relationships in VirtualSAFE in accordance with an embodiment of the invention. The electronic commerce environment requires significant security and auditing processes bound to the actual business operations and processes. Accordingly, the primary concerns are the contractual relationship between parties, the enforcement of the business policy, and the transparency of the processes.

1. VirtualSAFE Business Policy. Within the VirtualSAFE Business Policy there are three main components that that will never be compromised and they are: Privacy, Security, and Ease of Use.
 Privacy: The securely structured attributes that are handled and covered under the Privacy aspect of the VirtualSAFE Business Policy include:
 ACCESS And PRIVILEGES. In VirtualSAFE, only the user has access to their private information.
 Compliancy And Standards. VirtualSAFE adheres to the World Privacy Regulations and Standards.
 Higher Power Rule. In VirtualSAFE, Third Party access to private and personal information can only be granted by Court Order. This signifies the only time when a user's private information can be attained other than by the user.

Security: The securely structured attributes that are handled and covered under the Security aspect of the VirtualSAFE Business Policy include:

International Security Standards. VirtualSAFE follows all international standards for the security within x500 directories and is 140 FIPS/3 Complaint.

Monitoring, Support And Control. VirtualSAFE is comprehensively monitored 24 hours per day, 7 days per week. There is no shutdown time and support is readily available if required.

Remote Virus Scan. VirtualSAFE is continuously being upgraded with new virus protection directly and remotely to ensure the optimum in service, and security structure. As a leading technology in e-commerce secure systems, VirtualSAFE provides their users with the confidence that their information is secure from any virus and/or unwelcome invasion.

Ease of Use. The securely structured attributes that are handled and covered under the Ease of Use aspect of the VirtualSAFE Business Policy include:

User Experience. VirtualSAFE does not change the experience of the present user meaning that the user already has the basic skills that are required in order to use Virtual SAFE.

Info Entered Once. In VirtualSAFE, the user only has to input their private and personal information once, and then it is stored in the VirtualSAFE. Every time they login afterwards, their identity and credit attributes are linked to their digital ID.

Click-And-Go. VirtualSAFE users experience Click-and-Go from any VirtualSAFE site. Their digital IDs are recognized everywhere and they can jump from site to site quite easily.

2. Business Policy (Third Party). VirtualSAFE has the capability, and complies to other businesses' business policies, so as not to comprise their way of doing business.

Figure 14:
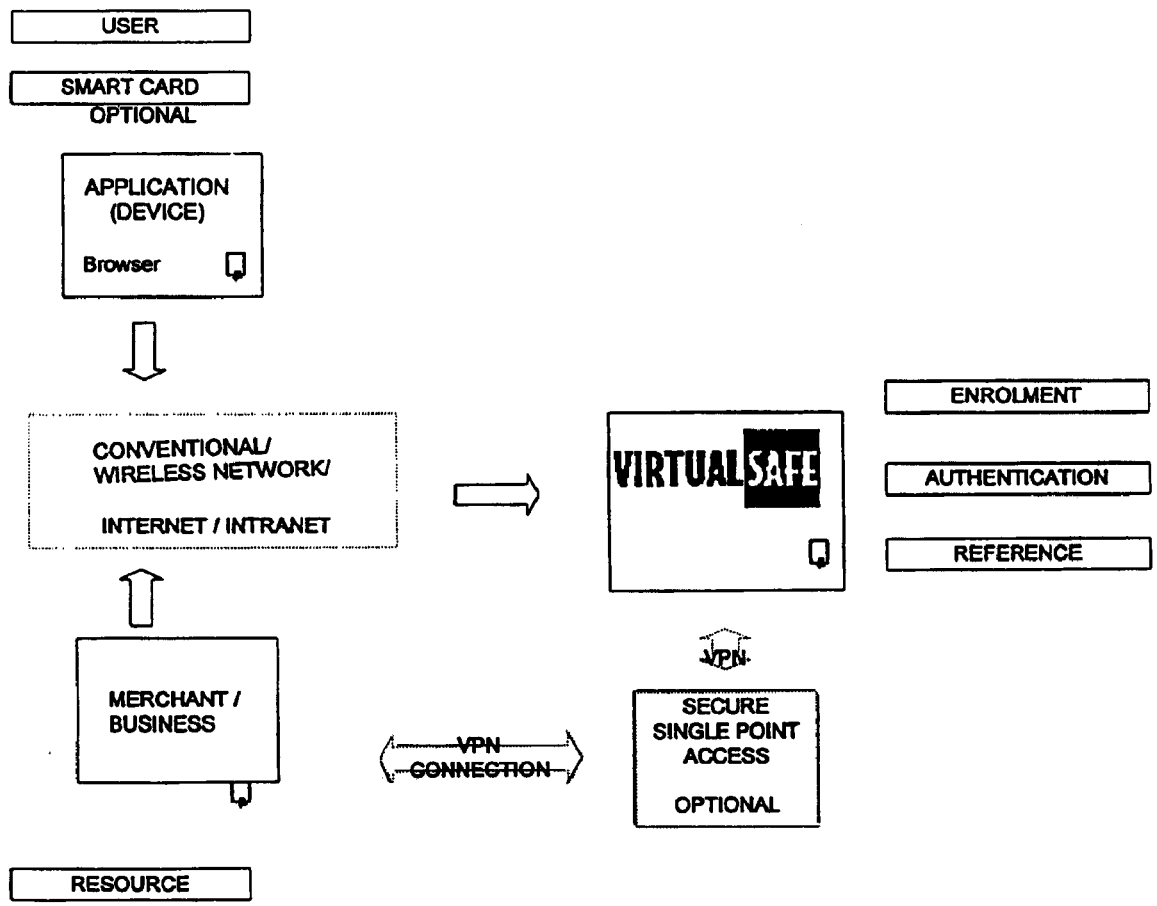
FIG. 14 is a block diagram illustrating the enrollment process in VirtualSAFE in accordance with an embodiment of the invention.

Enrolment. Referring to FIG. 14, there is shown a block diagram illustrating the enrollment process in VirtualSAFE in accordance with an embodiment of the invention. VirtualSAFE registers users' personal data (i.e. credit card information) once. Data pertaining to their enrolment, authentication, and reference is contained within VirtualSAFE. The User is issued a digital ID so that the user never has to enter their data online again. Enrolment data is stored securely in VirtualSAFE under a strict policy.

1. Enrolement in VirtualSAFE. In VirtualSAFE, there are four enrolment levels: resource enrolment, customer enrolment, attribute resource enrolment, and employee enrolment. With respect to employee enrolment levels, two controls are established, both locally and remotely: IT Access Control and Physical Access Control.

2. VirtualSAFE Customer Authentication Enrolment. Within VirtualSAFE, customers are authenticated using their digital IDs.

3. User Authentication. Within VirtualSAFE, the users are authenticated using their digital IDs.

4. Reference Validation. If for some reason there is a problem in recognition, then reference validation is the next step used to authenticate the user, customer and/or resource.

Figure 15:
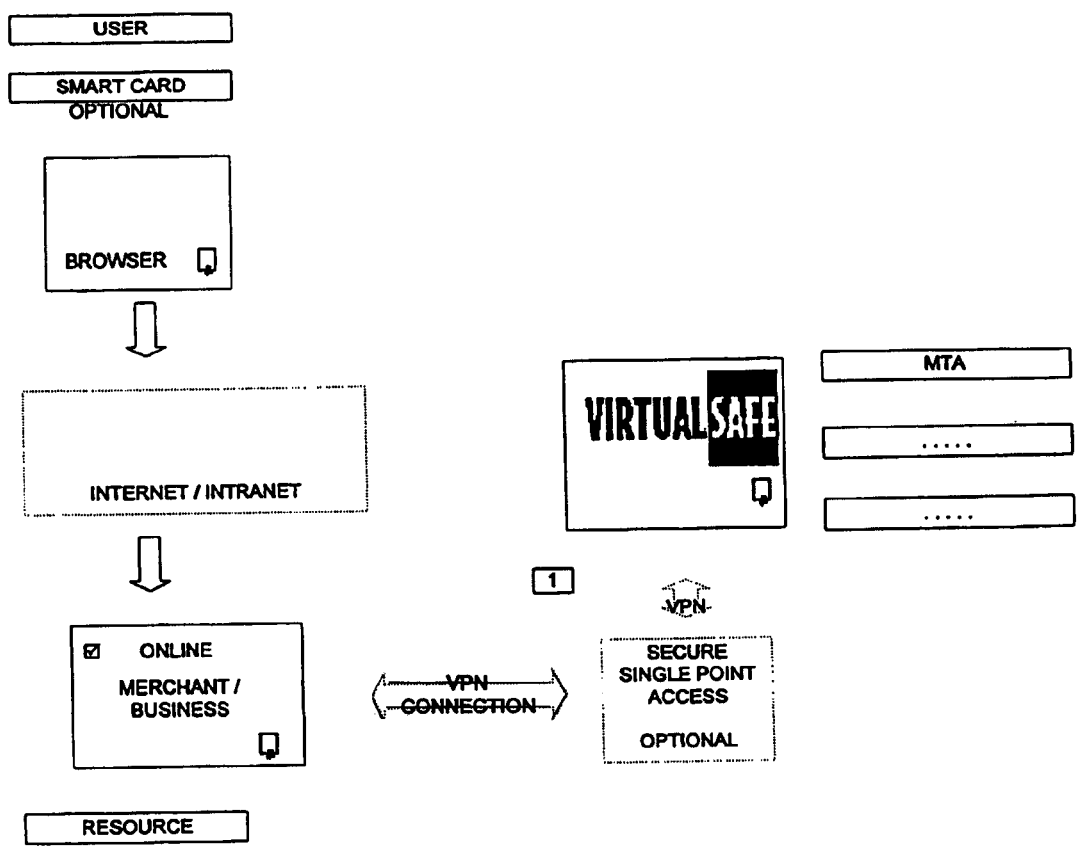
FIG. 15 is a block diagram illustrating the online transaction process in VirtualSAFE in accordance with an embodiment of the invention.

Online Transactions. Referring to FIG. 15, there is shown a block diagram illustrating the online transaction process in VirtualSAFE in accordance with an embodiment of the invention. VirtualSAFE operates as an authentication layer or authentication authority between the user, the terminal and the VirtualSAFE server. Through a multi-tiered authentication mechanism, the remote user is queried and authenticated to produce smart card emulation as if the physical card was present.

1. Customer Browses Site. In VirtualSAFE, customers using their digital certificates enables them to browse their online banking sites and use the smart card application.

2. Secured And Authenticated Access. Once the user/employee/customer has been authenticated in VirtualSAFE, they have access to online banking, the online brokerage, account data aggregation reports and audit performance, and online payment transaction requests; such as credit/debit card, electronic check, wire transfer, etc. They also have access to a VirtualSAFE Deposit Box (VSDB). And finally, the users have access to other valuable services such as the following:

Secure e-mail

Logistics support for individual, small and medium-sized businesses.

An application front-end that is easy to understand and use.

Application accessible through the inter/intranet.

VirtualSAFE is interoperable with existing professional or custom applications.

Secure collaboration place.

Figure 16:
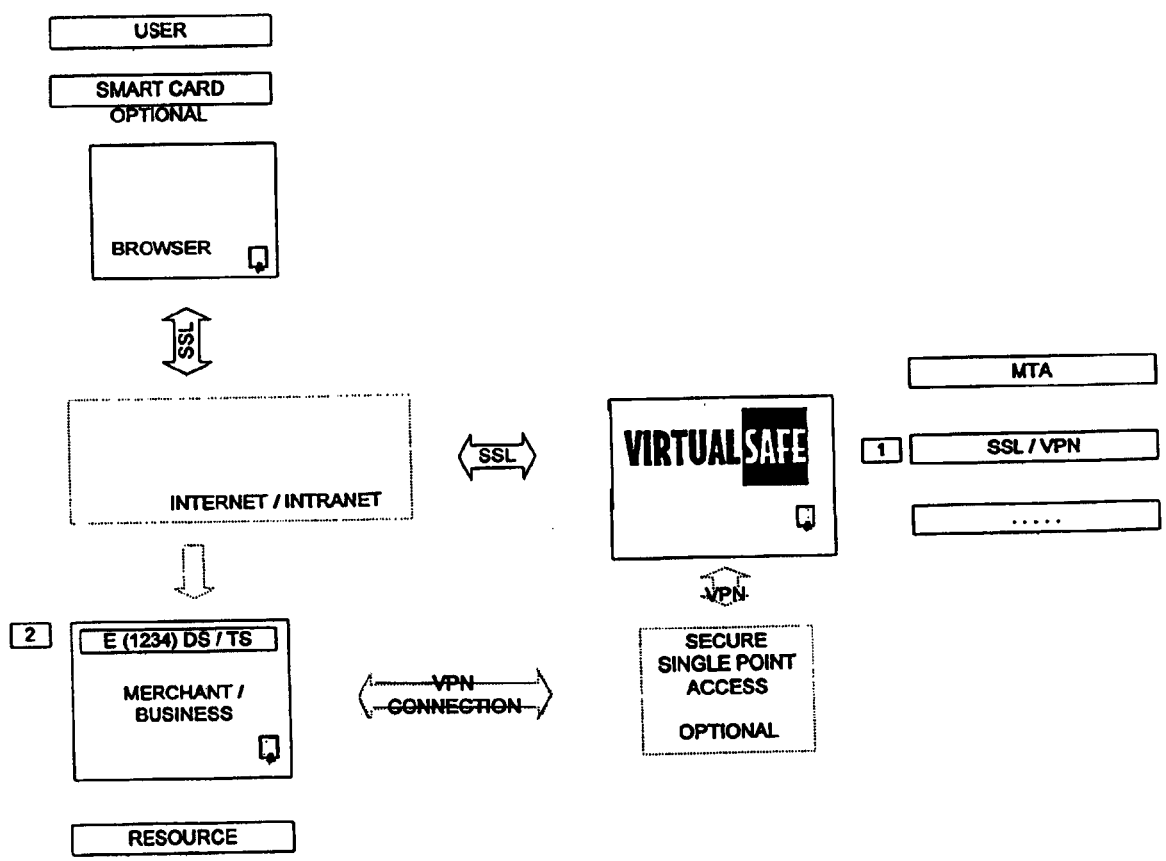
FIG. 16 is a block diagram illustrating the server authentication process in VirtualSAFE in accordance with an embodiment of the invention.

Server Authentication. Referring to FIG. 16, there is shown a block diagram illustrating the server authentication process in VirtualSAFE in accordance with an embodiment of the invention. The Secure Remote Pointer (SRP) is a VirtualSAFE compatible application that runs as a web browser plug-in, applet or application. The SRP is used by the user browser client to conduct secure communication with VirtualSAFE. This process is initiated when the user clicks on a redirection link (RL) that requires an authentication and authorization check. The SSL Server Authentication is established as follows:

1. VirtualSAFE Server Initiates One-Way SSL Handshake With User.

2. Server Authentication. The server is then further authenticated as VirtualSAFE stores the transmitted information and queries the received digital certificate.

Figure 17:
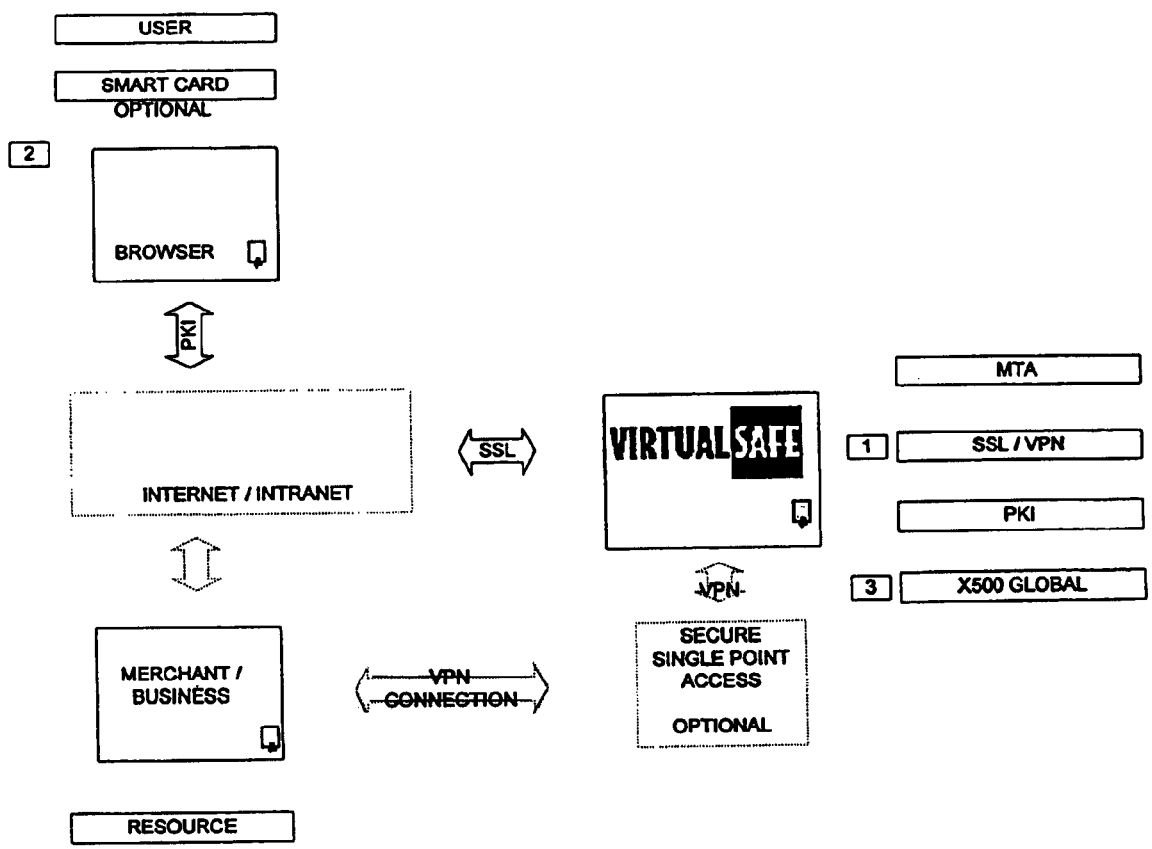
FIG. 17 is a block diagram illustrating the computer authentication process in VirtualSAFE in accordance with an embodiment of the invention.

Computer Authentication. Referring to FIG. 17, there is shown a block diagram illustrating the computer authentication process in VirtualSAFE in accordance with an embodiment of the invention. The VirtualSAFE Virtual Identity (VI) process involves the use of a PKI Digital Certificate. The Virtual Identity (VI) includes the following:

A Web certificate from a third party or ECA public and private key of the user.

Authentication is initiated over a secure SSL channel

Computer Authentication is established as follows:

1. VirtualSAFE Server Initiates a One-Way SSL Handshake.

2. Digital Certificate (PKI) Establishes a Two-Way SSL Handshake. The two-way SSL handshake ensures that VirtualSAFE interoperability functions properly, VirtualSAFE is X509 compatible with Entrust, Baltimore, Verisign, etc., VirtualSAFE second phase is $EC^2$ compliant (Certicom), and that VirtualSAFE is compliant with other PKI standards (i.e. Meta, etc.).

3. By Verification of X500 Global Directory. VirtualSAFE is fully capable of determining certificate authenticity by verifying public directories (e.g. Entrust, Baltimore, Verisign, etc.).

Figure 18:
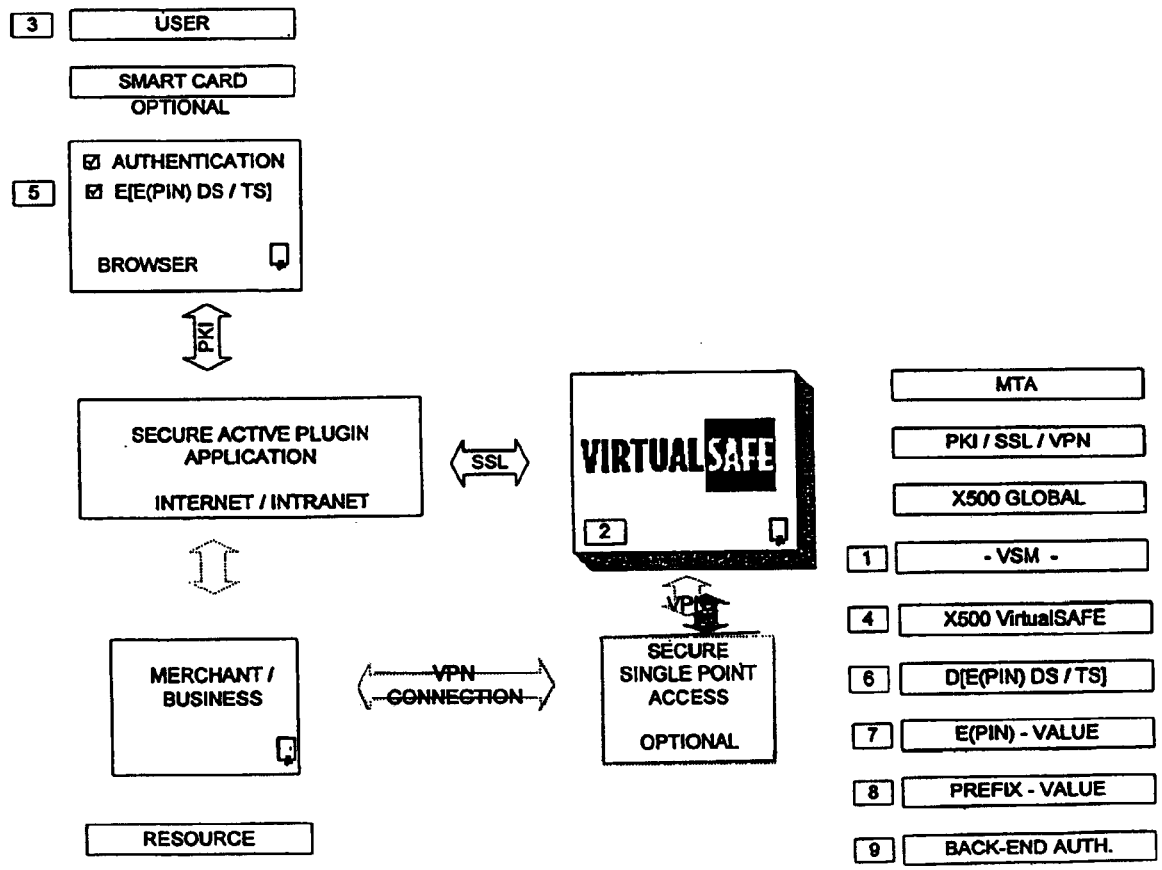
FIG. 18 is a block diagram illustrating the user authentication process in VirtualSAFE in accordance with an embodiment of the invention.

User Authentication. Referring to FIG. 18, there is shown a block diagram illustrating the user authentication process in VirtualSAFE in accordance with an embodiment of the invention. The entire communication will take place over a client-server authenticated SSL channel establishing two-way authentication using digital certificate distribution. Encryption and signing of the data package is completed entirely within the secure confines of the Secure Remote Pointer (SRP). The user data stored in the Virtual Identity may include the following:

Encrypted PIN and other access data
Authentication Authority (AA) reference data
Personal User Data
Financial User Data Once the user data has been stored within VirtualSAFE, the following steps may take place to ensure that the user is authenticated:

1. Virtual SMART CARD (VSC) is activated. A remote virus check is performed and an optional keystroke is checked and the VirtualSAFE certificate application is validated.
2. VirtualSAFE Secure Plug-In/Application Activated.
3. User Presents Identification Strings.
4. Virtual Smart Card Identifies User in VS X500 Directory.
5. User's Pin And Timestamp are Triple Encrypted—Digitally Signed.
6. VirtualSAFE Decrypts Digitally Signed User's Pin And Timestamp.
7. User Encrypted Pin Is Validated by VirtualSAFE.
8. VirtualSAFE Encrypted Prefix Validated by Supervisor.
9. VirtualSAFE Proceeds with Back-End Authentication.

Figure 19:
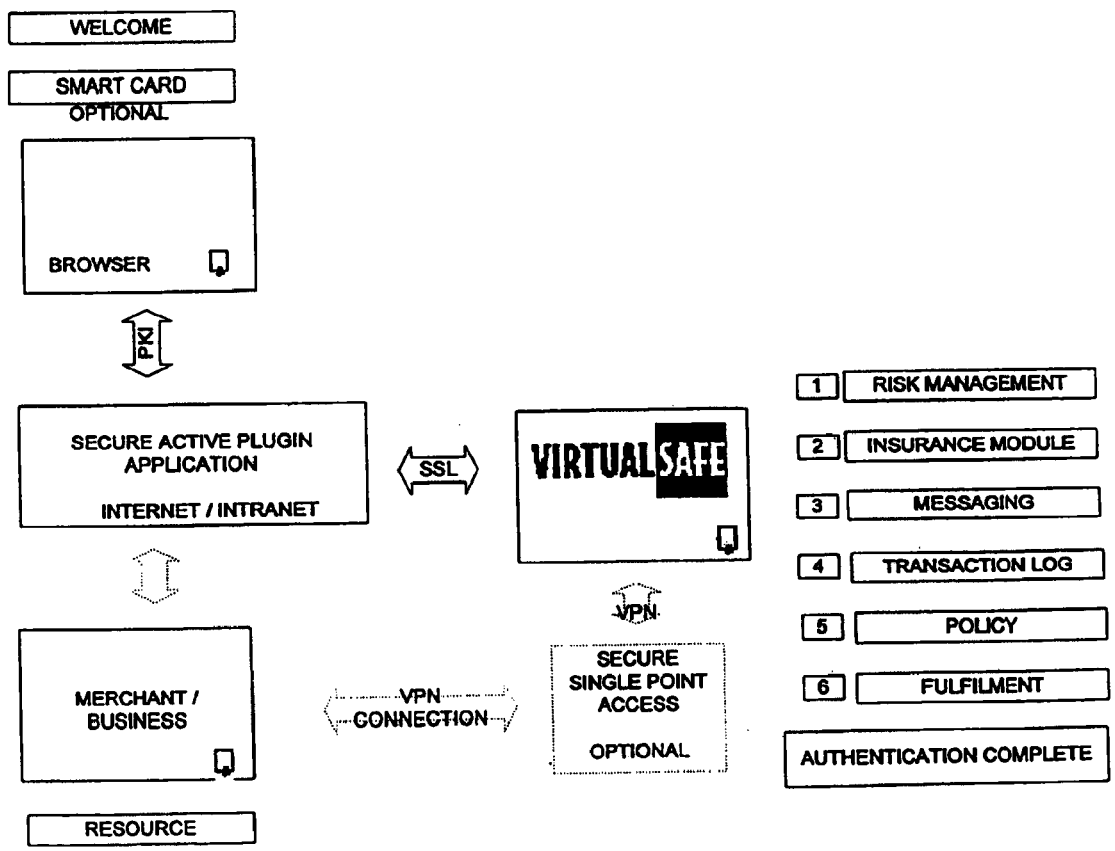
FIG. 19 is a block diagram illustrating the back-end authentication process in VirtualSAFE in accordance with an embodiment of the invention.

Back-End Authentication. Referring to FIG. 19, there is shown a block diagram illustrating the back-end authentication process in VirtualSAFE in accordance with an embodiment of the invention. The VirtualSAFE Payment Processing Engine consists of servers and connectivity to a payment gateway. The VirtualSAFE Risk Management Engine augments the payment processing functionality by providing intermediate vetting of transactions prior to execution by a remote processor. Credit Risk Management occurs in different scenarios of customer enrolment, management, and payment processing. An individual customer's credit rating is used to determine acceptability of payment transaction processing. For back-end authentication, the following six steps are included in the authentication process:

1. Risk Management. Score value verifications are done both internally and externally and VirtualSAFE stores the assessment result.
2. Insurance Module—Policy Adjustment Limit.
   Business Liability Policy—Transaction Value
   User Liability Policy—Limited by Credit Worth
3. Messaging—E-Mail or Notification
   Internal—Business Unit or Administrator
   External—Business Partner or User
4. VirtualSAFE Encrypted Transaction Log. An encrypted transaction log that stores all transaction records going through the VirtualSAFE.
5. Policy. Three policies are used in back-end authentication: PKI Policy (PC and PCA) as regulated by standard procedure; VirtualSAFE Privacy and Business Policy; and, Third Party Business Policy.
6. Fulfillment Procedure. The fulfillment procedure for back-end authentication is just that, a fulfillment. Authentication of transactions, communications, data storage, access control, administration, and VirtualSAFE value-added services is completed.

Figure 20:
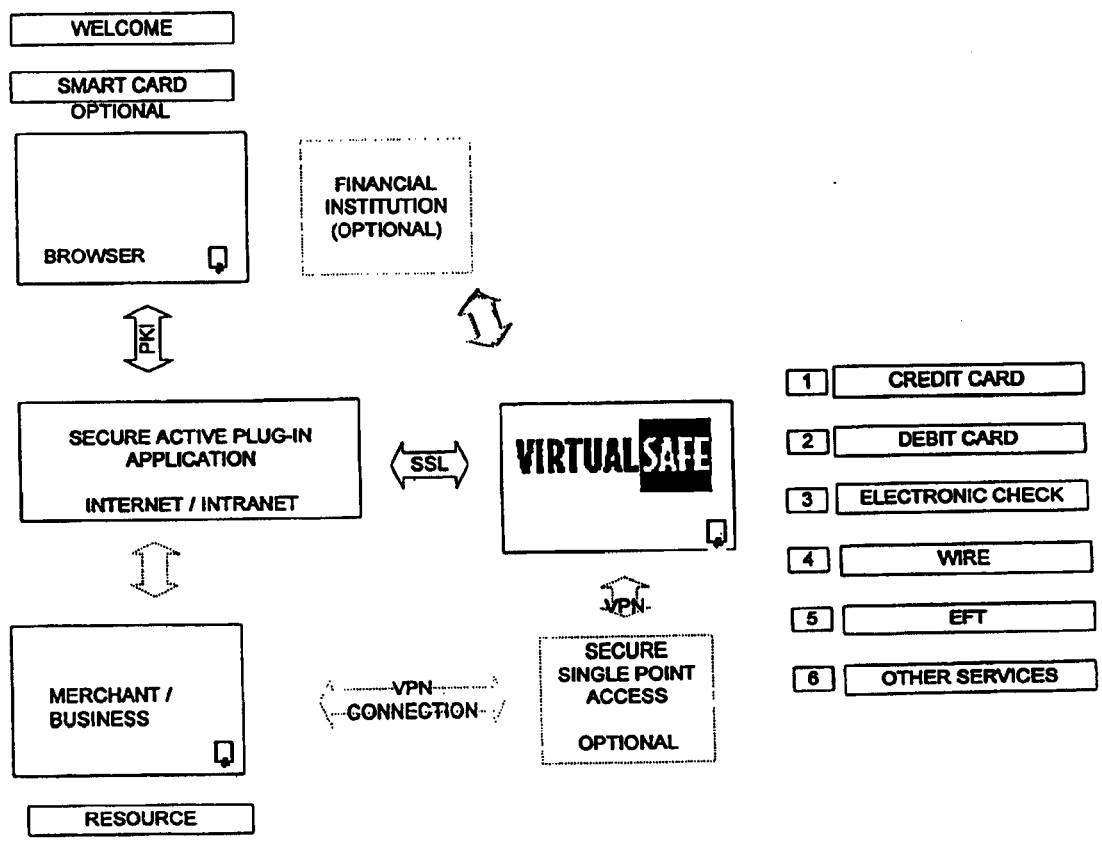
FIG. 20 is a block diagram illustrating the fulfillment process in VirtualSAFE in accordance with an embodiment of the invention.
Figure 2I:
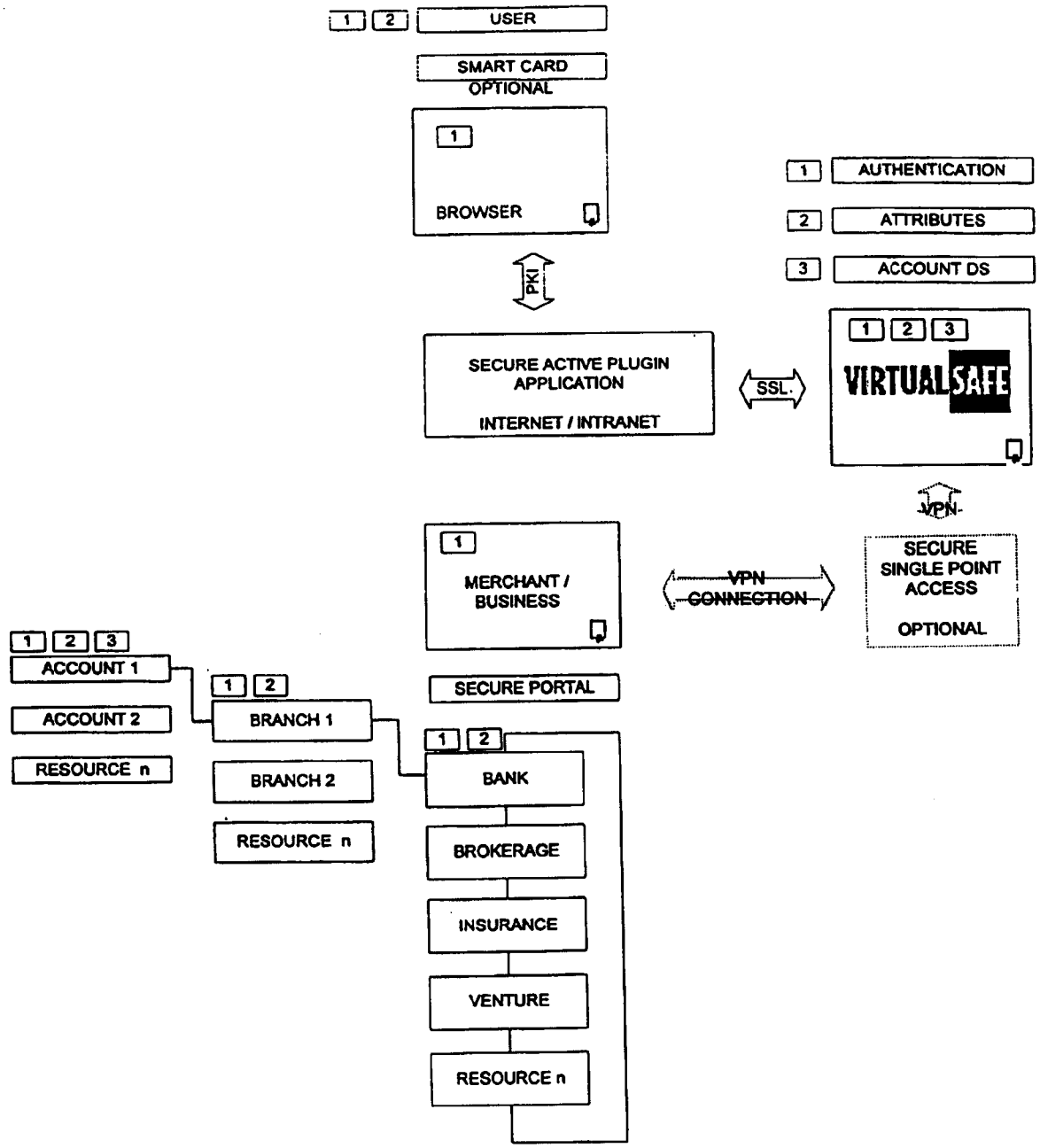

Fulfillment. Referring to FIG. 20, there is shown a block diagram illustrating the fulfillment process in VirtualSAFE in accordance with an embodiment of the invention. The VirtualSAFE Transaction Fulfilment Mechanism (TFM) consists of a set of fraud management heuristics that are invoked in a progression. The fulfilment condition will dictate what type of delivery is to be made. The TFM and fraud management heuristic is comprised of the following steps:

1. Customer Authentication Scoring
2. Credential Identification Scoring
3. Transaction Risk Scoring
4. Fulfilment Response
5. Fulfilment Delivery The transaction fulfilment mechanism (TFM) assures the following:

Secured transactions
Customer and merchant audits
Customer and merchant liability insurance
Transaction value insurance
Fraud control
Delivery control
Loyalty program In assuring these items, the transaction fulfillment mechanism (TFM) allows for the following payment types to be performed:

Online credit card payment
Debit card payment
Electronic check
Wire
Electronic transfer of funds
Coin payments
Stored-value cards The transaction fulfillment mechanism (TFM) also provides the following services:

Data storage
Secure e-mail
Logistic support for individual, small and medium size businesses including the following features: an application front-end that is easy to understand and that is user friendly; the application is accessible through the internet/intranet; and, VirtualSAFE is interoperable with existing professional or custom applications.
Secure collaboration place Attribute Authentication Authority. Referring to FIG. 21, there is shown a block diagram illustrating the attribute authentication authority process in VirtualSAFE in accordance with an embodiment of the invention. By definition, access control entails the limiting of activities of a user on the system. Enforcement of such controls is accomplished by maintaining a reference monitor that mediates access attempts by consulting an authorization base to determine if the user attempting the access is authorized to do so. A distinction is made here between authentication and access control, where authentication merely confirms the identity of the user, while access control establishes identity privileges on the basis of successful authentication.

Figure 22:
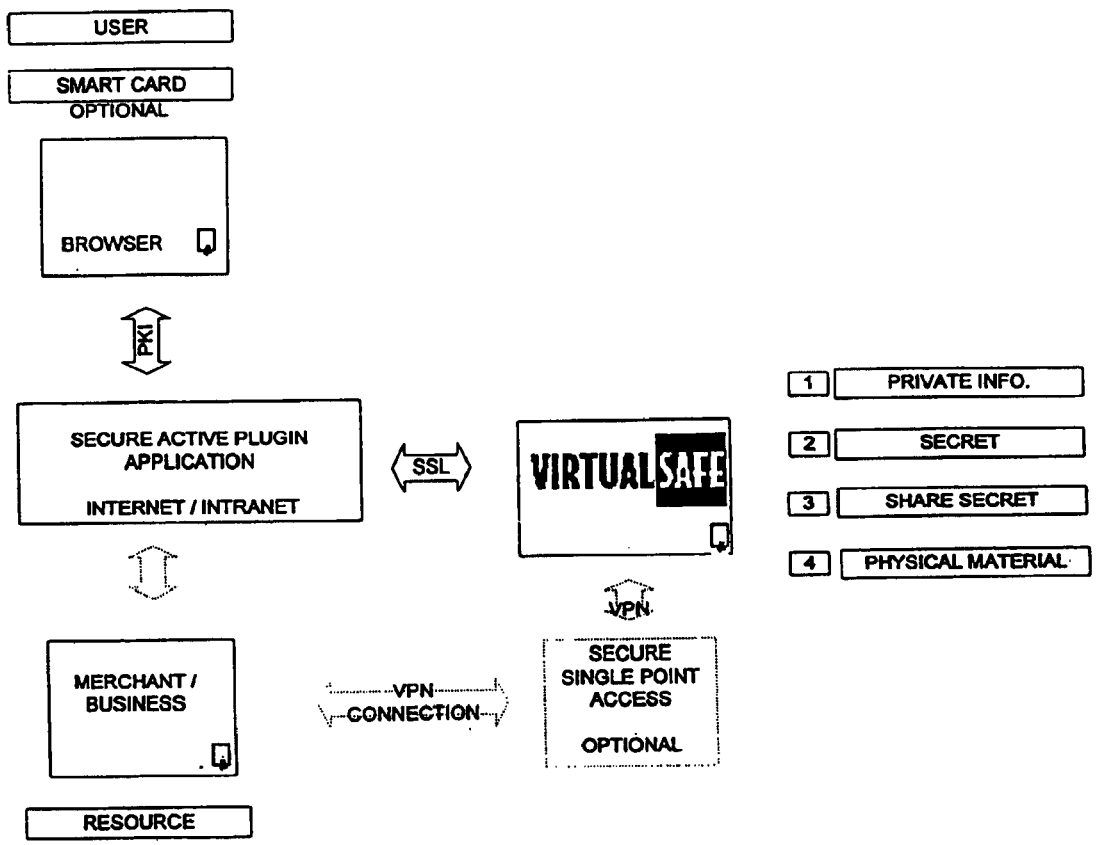
FIG. 22 is a block diagram illustrating the virtual identity (VI) process in VirtualSAFE in accordance with an embodiment of the invention.

Virtual Identity (VI). Referring to FIG. 22, there is shown a block diagram illustrating the virtual identity (VI) process in VirtualSAFE in accordance with an embodiment of the invention. User identity authentication is initiated for each individual transaction by triggering a multi-tiered algorithm that employs Virtual Smart Card technology to interface with standard PKI. Authentication is only possible when the user's personalized "virtual smart card" allows VirtualSAFE to access the respective "virtual identity".

1. Virtual Identity (VI) Private Information. VI is used to create and maintain encrypted data from source data based on provided and validated information.
2. Virtual Identity (VI) Secret Information. VI maintains this information that is encrypted and accessible only to a single user. Only the user knows secret information whose secret it is.
3. Virtual Identity (VI) Shared Secret Information. VI maintains this information that is encrypted and accessible only to the user and the VirtualSAFE proxy. Secret information is known only by the user whose secret it is and by the VirtualSAFE proxy.
4. Virtual Identity (VI) Physical Material. Physical material could be represented by digital certificate or a unique software code (e.g. script, program or special code). Physical material may include the following: Local, Digital Certificate (Personal Computer, Computer and/or Web Digital Certificate, Smart Card, Magnetic Card or any device operated by the user); VirtualSAFE Certificate (Digital Certificate is a Digital Certificate stored in any type of Repository or VirtualSAFE Repository managed by VirtualSAFE); and, Unique Identifier (Identifier issued uniquely to a user). Technological standards may include the following: Encryption Basis (RSA, CEV and other types of algorithm) and Public Key Infrastructure (PKI, X500, META, etc.).

Figure 23:
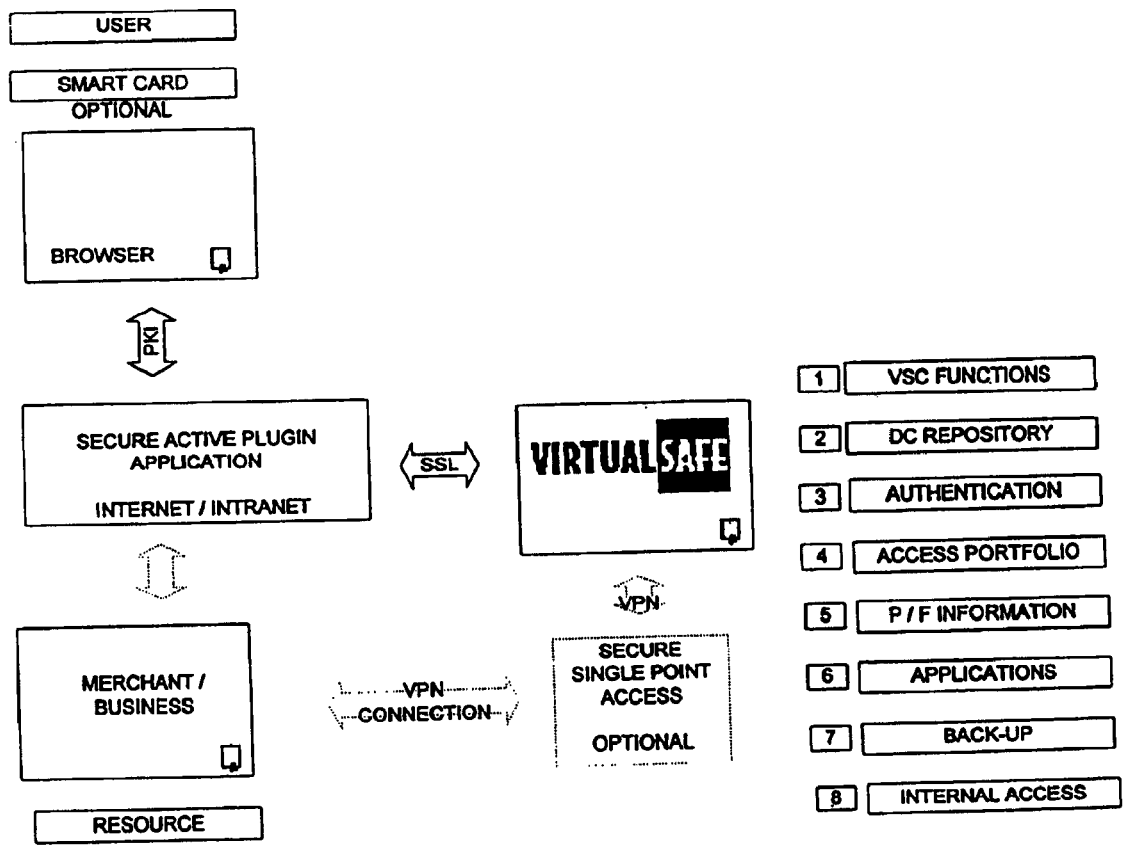
FIG. 23 is a block diagram illustrating the virtual smart card (VSC) process in VirtualSAFE in accordance with an embodiment of the invention.

Virtual Smart Card (VSC). Referring to FIG. 23, there is shown a block diagram illustrating the virtual smart card (VSC) process in VirtualSAFE in accordance with an embodiment of the invention. The Virtual Smart Card (VSC) is a VirtualSAFE internal application that acts as a local secure proxy to an external virtual authentication token accessed via the Secure Remote Pointer (SRP). The VSC authenticates, encrypts and decrypts VirtualSAFE user data using a multi Public Key Infrastructure (PKI) managed service. The VSC implements a multi-tiered PKI by designating dual sets of key pairs for each user: one External and one Internal Public-Private key pair.

1. Virtual Smart Card (VSc) Functions
    The Virtual Smart Card is the emulation base of the reader and the smart card on a remote location.
    The Virtual Smart Card is used to authenticate user access.
    All information belonging to enrolled members is stored and protected by a proprietary encryption scheme using a high-speed hybrid approach.
    The Virtual Smart Card coordinates the privacy policy.
2. VirtualSAFE Digital Certificate (DC) Repository
    Users remote or roaming digital certificates are stored securely.
3. Virtual Smart Card Authentication
    User authentication using virtual identity.
    User identity is combined of secret, shared secret and physical elements (PKI).
4. Access Portfolio
    Private, Shared, Business or Government.
5. Personal and Financial (P/F) Information
    Personal identity data (e.g. ID, driver's license, address, health card, etc.).
    Financial information (e.g. account numbers, credit/debit card, wire, etc.).
6. Applications
    Remote software licensing.
7. Back-Up
    Transaction logs.
    Transaction revisions.
    Logs.
8. Internal Access
    VirtualSAFE, Private, Shared, Business and Government.

Figure 24:
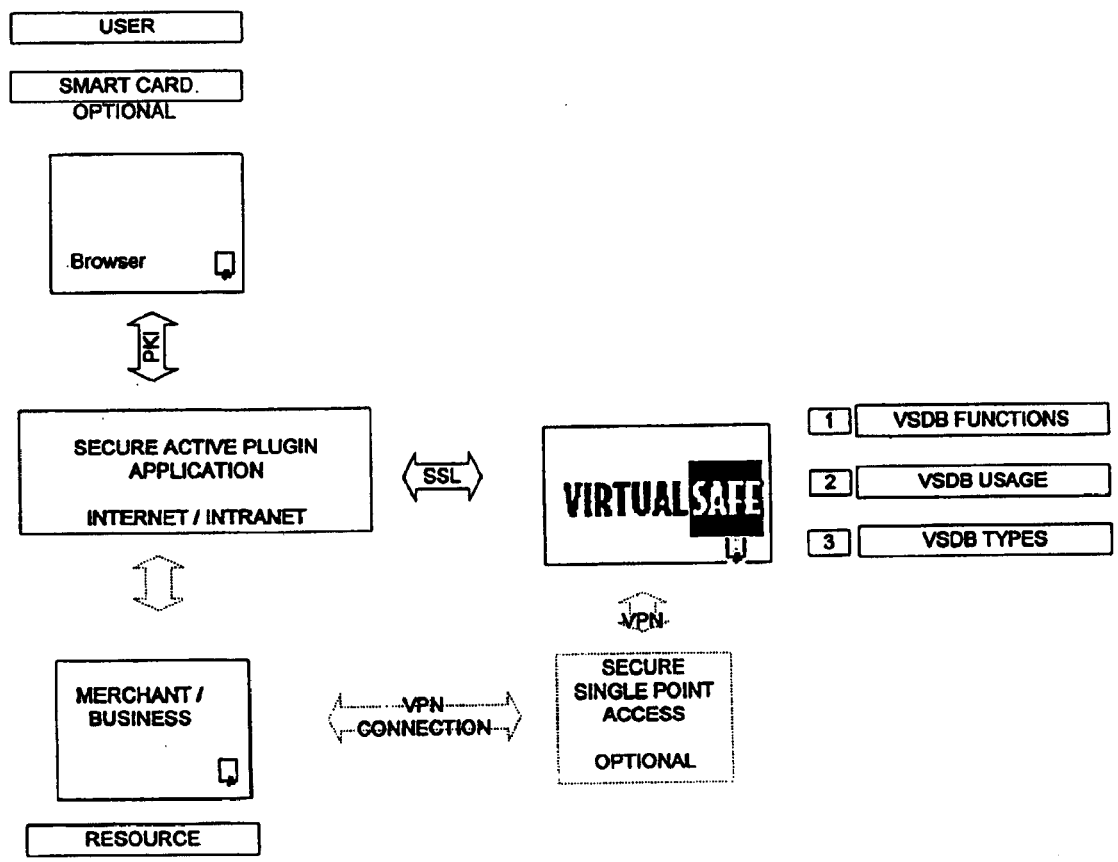
FIG. 24 is a block diagram illustrating the VirtualSAFE deposit box (VSDB) process in VirtualSAFE in accordance with an embodiment of the invention.

VirtualSAFE Deposit Box (VSDB). Referring to FIG. 24, there is shown a block diagram illustrating the VirtualSAFE deposit box (VSDB) process in VirtualSAFE in accordance with an embodiment of the invention. VirtualSAFE may also include an ASP (Active Server Pages) module. This will allow a user to access over two hundred news, stock, and information sources. The user can choose from entertainment headlines, custom stock quotes, horoscope and relationship information, health and lifestyle stories, sports scores, news, and much more. To take advantage of these opportunities, the user will need to sign in with a VirtualSAFE VSC (Virtual Smart Card). The VirtualSAFE VSC is a single name and PIN that users can use to sign on to a number of major sites from VirtualSAFE compliant companies. VirtualSAFE uses AA to store the users VirtualSAFE settings, such as the content and colors they would like to see on their VirtualSAFE page. Users' personal and financial information, and their preferences, etc., are also stored. Since VirtualSAFE uses AA and VSDB to store these settings, the user may view their VirtualSAFE page from any computer connected to the Internet. Also, each member of the user's family with a VirtualSAFE VSC may create and view his or her own personal VirtualSAFE page from the same computer. The user simply has to sign into VirtualSAFE when they visit the VirtualSAFE web site. The user may obtain a VirtualSAFE VSC and learn more about the advantages of having a VSC from a VirtualSAFE web site.

By signing into VirtualSAFE with a VSC, a user will be able to:
    Find out if they have mail-or if their friends are online.
    Personalize their VirtualSAFE home page once and view it from any computer, at home, at work, or on the road.
    Choose headlines from popular websites.
    Sign in safely and securely to access their personal settings. The user, and only the user, is the only person who may access his or her choices.

A user may also create a VirtualSAFE VSC test account. To do this, a user must register for a new VirtualSAFE account directly at the domain authority. Once the user's account is created, they will need to sign into a VirtualSAFE VSC Purchase (VVP) service site as a registered user. This allows the user to add a credit card, billing address, and shipping address to their VSDB. The user may want to create VSDB information for test-purposes that does not have genuine and negotiable credit cards attached to it.

The VSDB server code may run a Luhn checksum test against all provided card numbers at input time. The Luhn checksum test is mainly intended as a convenience for users who may have mistyped their number, but it is not a credit card verification, security check, or authorization per se. The Luhn checksum test will prevent a purely random credit card number from being accepted as part of VirtualSAFE Deposit Box data. VirtualSAFE may performs other basic authorization and validation checks (e.g. state/ZIP code or Province/Postal code) when establishing a VSDB for a VirtualSAFE user. A phone number and e-mail addresses may be required fields for establishing a VSDB, even though they may be optional for a VirtualSAFE profile.

The VVP service is an easy-to-implement, server-based VSDB system that uses standard HTTP and Secure Sockets Layer (SSL) methods/PKI-based to post payment information to participant sites. VirtualSAFE supports the Electronic Commerce Modeling Language (ECML) which is an industry-standard e-commerce schema. The VSDB is compatible with popular web browsers. The VVP functions as follows:

1. When a user clicks an express purchase link at a participant site, the VVP service sends the user forward to the VirtualSAFE VSDB and then authenticates the user and presents a page showing a list of that user's credit cards and addresses. This information represents the user's VSDB. The user selects the means of payment and the address to use for the transaction and then presses a button to continue.
2. The VVP service then delivers the requested information from the user's VSDB to the participant site using a VVP order form returned over the SSL.
3. VirtualSAFE is responsible for authorizing the payment from the user. The participant site is then responsible for adding any gift options, and completing the optional fulfillment transaction.
4. If the user is a first-time VSDB user, the VVP service presents an empty form into which the user would enter the card and address he or she wants to use for the transaction. The user would then have to be authenticated prior to the purchase being approved, and the next time the user makes a purchase at a VirtualSAFE participant site, he or she would not need to retype any credit-card or address information as it will be already stored in VirtualSAFE and will automatically be passed on to the VSDB.

Policy issues related to VVP service and participant sites may include the following:

Commitments and contractual obligations may be made when registering as a VirtualSAFE participant site.

Requirements may be established regarding the display of VirtualSAFE links or images on participant sites.

The VVP service may also include a fund allocation feature which may be entitled "VirtualSAFE Trust and Allowance". This feature allows children and parents, or any authorized shared person, to relate to one another at a different level. Parents who are registered and authenticated users of VirtualSAFE may allocate a certain amount of pre-authorized spending money per month to their children on their credit/debit card. Similarly, businesses or friends who are registered and authenticated users of VirtualSAFE may allocate a certain amount of pre-authorized spending money from their accounts to authorized personnel, friends, etc. These values may be added, modified, and authorized at the beginning of each month. Consider the following example:

| | Parents/Businesses/Friends Pre-authorized Payment/Transfer with Shared Access $450.00 | | |
|---|---|---|---|
| Child's Name | Pre-authorized Amount Payment | Purchases | Balance |
| Robert Smith | 150.00 | 100.00 | 50.00 |
| Anna Smith | 150.00 | 57.00 | 93.00 |
| Billy Smith | 150.00 | 148.00 | 2.00 |

Now consider the situation of business-to-business shared accounts in which two businesses operate with one another. According to agreement, this application allows one business to access the other business's account for a pre-authorized and predetermined amount. A lender opens an account or allows shared access to a borrower. Furthermore, this application allows financial transactions equivalent to the commercially known line of credit, mortgage loan, or loan. Here, a borrower, as permitted by a shared access agreement, can debit a particular lender's account using the strong authentication provided by VirtualSAFE's Authentication Authority or, if necessary, by VirtualSAFE's pre-defined Attribute Authentication Authority. The pre-authorized user is able to both debit and credit the account as per agreement and policy. The same approach may be used for shared-access in a document environment, or application environment, in which one entity (i.e. the account holder) may allows another user access for sharing in accordance with user definitions and privileges.

Referring again to FIG. 24, further features of the VSDB will now be described.

Using a PKI-based secure application, an enrolling applicant is prompted to store personal information to the VirtualSAFE local or remote VirtualSAFE deposit box (VSDB). The depositing of information is a unique process. It involves encrypting the information with a PKI cryptographic scheme that uses a high-speed hybrid approach and then storing elements of it in a fragmented arrangement. Only the authenticated user can bring these pieces together again to render the information usable. In this process, the user profile becomes a virtual safety deposit box or part of a "virtual identity", the contents of which are accessible only to VirtualSAFE for the purpose of authentication, and only in the presence of the authorized user. The secure data is not accessible to any entity or application requesting user authentication or to VirtualSAFE administrators.

1. VirtualSAFE Deposit Box (VSDB) Functions
   VSDB is a secured remote storage control with access control maintained by the Virtual Smart Card.
2. VirtualSAFE Deposit Box (VSDB) Usage
   Single or multiple users can operate VSDB.
   Users of VSDB will have different levels of privileges based on defined policy.
   Users can communicate and store data in the following general formats: multi-lingual, multi-calendar, multi-currency, and multi-format (i.e. documents, drawings, formulas, and other file formats).
3. VirtualSAFE Deposit Box (VSDB) Types. VSDB supports the following Deposit Box formats:
   Private (i.e. Private and Family related information and Third Party authentication mechanisms, PINs, etc.)
   Financial (i.e. All Private Financial related and Business/Government Financial related data.)
   Business (i.e. All Business related data—Business Numbers, Documents, Legal and/or HR Documents, Drawings, etc.)

Government (i.e. All Government related data—Business Numbers, Documents, Legal and/or HR Documents, Drawings, etc.)

General (May be local or remote for customer based on Policy.)

Transaction (May be local or remote and this type of VSDB supports all data related to all transactions maintained by VirtualSAFE—All Private information is encrypted and maintained as per Privacy Policy and Government regulations.)

Figure 25:
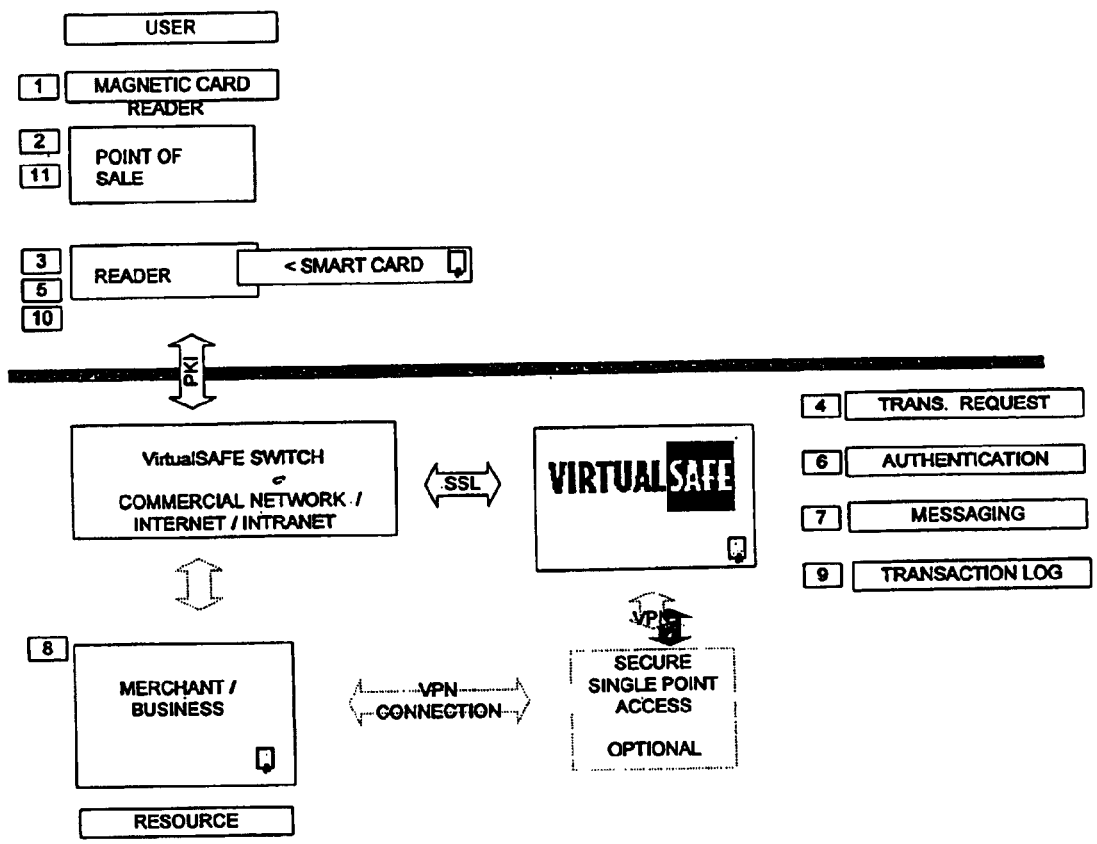
FIG. 25 is a block diagram illustrating the point-of-sale (POS) and virtual smart card (VSC) emulation process in VirtualSAFE in accordance with an embodiment of the invention.

POS-VSC Emulation. Referring to FIG. 25, there is shown a block diagram illustrating the point-of-sale (POS) and virtual smart card (VSC) emulation process in VirtualSAFE in accordance with an embodiment of the invention. POS-VSC emulation is a low cost replacement for the physical smart card application. POS-VSC may be easily implemented on an existing financial network. Using the Virtual Smart Card (VSC) reduces the high cost of physical smart card implementation and critical maintenance issues. VirtualSAFE's PKI structure is used to authenticate users on any POS premise based on individual PINs (Personal Identification Numbers) in accordance with selected European standards. The Point of Sale (POS)/Virtual Smart Card emulation process may be performed as follows:

1. Magnetic Card
   User uses Credit/Debit card.
2. Point Of Sale (POS)
   POS requests Credit/Debit card payment authorization.
3. Smart Card Reader
   Merchant Smart Card identifies merchant to VirtualSAFE.
   Received message from POS sent to VirtualSAFE.
4. Transaction Request
   VirtualSAFE receives transaction request.
   VirtualSAFE requests user PIN for authentication purposes.
5. User Authentication Pin
   User enters PIN for authentication purposes.
   Smart Card reader sends encrypted data to VirtualSAFE.
6. Authentication
   VirtualSAFE process authenticates customer.
7. Messaging
   Payment requested from the bank.
8. Payment Processing
   Credit/Debit card payment authorized/settled.
9. Transaction Log
   Message sent to VirtualSAFE.
   All transaction steps are recorded.
10. Smart Card Reader Confirmation
    Smart Card reader receives authorization from Credit card processing department.
    Decrypted message is sent to POS.
11. Point Of Sale Authorization
    POS receives authorized message in standard format.
    Transaction authorized and printed.

Figure 26:
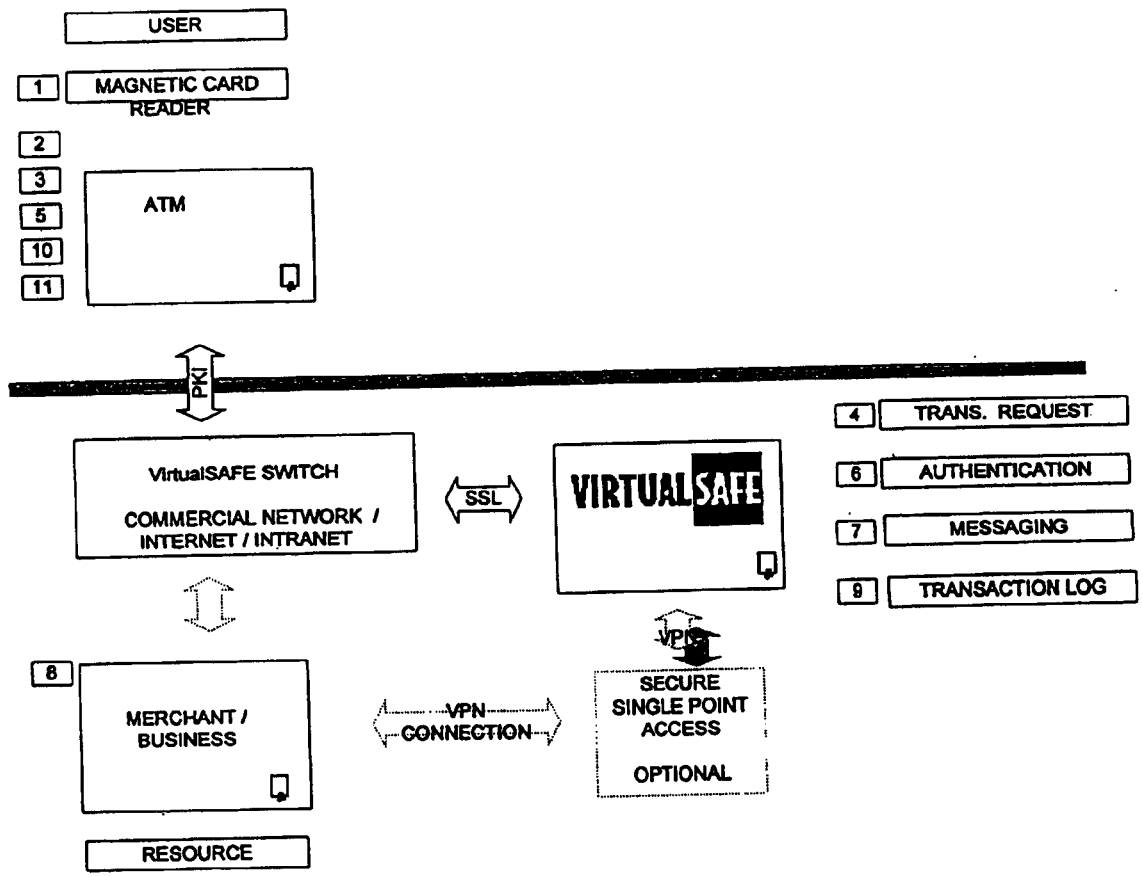
FIG. 26 is a block diagram illustrating the ATM and virtual smart card (VSC) emulation process in VirtualSAFE in accordance with an embodiment of the invention.

ATM-VSC Emulation. Referring to FIG. 26, there is shown a block diagram illustrating the ATM and virtual smart card (VSC) emulation process in VirtualSAFE in accordance with an embodiment of the invention. ATM-VSC Emulation provides a solutions for physical smart card applications implemented on existing networks. Using a Virtual Smart Card (VSC) reduces the high cost of physical smart card implementation and critical maintenance issues. The user authentication process is based on VirtualSAFE's PKI structure. VirtualSAFE applications implemented on supported servers does not require significant changes to existing ATM applications and networks. A security layer is implemented in existing applications and financial networks in accordance with current standards. The ATM/Virtual Smart Card emulation process may be performed as follows:

1. Magnetic Card
   User uses Credit/Debit magnetic card.
2. Automatic Teller Machine (ATM)
   The ATM requests Credit/Debit transaction authorization.
3. Add-On ATM Application
   Add-on ATM application maintains digital certificate with all security functions.
   Magnetic reader reads card hash information.
   Digital certificate encrypts and signs transaction and private information.
4. Transaction Request
   VirtualSAFE received transaction request.
   VirtualSAFE requests User PIN for authentication purposes.
5. User Authentication PIN
   User enters PIN for authentication purposes.
   ATM sends encrypted data to VirtualSAFE.
6. Authentication
   VirtualSAFE process authenticates customer.
7. Messaging
   Payment requested from the bank.
8. Payment Processing
   Credit/Debit card payment authorized/settled.
9. Transaction Log
   Message sent to VirtualSAFE.
   All transaction steps are recorded.
10. ATM Confirmation
    ATM receives authorization message from Credit Card processing department.
11. ATM Authorization
    Transaction authorized and printed.

Figure 27:
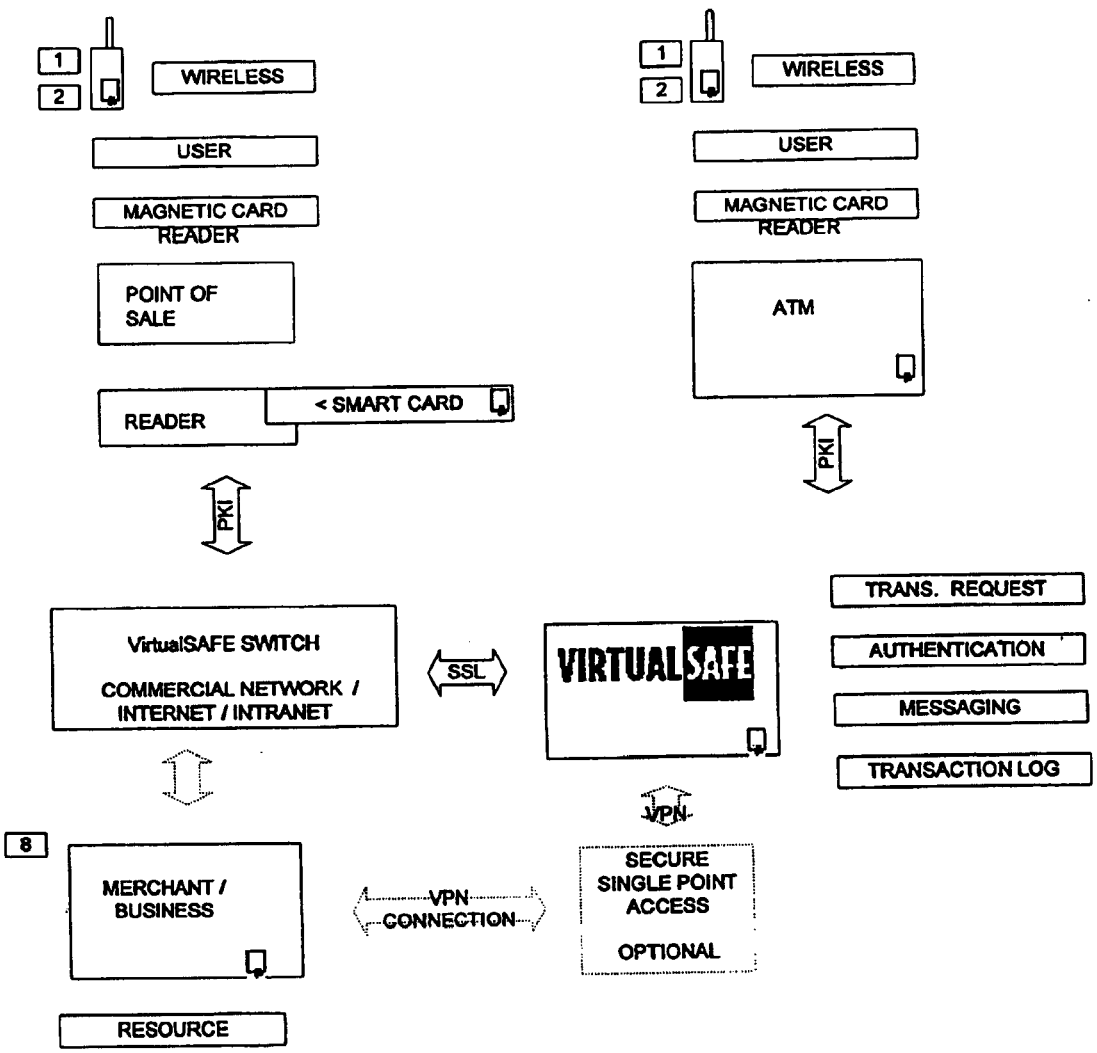
FIG. 27 is a block diagram illustrating the wireless POS and ATM process in VirtualSAFE in accordance with an embodiment of the invention.

POS/ATM/Wireless. Referring to FIG. 27, there is shown a block diagram illustrating the wireless POS and ATM process in VirtualSAFE in accordance with an embodiment of the invention. With respect to wireless VirtualSAFE access, the user may access the VirtualSAFE application through an analog or a digital wireless network using one of the following devices: cellular phone, PDA, two way radio, satellite, etc. VirtualSAFE provides a secure wireless application both locally and via the server. To wirelessly communicate with VirtualSAFE, either a standard wireless network can be used or a local wireless network (i.e. Blackberry, Blue Tooth, Infrared, etc.) may be used. With respect to local wireless VirtualSAFE access, the user may access the VirtualSAFE wireless application either locally or remotely. The local wireless application may communicate to a remote device through a conventional or wireless network. The local wireless authentication application may communicate to a remote VirtualSAFE device through a conventional or wireless network.

Figure 28:
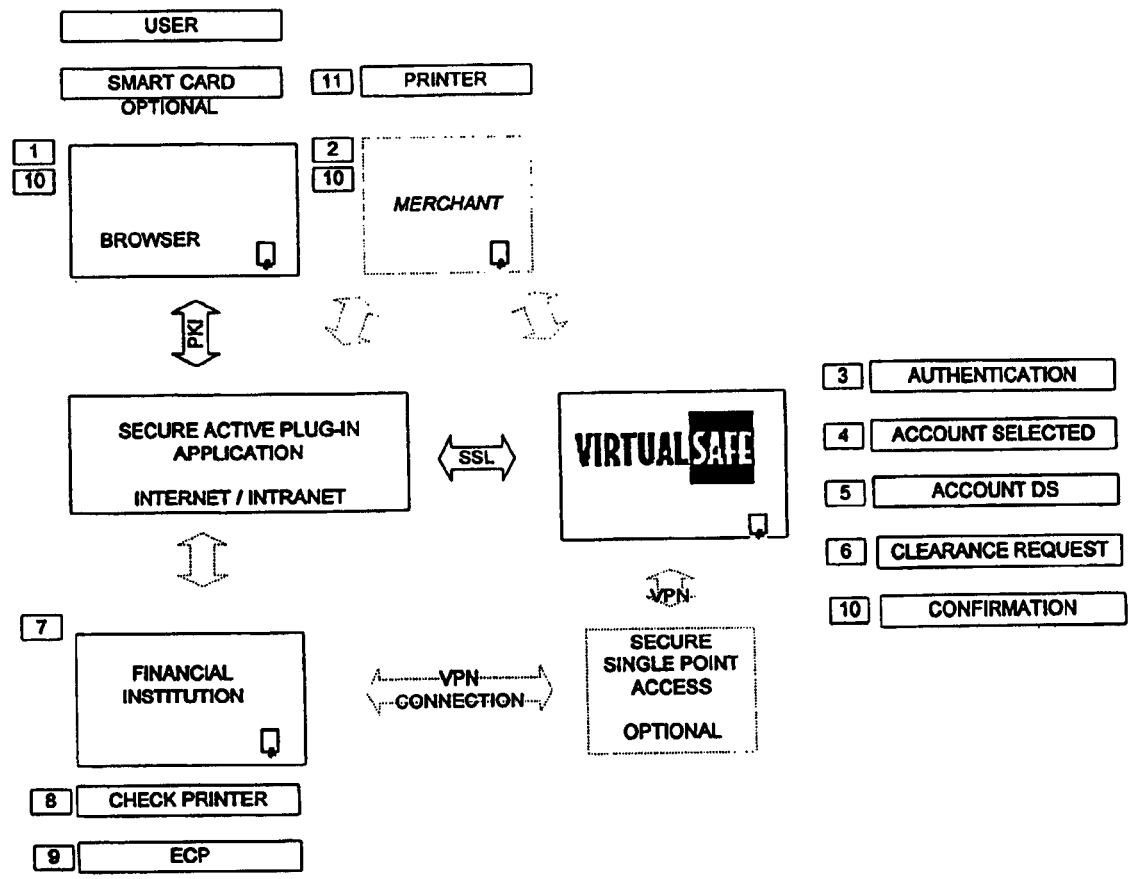
FIG. 28 is a block diagram illustrating the SAFEcheck process in VirtualSAFE in accordance with an embodiment of the invention.

SAFEcheck. Referring to FIG. 28, there is shown a block diagram illustrating the SAFEcheck process in VirtualSAFE in accordance with an embodiment of the invention. The VirtualSAFE Check Processing (VCP) enables streamlined and secure check processing and payments through a remote network connection. The VirtualSAFE method and system is employed in a traditional check processing protocol in which VirtualSAFE authenticates a check clearing transaction. This capability allows for the integration of electronic payments and check processing. The SAFEcheck process may be performed as follows:

1. User Browses The Merchant Site
2. User Selects SAFEcheck Payment
   A digitally signed shopping cart contents and payment amounts are sent to VirtualSAFE.
   User is then redirected to the VirtualSAFE secured site for further authentication.
3. User Authentication
   VirtualSAFE defines authentication level depending on payment amount and SAFEcheck Policy.
4. Account Selected
   User selects appropriate checking account from availability list.
5. Account Digital Signature (DS)
   User digitally signs SAFEcheck.
   SAFEcheck signed with web certificate.
   SAFEcheck signed with VirtualSAFE certificate.
6. Clearance Request
   VirtualSAFE issues clearance request.
7. Financial Institution
   Receives SAFEcheck for check presentment.
8. Check Printer
   SAFEcheck has been printed on premises including customer signature.
   Printer uses regulated check paper with appropriate coding.
9. Electronic Check Presentment (ECP)
   VirtualSAFE application interfaces with Electronic Check Presentment module.
   SAFEcheck cleared and processed.
10. Confirmation
    VirtualSAFE receives confirmation.
    VirtualSAFE sends confirmation to merchant and user to complete transaction.
11. Merchant Prints SAFEcheck
    Merchant prints out user signed copy of cleared check.
    User optionally signs SAFEcheck at merchant premises.

Figure 29:
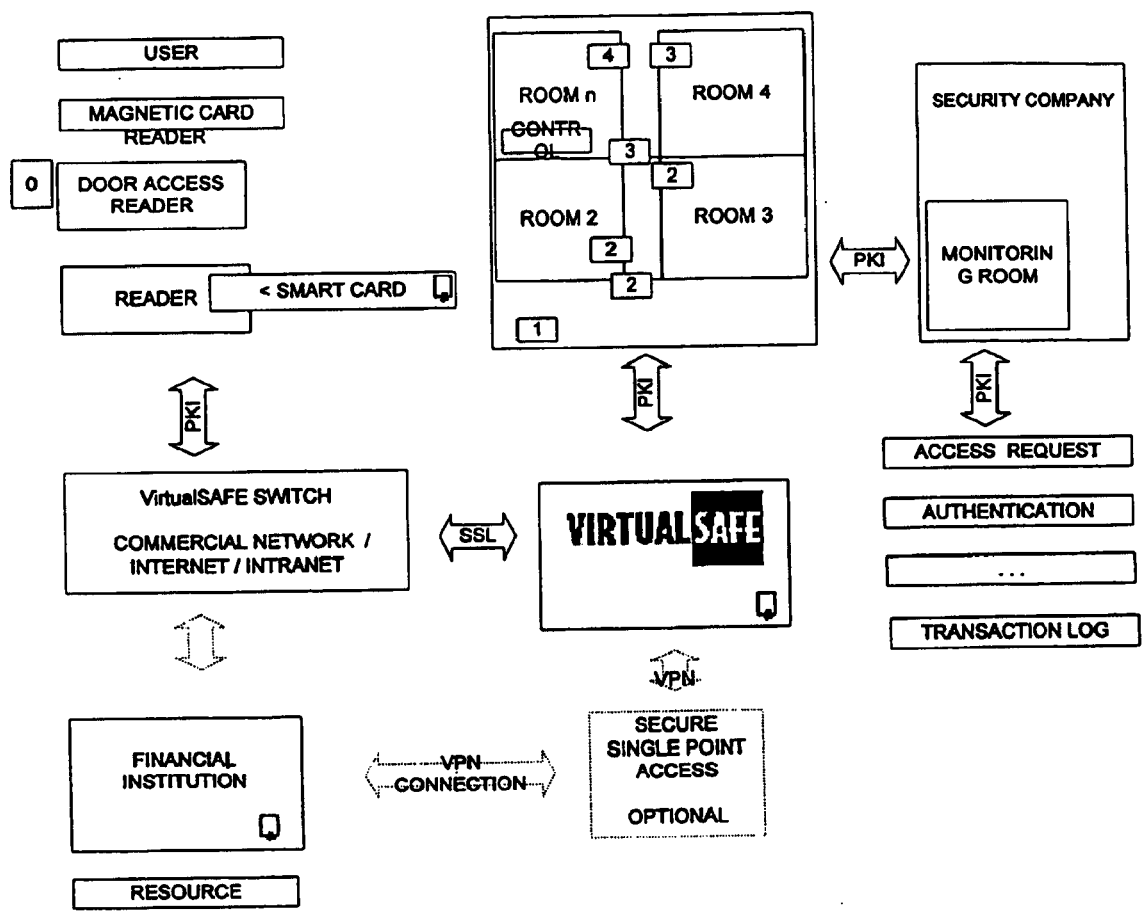
FIG. 29 is a block diagram illustrating physical access control in VirtualSAFE in accordance with an embodiment of the invention.

Physical Access Control. Referring to FIG. 29, there is shown a block diagram illustrating physical access control in VirtualSAFE in accordance with an embodiment of the invention. Physical Access Control or SAFEpac refers to the storage in VirtualSAFE of secure entry information. With respect to employee/visitor door access, at least three scenarios may be supported as follows:

1. Local Physical Access
   Local office user access requested.
   Request is processed locally.
2. Remote Physical Access
   Remote office user access requested.
   Request is processed remotely.
3. VirtualSAFE Controlled High Security Access
   Remote office user access requested.
   Request is processed remotely.

Multiple entry levels may also be supported as follows:

1. Entry Level 1
   Building user requests access to local branch.
   Building control unit validates Digital Certificate access level and authorizes access.
2. Entry Level 2
   Building user requests access to building Secured room.
   Building Control Unit validates Digital Certificate access level and requests User PIN.
3. Entry Level 3
   Building user requests access to building High-Secured room.
   Building Control Unit forwards validation of the Digital Certificate from Security Company Controller.
   User must provide PIN.
4. Entry Level 4
   Building user requests access to building Restricted Area.
   Building Control Unit forwards validation of the Digital Certificate from VirtualSAFE through Security Company.
   User must provide VirtualSAFE PIN.

Unique Features and Advantages. To reiterate and expand, VirtualSAFE includes the following unique features and advantages:

VirtualSAFE includes a remote multi-tiered Authentication Authority ("AA") infrastructure for performing security functions.

VirtualSAFE provides for payment and initiation using a computer network. Specifically, VirtualSAFE provides a payment and initiation system for a virtual smart card using an open network like the Internet.

VirtualSAFE includes highly secure dedicated servers. Built upon a "need to know virtual identity" principle of access, VirtualSAFE securely processes and stores information such that only an authorized user who is vigorously and firmly authenticated can access it. While the secure session and/or the SSL protocol authenticates and secures communications with the server, and Public Key Infrastructure (PKI) combined with third party trusted Certificate Authorities authenticates the device or computer, VirtualSAFE functions to authenticate the server, computer, and the user.

Using a PKI-based secure application, an enrolling applicant is prompted to store personal information to a VirtualSAFE remote repository. The depositing of information involves encrypting the information with a PKI cryptographic scheme that uses a high-speed hybrid approach, and then storing elements of it in a fragmented arrangement. Only the authenticated user can bring these pieces together again to render the information usable. In this process, the user profile becomes a virtual safety deposit box or part of a "virtual identity", the contents of which are accessible only to VirtualSAFE for the purpose of authentication, and only in the online presence of the authorized user. The secure data is not accessible to any entity or application requesting user authentication, or to VirtualSAFE administrators.

User identity authentication is initiated for each individual transaction by triggering a multi-tiered algorithm that employs "virtual smart card" technology to interface with standard PKI. Authentication is only possible when the user's personalized "virtual smart card" allows VirtualSAFE to access the respective "virtual identity".

VirtualSAFE may be applied to credit or debit card, safe check, wire, or other forms of electronic payment processing.

VirtualSAFE functions as both a means of network access control and secure data storage.

Over a remote network, VirtualSAFE is configured as an Attribute Authentication Authority ("AAA") and provides an access control portal to sensitive applications and data management facilities hence enabling a secure end-to-end extranet for maintaining authorization, authentication, and accountability of all external users or applications. Strong user and/or application authentication via virtual smart card directs, controls, and audits access to sensitive resources to any level of granularity in accordance with the ISO 8583 standard.

VirtualSAFE provides for the complete payment and fulfillment process as conducted over a communication network, and more specifically, VirtualSAFE provides a secure virtual entity that includes purchase transaction, payment transaction, and shipping and delivery components.

VirtualSAFE executes a complete electronic financial transaction for goods or services, which previously was transacted with credit card, cash or other payment of goods, and subsequently fulfilled separately.

By enabling an unprecedented level of security in online authentication, VirtualSAFE reduces the current constraints on businesses, governments, and individuals that keep them from fully leveraging the flexibility and advantages of communicating and transacting over the Internet, intranets, extranets and enterprise networks. This is achieved by VirtualSAFE's multi-tiered Attribute Authentication Authority (AAA) infrastructure which includes secure means for processing electronic data and transactions over conventional and wireless networks, authenticating users at the application level, and for network access, transactions, and communications.

VirtualSAFE includes a secure, dedicated server that exceeds standard sessions or Internet security protocols such as SSL. While SSL authenticates a network server and Public Key Infrastructure (PKI) combined with third party trusted Certificate Authorities authenticate the device or PC, VirtualSAFE authenticates the user.

VirtualSAFE provides for the payment and fulfillment processes involved in completing a financial exchange of goods or services for monetary payment.

VirtualSAFE includes secure encrypted digital communications, existing payment methods (i.e. cash, check, credit and debit card payment systems, wire payment and electronic funds transfer systems, etc.), and fulfillment and clearinghouse processes for delivery of goods and services. VirtualSAFE uses electronic representations of money and shopping entities which are designed to be securely housed in a digital environment that is independent from the remote shopper's computer terminal.

VirtualSAFE enables an enterprise to resolve many of the security, privacy, convenience and cost impediments that exist with present online commerce systems.

VirtualSAFE makes it easier and less risky for businesses of all sizes to engage in e-commerce.

VirtualSAFE makes it easier for potential online merchants of goods and services to build a website and enter the world of e-commerce.

VirtualSAFE allows merchants to readily obtain blanket fraud insurance.

VirtualSAFE registers consumers' personal data (i.e. credit card information) once and then issues a digital ID to that individual. Henceforth, the consumer does not have to enter their data online again, an obvious attraction to consumers. The data is held in a database file on a highly secure and insured server site.

With VirtualSAFE, all parts of a transaction are routed through a "safe" component, with private data being protected. A purchase can then be made with all interested parties (i.e. merchant, credit card issuer, bank, couriers) accessing only information that is absolutely pertinent to their roles. At the same time, VirtualSAFE ensures that it is exceedingly unlikely that anyone other than the card holder could execute the transaction. An advantage of VirtualSAFE is that online fraud may be reduced.

VirtualSAFE includes a remote secure repository for fulfillment data.

VirtualSAFE electronically emulates a wallet or a purse customarily used for organizing money, credit cards, and other forms of payment. Access to the instruments in the wallet or purse is restricted by an encryption and authentication processes to avoid unauthorized payments. A successful cryptographic authentication is required in order to obtain access to the wallet or purse. The authentication protocol obtains the information necessary for creating a network session granting authority to utilize an instrument, a payment holder, and a complete electronic wallet. Electronic approval results in the generation of an electronic transaction to complete the order.

Upon selection of a particular payment transaction by a user, a particular transaction notification will be generated based on the order. The transaction notification is processed by means of a secure connection to a transaction server. The transaction server includes elements for order fulfillment, including connectivity to: credit card issuer, acquiring bank or funds-holding institution, product or service merchant, delivery provider, and the user or customer account.

With VirtualSAFE an electronic payment transaction is generated for affecting a transfer of funds from an account of the payer in the funds-holding institution to the payee. The electronic instrument includes a cryptographic digital signature of the payer, digital representations of payment instructions, the cryptographic authenticated identity of the payer, the identity of the payee, and the identity of the funds-holding institution.

VirtualSAFE has a secure infrastructure which includes the following components: PKI; a Redirection Link; a Secure Remote Pointer/Plug-In Application; a Virtual Identity; a Virtual Smart Card; a VirtualSAFE Deposit Box (VSDB); an Attribute Authority; a Crypto-Engine; a Payment Processing Engine; a Risk Management Engine; a Transaction Fulfilment Mechanism; an Insurance Module; and, a Transaction Secure Repository.

VirtualSAFE augments the existing capabilities to process payments by simulating a physical smart card, reader, and unique identity in a remote online environment. This is accomplished without compromising existing capabilities of remote connection, browsing, and interactivity already inherent in the network. These exisitng capabilities are enhanced by VirtualSAFE's ability to strongly authenticate the identity of online users for the purposes of processing payments.

By incorporating cryptographic and networking elements, VirtualSAFE operates as an authentication layer or authentication authority between the buyer, the terminal, the merchant, and payment server. Through multi-tiered authentication, the remote client is queried and authenticated to produce effective smart card emulation as if the physical card was present.

VirtualSAFE includes an online purchase and initiation server (VirtualSAFE Authentication Authority or "VSAA") that implements virtual smart cards. VirtualSAFE complements existing. Internet payment and initiation systems by providing software emulation of smart cards and smart card readers. Other components of the existing Internet payment and initiation systems (e.g. merchant server and payment server), and the techniques for processing payment and initiation transactions, may remain the same. Use of the VSAA server is transparent to merchants on the Internet. In one embodiment, a smart card and its associated card reader are emulated on a remotely located VSAA server computer, thus reducing the need for physical smart cards and smart card readers. The existing client terminal acts as a pass-through device that is transparent to a user, a merchant server, or a bank server. This improvement to Internet payment and initiation systems provides several advantages. For example, the adoption of electronic market systems may be accelerated by avoiding the cost and distribution problems associated with physical cards and card readers.

VirtualSAFE includes a means to address the low value (e.g. less then US$10) electronic commerce market in a rapid manner using an infrastructure that is easily scaleable.

By remaining integrated with the hardware-based approach to electronic commerce, VirtualSAFE facilitates the accelerated development of Internet payment and initiation systems. With VirtualSAFE, a consumer base may be created which may subsequently be transferred to the hardware approach when the required hardware is more widely available.

VirtualSAFE is secure in that the cryptographic functions normally performed within a smart card are performed securely within the remote VSAA server which may be under the control of an issuing bank or a trusted third party.

VirtualSAFE allows value to be credited to a consumer's account. This may be done quickly and easily by VirtualSAFE's VSAA server (i.e. the virtual smart card that is being emulated). A special initiation server is not necessarily required, but may be used.

With VirtualSAFE, by permitting the use of a virtual card to make purchases over the Internet for small dollar amounts, a merchant may very well be able to begin charging for goods and services that he provided for free in the past. VirtualSAFE is suitable for purchases of under US$10 while purchases of any amount may be made. VirtualSAFE allows merchants to recover costs of services not previously charged for and allows merchants to access to an existing and rapidly growing consumer base.

VirtualSAFE integrates into existing clearing and settlement systems such that merchants need not implement nor become familiar with new procedures for the reconciliation of transactions.

With VirtualSAFE, a merchant need only make a minimal investment in time and money to take advantage of and to accept payments over the Internet. With VirtualSAFE, a merchant need not engage in the development of complex software or accounting procedures. Smaller merchants will especially benefit from VirtualSAFE. By establishing a business relationship with an acquirer and incorporating standard merchant software, a merchant is ready to begin selling goods and services from his web site. Since a virtual smart card with a stored-value application is used, the payment server and the VSAA server perform the details of and provide security for the transaction. Hence, merchants are relieved from having to control and keep track of transactions. From a merchant's point of view, the merchant knows that a consumer desires to purchase an item and that a cost has been transmitted to the consumer, thus, when the merchant receives a confirmation message, the merchant may release the item to the consumer. The merchant need not be concerned about security nor be responsible for authenticating a card nor for determining a balance on the card.

VirtualSAFE may facilitate frequent flyer miles or award points. A consumer may wish to access any of a variety of Web servers in order to redeem frequent flyer miles, award points, etc., that he or she has accumulated as part of a loyalty program. The consumer may have accumulated points through any of a variety of programs with airlines, restaurants, rental car companies, hotels, banks, credit or debit card issuers, telephone or other communication company, etc. Often the consumer wishes to redeem these points to receive free airline tickets, meals, car rental, overnight stays, prizes, awards, discounts, or other benefits. It is important to the airline (or other company) to be able to authenticate that the person trying to redeem points is the actual person who owns the points. By accessing a Web server associated with the particular program, VirtualSAFE allows the consumer to use a virtual card in the VSAA server to authenticate that he or she is the true owner of the points and to receive benefits from the program.

VirtualSAFE allows consumers to conveniently initiate value on virtual cards from any suitable device via an open network such as the Internet. A consumer may use any suitable computer at the home, office, or elsewhere in order to connect to his bank or other financial institution. Using appropriate message integrity, value is transferred from the bank to the consumer's virtual card. At the same time, the corresponding value is transferred from the bank to the virtual card issuer through existing networks for later settlement with a merchant from whom the consumer purchases goods or services. This embodiment makes use of an existing clearing and settlement system for eventual settlement of the transaction between the merchant and the card issuer. The invention allows consumers to conveniently initiate value on virtual cards while maintaining a high level of security. From the consumer's perspective, this initiation feature operates in a fashion similar to the initiation of a physical card at an ATM machine, except that the consumer need not insert cash or an additional debit or credit card, nor is the consumer required to travel to a bank. The initiation functionality is distributed across the Internet between the VSAA server, a bank server holding the consumer's account, and an initiation server with a security module. All of these entities may be physically remote from one another with router functionality being provided by the Internet.

VirtualSAFE may use existing clearing and settlement systems to reconcile transactions and to pay the appropriate parties once the value has been spent.

VirtualSAFE includes the integration of at least four separate networks, namely, "VIRCON", "VIRSBUS", "VIRMBUS", and "VIRLBUS". These networks are defined as follows: VIRCON is a virtual contractors network; VIRSBUS is a virtual small business network; VIRMBUS is a virtual medium-sized business network; and, VIRLBUS is a virtual large business network. As members of one these networks, contractors will have access and will be able to run all of their business affairs via VirtualSAFE. For example, contractors may login to VirtualSAFE and download all of their companys' documents (e.g. purchase orders, invoices, change orders, material order forms, outstanding bills, etc.) and have all of their e-commerce transactions handled right at their customers' sites. For materials that they require, emails will be sent to their suppliers. For invoices that require payment, the opportunity for their immediate payment exists through Virtual SAFE.

VirtualSAFE includes a check processing module, namely, "SAFEcheck". With SAFEcheck, check printers are installed in participating banks or other financial institutions enabling employees of participating corporate members of VirtualSAFE to print out their paychecks at these locations. SAFEcheck alleviates many of the problems associated with checks being lost in the mail.

VirtualSAFE supports multiple languages and multiple currencies.

VirtualSAFE protects individual privacy without impeding legitimate inquiries by law enforcement and government agencies by providing transactional anonymity with an audit trail. In addition, allowance is included for non-repudiated transactions which emulate cash transactions.

VirtualSAFE does not require the maintenance of extensive records, is relatively anonymous for the consumer, can detect fraud, and can adequately deal with micro payments to individual merchants.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. A method of performing a secure electronic commerce transaction over a network using a smart card, said network having a client terminal, a merchant server, a payment server, and an authentication server, said smart card being a physical smart card or a virtual smart card, said smart card being associated with a user at said client terminal, said smart card having associated smart card information, said smart card information including an account balance, said smart card information being stored at said client terminal and at said authentication server, said method comprising the steps of:

sending a transaction request message from said client terminal to said merchant server identifying a product for said transaction, said product having associated product information, said product information being displayed on a first web page supported by said merchant server, said user being able to view said web page at said client terminal using a browser;

said transaction request message being sent via a Transaction Fulfilment Mechanism (TFM) module consisting of a set of fraud management heuristics that are invoked in a progression that leads to a final fulfillment condition, said fulfillment condition dictating what type of delivery is to be made and associated criteria for completion of said transaction;

sending transaction information from said merchant server to said client terminal in response to said transaction request message, said transaction information being contained in a second web page generated by said merchant server and displayable to said user through said browser, said transaction information including a price for said product, an IP address of said payment server, a transaction identifier, and a merchant identifier, said transaction identifier for tracking said transaction by said merchant server and by said payment server, said merchant identifier for tracking said transaction by said client terminal and said payment server;

receiving a user identifier and a PIN from said user at said client terminal for authorizing said transaction;

sending said user identifier, said PIN, and said transaction information from said client terminal to said authentication server;

comparing said price of said product to said account balance for said smart card at said authentication server to determine if said transaction can proceed, said account balance being stored at said authentication server and being accessed using said user identifier and said PIN, said transaction being terminated and a first termination message being sent from said authentication server to said client terminal for display to said user if said price exceeds said account balance by a predetermined amount;

sending a draw request message from said authentication server to said payment server using said IP address of said payment server, said draw request message containing said transaction information;

sending said draw request message from said payment server to said client terminal;

sending a debit request message from said client terminal to said payment server in response to said draw request message, said debit request message including a first digital signature, said first digital signature for verifying that said debit request message originated from said client terminal, said first digital signature being generated at said client terminal using said smart card information stored at said client terminal;

sending said debit request message from said payment server to said authentication server;

comparing at said authentication server said first digital signature contained in said debit request message to a first check digital signature generated at said authentication server using said smart card information stored at said authentication server to determine if said transaction can proceed, said transaction being terminated and a second termination message being sent from said authentication server to said client terminal for display to said user if said first digital signature does not match said first check digital signature;

updating said smart card information by debiting said account balance by paid price to produce an updated account balance and storing said updated account balance at said authentication server;

sending a debit response message from said authentication server to said payment server, said debit response message including a second digital signature, said second digital signature for verifying that said debit response message originated from said authentication server and for verifying that said account balance has been debited, said second digital signature being generated at said authentication server using said smart card information stored at said authentication server;

sending said debit response message from said payment server to said client terminal;

comparing at said client terminal said second digital signature contained in said debit response message to a second check digital signature generated at said client terminal using said smart card information stored at said client terminal, said smart card information stored at said client terminal including an expected updated account balance, to determine if said transaction can proceed, said transaction being terminated and a third termination message being displayed to said user if said second digital signature does not match said second check digital signature;

updating said smart card information by debiting said account balance by paid price to produce an updated account balance and storing said updated account balance at said client terminal;

sending a verification response message from said client terminal to said payment server, said verification response message including an indication that said second digital signature matches said second check digital signature and that said transaction can proceed;

logging said indication and said transaction information at said payment server;

sending a debit result message from said payment server to said authentication server, said debit result message for confirming that said transaction has been logged and that said transaction can proceed, said debit result message including said indication and said transaction information;

logging said debit result message at said authentication server;

sending said debit result message from said authentication server to said client terminal to confirm that said transaction has been logged and that said transaction can proceed;

sending said debit result message from said client terminal to said merchant server to confirm that said transaction has been logged and that said product can be released to said user; and, sending a purchase receipt message from said merchant server to said client terminal, said purchase receipt message indicating that said product has been released to said user, thereby completing said secure electronic commerce transaction;

wherein all of said transaction communications are routed through a secure component (Crypto Engine CEV) module which interconnects software modules and assures management of multi-identities, strong authentication, user consent, anonymity, accountability, reporting and privacy compliance.

2. The method of claim 1 wherein said network is the Internet.

3. The method of claim 1 wherein said debit result message is encrypted.

4. The method of claim 1, wherein said authentication server is operable to enable, enhance and support government, health, insurance, institutional, general business and financial services that enable processing such as credit card processing standards, e-check, legal, administrative and financial settlement between parties in online transactions in compliance with government regulations and privacy legislations.

5. The method of claim 1, further comprising the step at periodically re-configuring data on said smart card.

6. The method of claim 1, wherein the secure electronic commerce transaction method is carried out using the software modules comprising the group of:
   a Public Key Infrastructure (PKI) module;
   a Forwarding Mechanism/Redirection Link module;
   a Secure Remote Pointer/Plug-in/Application/Applet module;
   a Attribute Authority module;
   a Virtual Identity module;
   a Unique authentication process module;
   a Secure Data Repository module;
   an Authentication Authority module;
   a Crypto-Engine (CEV) module;
   a Payment Processing Engine module;
   a Risk Management Engine module;
   a Transaction Fulfillment Mechanism module;
   an Insurance Module;
   a Transaction Secure Repository module; and
   a VirtualSAFE Deposit Box module.

7. The method of claim 6, wherein the secure session and/or the SSL protocol authenticates and secures communications with the server, and Public Key Infrastructure (PKI) combined with third party trusted Certificate Authorities authenticates the device or computer, the VirtualSAFE system and method authenticates the server, computer, and the user based on principles of secret, share secret and physical material or certificates to create uniqueness of user virtual identity.

8. The method of claim 1, further comprising a power of Attorney Consent software module.

9. The method of claim 1, further comprising an Escrow Module called Secure Proxy software module.

10. The method of claims 1 wherein said TFM and said set of fraud management heuristics are operable to perform the steps of:
   generating a Customer Authentication Scoring, by considering Certificate Authentication, Secure Cookies, PIN or PIN value, and SRP Verifications criteria;
   generating a Credential Identification Scoring, by considering Address, Amount, Over Limit, Declined, Plug-in Verifications, Risk Assessment, Transaction type, Payment type, Fraud, and Third party assessment proof or change criteria;
   generating a Transaction Risk Scoring by considering external Third Party Fraud Assessment data, or Internal Primary Attribute, Secondary Attribute, Reduction, Tune Up, Risk Adjustment, and Fraud Data Configuration criteria;
   said Fulfillment Response being dependable to third party authorization and creating a type of said Fulfillment Delivery based on a opposite score that will guarantee delivery of products/services/document; and
   said three steps of generating being combined to a achieve a transaction score that is used to determine said fulfillment response and type of fulfillment delivery.

11. The method of claim 1, where information is sent to said authentication server by securely forwarding the information from said customer application in accordance with a security policy.

12. The method of claim 1 wherein each step of transmitting comprises the step of transmitting using standard secure communication session such as SSL, said unique session bundling encryption of user data by user's keys to support three basic rules; user secret, user share secret and physical material that represents sets of user's unique keys; and further comprising the step of flushing memory of tamper-proof Crypto Engine CEV process encrypted and raw data that will be securely granulated and encrypted in accordance with policy of segmentation, encryption and fragmentation of data such as keys.

13. The method of claim 1 further comprising the step of responding to a successful user authentication for a transaction, by using a user's or authorized user's unique electronic signature to sign a transactional consent, legally binding all parties in order to proceed with transactions enabled by multi-step chain, anonymous or personalized proxy/surrogate/assembly electronic signature mechanism; said transaction signed by user signature and by all other parties' signatures involved in the transaction enabling accountable anonymity in compliance with a non-reputable, transactional audit, audit legal audit and reporting mechanism.

14. The method of claim 1, wherein said payment server responds to the failure to settle a financial transaction, said user not accepting a delivered product in accordance with said policy, by said Transaction Fulfillment Mechanism initiating cancellation of said order in accordance with said policy which will trigger credit of said user transaction process such as payment server will settle and/or credit financial transaction escrowed in accordance with said agreement.

15. The method of claim 1, further comprising the step of responding to said user failing to receive delivery of a product in accordance with said agreement consented to by said user, and said Transaction Fulfillment Mechanism, by initiating cancellation of said order.

16. The method of claim 1, further comprising the step of ensuring security through a combination of public key certificates and attribute certificates which are deployed for authentication and authorization purposes for each entity in an e-commerce transaction.

* * * * *